US009310543B2

(12) United States Patent
Katou et al.

(10) Patent No.: US 9,310,543 B2
(45) Date of Patent: Apr. 12, 2016

(54) PATTERNED RETARDATION FILM FOR THREE-DIMENSIONAL DISPLAY AND METHOD FOR PRODUCING MOLD FOR PATTERNED ALIGNMENT FILM FOR THREE-DIMENSIONAL DISPLAY

(75) Inventors: Kei Katou, Tokyo (JP); Yosuke Kosaka, Tokyo (JP); Rikiya Yamashita, Tokyo (JP); Mitsumasa Koiwa, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 183 days.

(21) Appl. No.: 14/118,073

(22) PCT Filed: May 17, 2012

(86) PCT No.: PCT/JP2012/062711
§ 371 (c)(1),
(2), (4) Date: Nov. 15, 2013

(87) PCT Pub. No.: WO2012/157726
PCT Pub. Date: Nov. 22, 2012

(65) Prior Publication Data
US 2014/0085597 A1   Mar. 27, 2014

(30) Foreign Application Priority Data

May 17, 2011   (JP) .................................. 2011-110839
May 17, 2011   (JP) .................................. 2011-110850
May 17, 2011   (JP) .................................. 2011-110858
May 17, 2011   (JP) .................................. 2011-110865
May 17, 2011   (JP) .................................. 2011-110868

(51) Int. Cl.
*G02F 1/1335*   (2006.01)
*G02F 1/1337*   (2006.01)
(Continued)

(52) U.S. Cl.
CPC .......... *G02B 5/3016* (2013.01); *B29C 33/3857* (2013.01); *G02B 5/3083* (2013.01);
(Continued)

(58) Field of Classification Search
CPC .......... G02F 1/13378; G02F 1/133753; G02F 1/133707; G02F 1/1337; G02F 2001/133631; G02F 2001/133633; B29C 33/3857
USPC .............................................. 349/15, 117, 123
See application file for complete search history.

(56) References Cited

U.S. PATENT DOCUMENTS 6,624,863 B1 *   9/2003   Jacobs ................. G02B 5/3016
348/E13.022
2005/0046941 A1   3/2005   Satoh et al.
(Continued)

FOREIGN PATENT DOCUMENTS

JP   11-084385 A1   3/1999
JP   2004-157312 A1   6/2004
JP   2010-152296 A1   7/2010

OTHER PUBLICATIONS

International Search Report (Application No. PCT/JP2012/062711) dated Jun. 12, 2012.

*Primary Examiner* — Mike Qi
(74) *Attorney, Agent, or Firm* — Burr & Brown, PLLC

(57) ABSTRACT

A method for producing a mold for a patterned alignment film for three-dimensional display includes: forming a first layer composed of a metal material or an inorganic material; forming a fine linear three-dimensional structure in a surface of the first layer in an approximately constant direction;F forming a second layer, composed of a metal material or an inorganic material, on the surface of the first layer after the first three-dimensional structure forming step; a second three-dimensional structure forming step of forming a fine linear three-dimensional structure in a surface of the second layer in an approximately constant direction which differs by 90° from that in the first three-dimensional structure forming step; a resist forming step of forming a resist in a parallel stripe pattern on the surface of the second layer after the second three-dimensional structure forming step.

22 Claims, 21 Drawing Sheets

(51) Int. Cl.
*G02B 5/30* (2006.01)
*B29C 33/38* (2006.01)

(52) U.S. Cl.
CPC .......... *G02F 1/1337* (2013.01); *G02F 1/13378* (2013.01); *G02F 1/133707* (2013.01); *G02F 1/133753* (2013.01)

(56) References Cited

U.S. PATENT DOCUMENTS

| 2008/0003511 | A1* | 1/2008 | Nam et al. | 430/5 |
| 2010/0073604 | A1* | 3/2010 | Okuyama | B29D 11/00644 349/75 |
| 2011/0051066 | A1* | 3/2011 | Ahn et al. | 349/124 |

\* cited by examiner

PATTERNED RETARDATION FILM FOR THREE-DIMENSIONAL DISPLAY AND METHOD FOR PRODUCING MOLD FOR PATTERNED ALIGNMENT FILM FOR THREE-DIMENSIONAL DISPLAY

TECHNICAL FIELD

The present invention relates to a high-quality patterned retardation film for three-dimensional display and to a mold for a patterned alignment film for three-dimensional display, which can produce a patterned alignment film for three-dimensional display, capable of producing a high-quality patterned retardation film for three-dimensional display, with ease and in large quantities.

BACKGROUND ART

In the field of flat panel display devices, in which 2D display devices have been mainstream, display devices capable of displaying three-dimensional images are attracting attention these days, and some display devices are now commercially available. Flat panel display devices in the future will be naturally required to be capable of three-dimensional display, and wide studies are being conducted on flat panel display devices capable of three-dimensional display.

In order for a flat panel display device to display a three-dimensional image, it is generally necessary to display a right-eye image and a left-eye image separately to a viewer in some way. A so-called passive method, for example, is known as a method to separately display a right-eye image and a left-eye image. Three-dimensional display by the passive method will now be described with reference to FIG. 29. FIG. 29 is a schematic view illustrating three-dimensional display device as performed by the passive method. As shown in FIG. 29, the pixels of a flat panel display device are divided pattern-wise into two groups, right-eye image display pixels and left-eye image display pixels; the former group of pixels is caused to display a right-eye image, while the latter group of pixels is caused to display a left-eye image. The right-eye image and the left-eye image are converted into circular polarized lights by using a linearly polarizing plate and a patterned retardation film having a retardation layer formed in a pattern corresponding to the pattern in which the pixels are divided. The viewer wears circular polarization glasses, respectively adapted for the right eye and the left eye, so that the right-eye image reaches only the right eye and the left-eye image reaches only the left eye. The passive method can thus display a three-dimensional image to the viewer.

The passive method has the advantage that the use of the above-described patterned retardation film and circular polarization glasses can easily display three-dimensional images.

JP 2010-152296A discloses a method for producing a patterned retardation film by bringing an alignment film-forming layer into contact with a roll mold having a three-dimensional surface pattern which has been formed with a laser, thereby producing a shaped patterned alignment film having a pattern of a fine three-dimensional structure in the surface. JP 2010-152296A also describes a method for forming a pattern of a fine three-dimensional structure by polishing in the same plane.

However, such a patterned retardation film, produced by using a mold having a three-dimensional surface pattern which has been formed with a laser, has the following problem: defective alignment, i.e. disorder in the alignment direction of a liquid crystal compound, is likely to occur around the boundary between adjacent right-eye and left-eye regions in the patterned retardation layer, i.e. around the boundary between adjacent regions with different alignment directions of the liquid crystal compound, i.e. around the boundary between a first retardation region and a second retardation region. Thus, defective alignment may occur in the liquid crystal around the above-described boundary when the film is used in a liquid crystal display device. The defective alignment causes leakage of light from the boundary area, resulting in low-contrast images. When producing a fine three-dimensional structure with a laser, the fine three-dimensional structure is produced in a one-by-one manner. It therefore takes a considerable time to form the fine three-dimensional structure, having a size on the order of tens of nm or hundreds of nm, over a large area (e.g. of the size of an LCD TV). Further, the production of the fine three-dimensional structure requires the use of an apparatus for precisely controlling machining of the structure with the pitch of the asperities, which is on the order of tens of nm or hundreds of nm.

The lower limit of line width in machining of fine three-dimensional structures with a laser is generally at the level of hundreds of nm; machining with the line width at the level of tens of nm is difficult. Thus, it is generally difficult to produce a patterned alignment film having an excellent alignment regulating ability. In addition, there is the problem of the expensiveness of a laser machining apparatus.

JP 2010-152296A describes the producing of a mold by the use of a polishing method. When forming a three-dimensional pattern on the same plane by the polishing method of JP 2010-152296A to produce a roll mold, it is necessary to carry out polishing for each of patterning regions, each having a size of hundreds of nm, and to combine the patterned regions where fine three-dimensional structures have been formed. The method disclosed in the reference thus involves a complicated process which necessitates a considerable amount of time for machining and a high-accuracy operation.

SUMMARY OF THE INVENTION

The present invention has been made in view of the above situation. It is therefore a main object of the present invention to provide a patterned retardation film for three-dimensional display, and to provide a method for producing a mold for a patterned alignment film for three-dimensional display, which can produce a patterned alignment film for three-dimensional display (hereinafter sometimes referred to simply as "alignment film"), capable of producing a high-quality patterned retardation film for three-dimensional display, with ease and in large quantities.

In a first aspect of a first invention, a method for producing a mold for a patterned alignment film for three-dimensional display, comprises:

a first layer forming step of forming a first layer composed of a metal material or an inorganic material;

a first three-dimensional structure forming step of forming a fine linear three-dimensional structure in a surface of the first layer in an approximately constant direction;

a second layer forming step of forming a second layer, composed of a metal material or an inorganic material, on the surface of the first layer after the first three-dimensional structure forming step;

a second three-dimensional structure forming step of forming a fine linear three-dimensional structure in a surface of the second layer in an approximately constant direction which is different from that in the first three-dimensional structure forming step;

a resist forming step of forming a resist in a parallel stripe pattern on the surface of the second layer after the second three-dimensional structure forming step;

a second layer removing step of removing a part of the second layer that remains exposed after the resist forming step; and a resist removing step of removing the resist.

The mold production method in the first aspect of the first invention includes the first and second three-dimensional structure forming steps to form fine linear three-dimensional structures in the entire surfaces of the first layer and the second layer, and the later second layer removing step to etch away only the second layer. Such a process can easily form the fine linear three-dimensional structures and, when forming the fine linear three-dimensional structures in the surface of the second layer, can prevent damage to the surface of the first layer having the fine linear three-dimensional structure formed in a different direction from that of the second-layer three-dimensional structure. A resist is formed in a parallel stripe pattern on the surface of the second layer in the resist forming step, and only the exposed portions of the second layer are selectively removed in the second layer removing step. Such steps can effectively distinguish the boundaries between the first layer, having the first-layer fine linear three-dimensional structure, and the second layer having the second-layer fine linear three-dimensional structure which are formed in a direction different from that of the first-layer three-dimensional structure. The mold for a patterned alignment film for three-dimensional display, produced by the above method, thus differs in the level between the surface of the first layer and the surface of the second layer and also differs in the longitudinal direction of the fine linear three-dimensional structure between the surface of the first layer and the surface of the second layer. The use of the mold can therefore produce a high-quality alignment film which has distinguished boundaries between first alignment region and second alignment region and which can produce a patterned retardation film that exhibits a retardation value corresponding to the difference in the direction between the first-layer fine linear three-dimensional structure and the second-layer fine linear three-dimensional structure.

In a second aspect of the first invention, a method for producing a mold for a patterned alignment film for three-dimensional display, comprises:

a first layer forming step of forming a first layer composed of a metal material or an inorganic material;

a first three-dimensional structure forming step of forming a fine linear three-dimensional structure in a surface of the first layer in an approximately constant direction;

a second layer forming step of forming a second layer, composed of a metal material or an inorganic material, on the surface of the first layer after the first three-dimensional structure forming step;

a second three-dimensional structure forming step of forming a fine linear three-dimensional structure in a surface of the second layer in an approximately constant direction which is the same as that in the first three-dimensional structure forming step;

a resist forming step of forming a resist in a parallel stripe pattern on the surface of the second layer after the second three-dimensional structure forming step;

a second layer removing step of removing a part of the second layer that remains exposed after the resist forming step; and a resist removing step of removing the resist.

The mold production method in the second aspect of the first invention includes the first and second three-dimensional structure forming steps to form fine linear three-dimensional structures in the entire surfaces of the first layer and the second layer, and the later second layer removing step to etch away only the second layer. Such a process can easily form the fine linear three-dimensional structures and, when forming the fine linear three-dimensional structures in the surface of the second layer, can prevent damage to the surface of the first layer. The use of such a mold for a patterned alignment film for three-dimensional display can produce a high-quality alignment film which has distinguished boundaries between first alignment region and second alignment region and which can produce a patterned retardation film that exhibits a retardation value corresponding to the level difference between the first layer and the second layer.

In the first invention, the mold for a patterned alignment film for three-dimensional display is preferably a roll mold having a roll-like shape. When the mold for a patterned alignment film for three-dimensional display of the present invention has a roll-like shape, or is a roll mold, shaping of an alignment film-forming layer with the mold can be performed in a continuous manner while rotating the roll mold. The use of a roll mold can thus produce a patterned alignment film with ease, in large quantities and with high efficiency.

It is preferred in the first invention that at least one of the first three-dimensional structure forming step and the second three-dimensional structure forming step be performed by roll pressing. By forming fine linear three-dimensional structures by roll pressing, the three-dimensional structure forming step can be performed with ease. Furthermore, roll pressing enables constant position/constant pressure pressing, making it possible to equalize the thickness of the machined first layer and/or the second layer and to produce the mold in an intermittent/continuous manner.

In the second invention, a method for producing a mold for a patterned alignment film for three-dimensional display, comprises:

a first layer preparation step of preparing a first layer composed of a metal material or an inorganic material;

a first three-dimensional structure forming step of forming a first fine linear three-dimensional structure in a surface of the first layer in an approximately constant direction;

a resist forming step of forming a resist in a parallel stripe pattern on the surface of the first layer after the first three-dimensional structure forming step;

a second layer forming step of forming a second layer, composed of a metal material or an inorganic material, in a parallel stripe pattern on the surface of the first layer that remains exposed after the resist forming step;

a protective layer forming step of forming a protective layer, composed of a resist material, on the surface of the first layer;

a second three-dimensional structure forming step of forming a second fine linear three-dimensional structure in a surface of the second layer in an approximately constant direction which is different from or the same as the direction in which the first three-dimensional structure is formed; and a removing step of removing the protective layer.

According to the second invention, the protective layer is formed in the protective layer forming step in those areas where the second layer is not formed, i.e. in those areas where the first layer is exposed. The protective layer can protect the first three-dimensional structure and enables efficient formation of the second three-dimensional structure in the second layer. It therefore becomes possible to form the fine linear three-dimensional structures in the surfaces of the first and second layers easily and with high accuracy. The use of the thus-produced mold for a patterned alignment film for three-dimensional display can produce a high-quality patterned retardation film for three-dimensional display which, when used in a three-dimensional display device, is unlikely to cause poor alignment.

Preferably, in the second invention, the second layer is formed on an exposed part of the first layer and on the resist in the second layer forming step and, in the protective layer forming step, the protective layer is formed by roughly polishing a laminate of the resist and a part of the second layer overlying the resist. Thus, the resist, which is used to form the patterned second layer, can be used also as the protective layer. This makes it possible to reduce the production cost and simplify the production process.

In another preferable method in the second invention, the second layer is formed on an exposed part of the first layer and on the resist in the second layer forming step and, in the protective layer forming step, a laminate of the resist and a part of the second layer overlying the resist is removed, and subsequently a second resist is formed such that it covers the first layer and the second layer, followed by rough polishing of the second resist to form the protective layer. Because the protective layer is formed by removing the laminate, forming the second resist and roughly polishing the second resist, no metal material or inorganic material is contained in polishing debris. This method can therefore reduce scratches on the surface of the second layer due to contact of polishing debris with the surface of the second layer. It therefore becomes possible to form the second three-dimensional structures with higher accuracy in the surface of the second layer. Accordingly, the use of the mold, produced by the method of this embodiment, can produce a patterned alignment film for three-dimensional display which is less likely to cause poor alignment.

In the second invention, the mold for a patterned alignment film for three-dimensional display is preferably a roll mold having a roll-like shape. When the mold for a patterned alignment film for three-dimensional display, produced by the mold production method of the present invention, has a roll-like shape, or is a roll mold, shaping of an alignment film-forming layer with the mold can be performed in a continuous manner while rotating the roll mold. The use of a roll mold can thus produce a patterned alignment film with ease, in large quantities and with high efficiency.

It is preferred in the second invention that at least one of the first three-dimensional structure forming step and the second three-dimensional structure forming step be performed by roll pressing. By forming fine linear three-dimensional structures by roll pressing, the first three-dimensional structure forming step and/or the second three-dimensional structure forming step can be performed with ease. Furthermore, roll pressing enables constant position/constant pressure pressing, making it possible to equalize the thickness of the machined first layer and/or the second layer and to produce the mold in an intermittent/continuous manner.

In a first aspect of a third invention, a method for producing a mold for a patterned alignment film for three-dimensional display, comprises:

a first layer forming step of forming a first layer composed of a metal;

a first three-dimensional structure forming step of forming a fine linear three-dimensional structure in a surface of the first layer in an approximately constant direction;

a resist forming step of forming a resist in a parallel stripe pattern on the surface of the first layer after the first three-dimensional structure forming step;

a second layer forming step of forming a second layer, composed of an inorganic material, by performing dry plating of a surface of the resist and an exposed surface of the first layer after the resist forming step;

a removing step of removing the resist;

a protective layer forming step of forming a protective layer by performing wet plating of an exposed part of the first layer after the removing step;

a second three-dimensional structure forming step of forming a fine linear three-dimensional structure in a surface of the second layer in an approximately constant direction which is different from that in the first three-dimensional structure forming step; and a removing step of removing the protective layer.

According to the first aspect of the third invention, the protective layer is formed in the protective layer forming step in those areas where the second layer is not formed, i.e. in those areas where the first layer is exposed. The protective layer can protect the fine linear three-dimensional structure formed in the surface of the first layer and enables efficient formation of the second three-dimensional structure in the second layer. It therefore becomes possible to form the fine linear three-dimensional structures in the surfaces of the first and second layers easily and with high accuracy. The protective layer is formed by wet plating. The protective layer can therefore be formed selectively only on the surface of the first layer composed of a metal and, in addition, the thickness of the protective layer can be easily adjusted. Thus, the protective layer can be made thinner than the second layer. This makes it possible to prevent the protective layer from impeding machining of the fine linear three-dimensional structure in the surface of the second layer in the second layer forming step while protecting the fine linear three-dimensional structure of the surface of the first layer during the second layer forming step. The mold for a patterned alignment film for three-dimensional display, produced by the above method, thus differs in the level between the surface of the first layer and the surface of the second layer and also differs in the longitudinal direction of the fine linear three-dimensional structures between the surface of the first layer and the surface of the second layer. The use of the mold can therefore produce a high-quality alignment film which has distinguished boundaries between first alignment region and second alignment region and which can produce a patterned retardation film that exhibits a retardation value corresponding to the difference in the direction between the first-layer fine linear three-dimensional structure and the second-layer fine linear three-dimensional structure.

In a second aspect of the third invention, a method for producing a mold for a patterned alignment film for three-dimensional display, comprises:

a first layer forming step of forming a first layer composed of a metal;

a first three-dimensional structure forming step of forming a fine linear three-dimensional structure in a surface of the first layer in an approximately constant direction;

a resist forming step of forming a resist in a parallel stripe pattern on the surface of the first layer after the first three-dimensional structure forming step;

a second layer forming step of forming a second layer, composed of an inorganic material, by performing dry plating of a surface of the resist and an exposed surface of the first layer after the resist forming step;

a removing step of removing the resist;

a protective layer forming step of forming a protective layer by performing wet plating of an exposed part of the first layer after the removing step;

a second three-dimensional structure forming step of forming a fine linear three-dimensional structure in a surface of the second layer in an approximately constant direction which is the same as that in the first three-dimensional structure forming step; and a removing step of removing the protective layer.

According to the second aspect of the third invention, the protective layer is formed in the protective layer forming step in those areas where the second layer is not formed, i.e. in those areas where the first layer is exposed. The protective layer can protect the fine linear three-dimensional structure formed in the surface of the first layer and enables efficient formation of the second three-dimensional structure in the second layer. It therefore becomes possible to form the fine linear three-dimensional structures in the surfaces of the first and second layers easily and with high accuracy. The protective layer is formed by wet plating. The protective layer can therefore be formed selectively only on the surface of the first layer composed of a metal and, in addition, the thickness of the protective layer can be easily adjusted. Thus, the protective layer can be made thinner than the second layer. This makes it possible to prevent the protective layer from impeding machining of the fine linear three-dimensional structure in the surface of the second layer in the second layer forming step while protecting the fine linear three-dimensional structure of the surface of the first layer during the second layer forming step. The mold for a patterned alignment film for three-dimensional display, produced by the above method, thus differs in the level between the surface of the first layer and the surface of the second layer (i.e. in the thickness of the mold between the portions with the second layer and the portions without the second layer), where the fine linear three-dimensional structures are formed. The use of the mold can therefore produce a high-quality alignment film which has distinguished boundaries between first alignment region and second alignment region and which can produce a patterned retardation film that exhibits a retardation value corresponding to the difference in the level difference between the first layer and the second layer.

In the third invention, the mold for a patterned alignment film for three-dimensional display is preferably a roll mold having a roll-like shape. When the mold for a patterned alignment film for three-dimensional display of the present invention has a roll-like shape, or is a roll mold, shaping of an alignment film-forming layer with the mold can be performed in a continuous manner while rotating the roll mold. The use of a roll mold can thus produce a patterned alignment film with ease, in large quantities and with high efficiency.

It is preferred in the third invention that at least one of the first three-dimensional structure forming step and the second three-dimensional structure forming step be performed by roll pressing. By forming fine linear three-dimensional structures by roll pressing, the three-dimensional structure forming step can be performed with ease. Furthermore, roll pressing enables constant position/constant pressure pressing, making it possible to equalize the thickness of the machined first layer and/or the second layer and to produce the mold in an intermittent/continuous manner.

In a fourth invention, a method for producing a mold for a patterned alignment film for three-dimensional display, having an alternating stripe pattern of a first three-dimensional structure region where a fine linear three-dimensional structure is formed in an approximately constant direction and a second three-dimensional structure region where a fine linear three-dimensional structure is formed in an approximately constant direction different from that of the first three-dimensional structures, comprises:

a first polishing step of forming the first three-dimensional structure region in a surface of a first layer composed of an inorganic material;

a second layer forming step of forming a resist portions in a stripe pattern on the surface of the first layer, and then forming a second-layer film, composed of an inorganic material, on the surfaces of the resist portions and the non-resist portions, thereby forming a patterned second layer on the non-resist portions;

a second polishing step of forming the second three-dimensional structure region by polishing a surface of the second-layer film in a direction different from that in the first polishing step; and a resist removing step of removing the resist portions and the second-layer film on the resist portions.

The mold production method of the fourth invention involves only one exposure/developing operation and no etching process, and can form a stripe pattern of the first three-dimensional structure region and a stripe pattern of the second three-dimensional structure region, arranged alternately on the same plane, in a small number of process steps. The three-dimensional structure forming steps may be performed by a common method which, as compared to a machining method using a pulsed laser or a cutting tool, can form the three-dimensional structure region with high accuracy.

In the fourth invention, the second-layer film is formed not only on the non-resist portion but on the resist portion as well, i.e. on the entire surface of the workpiece. Nevertheless, in the later resist removing step, a removing solution will penetrate into the patterned resist from the side, and the resist can be easily removed.

When polishing or rubbing the second-layer film after the step of polishing or rubbing the first layer, the first layer will not be polished or rubbed; no additional scratches (structures) will be formed (no crossing polishing scratches will be formed).

In the fourth invention, the thickness of the patterned second layer is preferably not less than 0.01 µm and not more than 1 µm. If the thickness exceeds 1 µm, a pattered alignment film having poor alignment properties and poor appearance will be produced. The use of the patterned second layer having such a preferable thickness can achieve a sufficient masking effect on the first three-dimensional structure region. In addition, the use of such a thin patterned second layer makes no substantial change in the amount of phase difference (retardation), leading to high optical precision.

In the fourth invention, the thickness of the resist portions is preferably not less than 1 µm and not more than 10 µm, more preferably not less than 3 µm and not more than 5 µm. If the resist portions are too thin, a solvent will not penetrate well into the resist when dissolving and removing the resist, and therefore the resist may not be removed easily. If the resist portions are too thick, on the other hand, the large surface level difference will make it difficult to polish (rub) the surface of the second layer in the second polishing step. The use of the resist having such a thickness can maintain the protective function of the resist and, at the same time, avoid the large level difference upon the second polishing step, making it possible to securely perform polishing of the patterned second layer.

In the fourth invention, the first layer and the second layer are preferably composed of the same inorganic material. However, the layers may be composed of different types of inorganic materials if good adhesion between the layers is ensured. The use of the same inorganic material can increase the adhesion between the first layer and second layer, thereby preventing delamination of the layers during the polishing step or the resist removing step.

In a first aspect of a fifth invention, a method for producing a mold for a patterned alignment film for three-dimensional display, comprises:

an underlayer preparation step of preparing an underlayer composed of a metal material;

a resist forming step of forming a resist in a parallel stripe pattern on a surface of the underlayer;

a first layer forming step of forming a first layer-forming layer, composed of an inorganic material having insulating properties, by performing dry plating of the surfaces of the underlayer and the resist, and then removing a laminate of the resist and a part of the first layer-forming layer overlying the resist, thereby forming a first layer in a parallel stripe pattern;

a first three-dimensional structure forming step of forming a first fine linear three-dimensional structure in a surface of the first layer in an approximately constant direction;

a second layer forming step of forming a second layer, composed of a metal material and having a thickness which is equal to or larger than a thickness of the first layer, by performing wet plating of only an exposed surface of the underlayer after the first three-dimensional structure forming step; and a second three-dimensional structure forming step of forming a second fine linear three-dimensional structure in a surface of the second layer in an approximately constant direction different from the direction in which the first three-dimensional structure is formed.

According to the first aspect of the fifth invention, the second layer is formed in the second layer forming step in such a manner that the second layer has a larger thickness than the first layer having the first three-dimensional structure formed in the surface. Therefore, when forming the second three-dimensional structure in the surface of the second layer in the second three-dimensional structure forming step, the surface of the first layer can be prevented from being damaged. Further, in this embodiment an inorganic material is used for the first layer, and a metal material is used for the second layer. Therefore, the hardness of the first layer can be made higher than the hardness of the second layer. Accordingly, even in the case where the second layer is formed in the second layer forming step in such a manner that the second layer has the same thickness as the first layer, the surface of the first layer can be prevented from being damaged when forming the second three-dimensional structure in the surface of the second layer in the second three-dimensional structure forming step. It therefore becomes possible to form the fine linear three-dimensional structures of the surfaces of the first and second layers easily and with high accuracy. The use of the thus-produced mold can produce a high-quality patterned retardation film for three-dimensional display which, when used in a three-dimensional display device, is unlikely to cause poor alignment.

In a second aspect of a fifth invention, a method for producing a mold for a patterned alignment film for three-dimensional display, comprising:

an underlayer preparation step of preparing an underlayer composed of a metal material;

a resist forming step of forming a resist in a parallel stripe pattern on a surface of the underlayer;

a first layer forming step of forming a first layer-forming layer, composed of an inorganic material having insulating properties, by performing dry plating of the surfaces of the underlayer and the resist, and then removing a laminate of the resist and a part of the first layer-forming layer overlying the resist, thereby forming a first layer in a parallel stripe pattern;

a first three-dimensional structure forming step of forming a first fine linear three-dimensional structure in a surface of the first layer in an approximately constant direction;

a second layer forming step of forming a second layer, composed of a metal material and having a thickness which is larger than a thickness of the first layer, by performing wet plating of only an exposed surface of the underlayer after the first three-dimensional structure forming step; and a second three-dimensional structure forming step of forming a second fine linear three-dimensional structure in a surface of the second layer in an approximately constant direction which is the same as the direction in which the first three-dimensional structure is formed.

According to the second aspect of the fifth invention, the second layer is formed in the second layer forming step in such a manner that the second layer has a larger thickness than the first layer having the first three-dimensional structure formed in the surface. Therefore, when forming the second three-dimensional structure in the surface of the second layer in the second three-dimensional structure forming step, the surface of the first layer can be prevented from being damaged. It therefore becomes possible to form the fine linear three-dimensional structure of the surfaces of the first and second layers easily and with high accuracy. The use of the thus-produced mold can produce a high-quality patterned retardation film for three-dimensional display which, when used in a three-dimensional display device, is unlikely to cause poor alignment.

In the fifth invention, the mold for a patterned alignment film for three-dimensional display is preferably a roll mold having a roll-like shape. When the mold for a patterned alignment film for three-dimensional display, produced by the mold production method of the present invention, has a roll-like shape, or is a roll mold, shaping of an alignment film-forming layer with the mold can be performed in a continuous manner while rotating the roll mold. The use of a roll mold can thus produce a patterned alignment film with ease, in large quantities and with high efficiency.

It is preferred in the fifth invention that at least one of the first three-dimensional structure forming step and the second three-dimensional structure forming step be performed by roll pressing. By forming fine linear three-dimensional structures by roll pressing, the first three-dimensional structure forming step and/or the second three-dimensional structure forming step can be performed with ease. Furthermore, roll pressing enables constant position/constant pressure pressing, making it possible to equalize the thickness of the machined first layer and/or the second layer and to produce the mold in an intermittent/continuous manner.

A first patterned retardation film according to the present invention comprises:

a transparent substrate film;

a patterned alignment film, formed on one surface of the transparent substrate film, having a surface consisting of first alignment regions and second alignment regions, arranged alternately and each region having linear three-dimensional structure formed therein, with the linear three-dimensional structure of the second alignment regions being formed in a direction which is the same as or different from a direction in which the linear three-dimensional structure of the first alignment regions are formed; and a patterned retardation layer, formed on said surface of the patterned alignment film, containing a liquid crystal compound which is aligned by the linear three-dimensional structure of the first alignment regions and the linear three-dimensional structures of the second alignment regions, wherein the linear three-dimensional structure of the first alignment regions and the linear three-dimensional structure of the second alignment regions have a height of not less than 1 nm and not more than 500 nm.

A second patterned retardation film according to the present invention comprises:

a transparent substrate film;

a patterned alignment film, formed on one surface of the transparent substrate film, having a surface consisting of first alignment regions and second alignment regions, arranged alternately and each region having linear three-dimensional structure formed therein, with the linear three-dimensional structure of the second alignment regions being formed in a direction which is the same as or different from a direction in which the linear three-dimensional structure of the first alignment regions are formed; and a patterned retardation layer, formed on said surface of the patterned alignment film, containing a liquid crystal compound which is aligned by the linear three-dimensional structure of the first alignment regions and the linear three-dimensional structures of the second alignment regions, wherein the level difference between the first alignment region and the second alignment region is not less than 10 nm and not more than 5000 nm.

The method of the present invention can thus produce a mold for a patterned alignment film for three-dimensional display, which can produce a patterned alignment film capable of producing a high-quality patterned retardation film for three-dimensional display, with ease and in large quantities.

DETAILED DESCRIPTION OF THE INVENTION

The present invention relates to a high-quality patterned retardation film for three-dimensional display and to a method for producing a mold for a patterned alignment film for three-dimensional display. First to fifth embodiments of the method for producing a mold for a patterned alignment film for three-dimensional display according to the present invention will now be described in order. In the following description, a description of an embodiment will be concentrated on a difference(s) from the preceding embodiment(s), and a duplicate description of a common point(s) will be omitted.

<<First Embodiment>>

A first embodiment will now be described with reference to a first mode (first aspect) and a second mode (second aspect).

A. First Mode (First Aspect)

In a mold for a patterned alignment film for three-dimensional display in the first mode, first-layer fine linear three-dimensional structures are formed in a direction different from that of second-layer fine linear three-dimensional structures.

A method for producing a mold for a patterned alignment film for three-dimensional display in the first mode includes:

a first layer forming step of forming a first layer composed of a metal material or an inorganic material; a first three-dimensional structure forming step of forming fine linear three-dimensional structures in the surface of the first layer in an approximately constant direction; a second layer forming step of forming a second layer composed of a metal material or an inorganic material on the surface of the first layer after the first three-dimensional structure forming step; a second three-dimensional structure forming step of forming fine linear three-dimensional structures in the surface of the second layer in an approximately constant direction different from that in the first three-dimensional structure forming step; a resist forming step of forming a resist in a parallel stripe pattern on the surface of the second layer after the second three-dimensional structure forming step; a second layer removing step of removing the second layer that remains exposed after the resist forming step; and a resist removing step of removing the resist.

Figure 1:
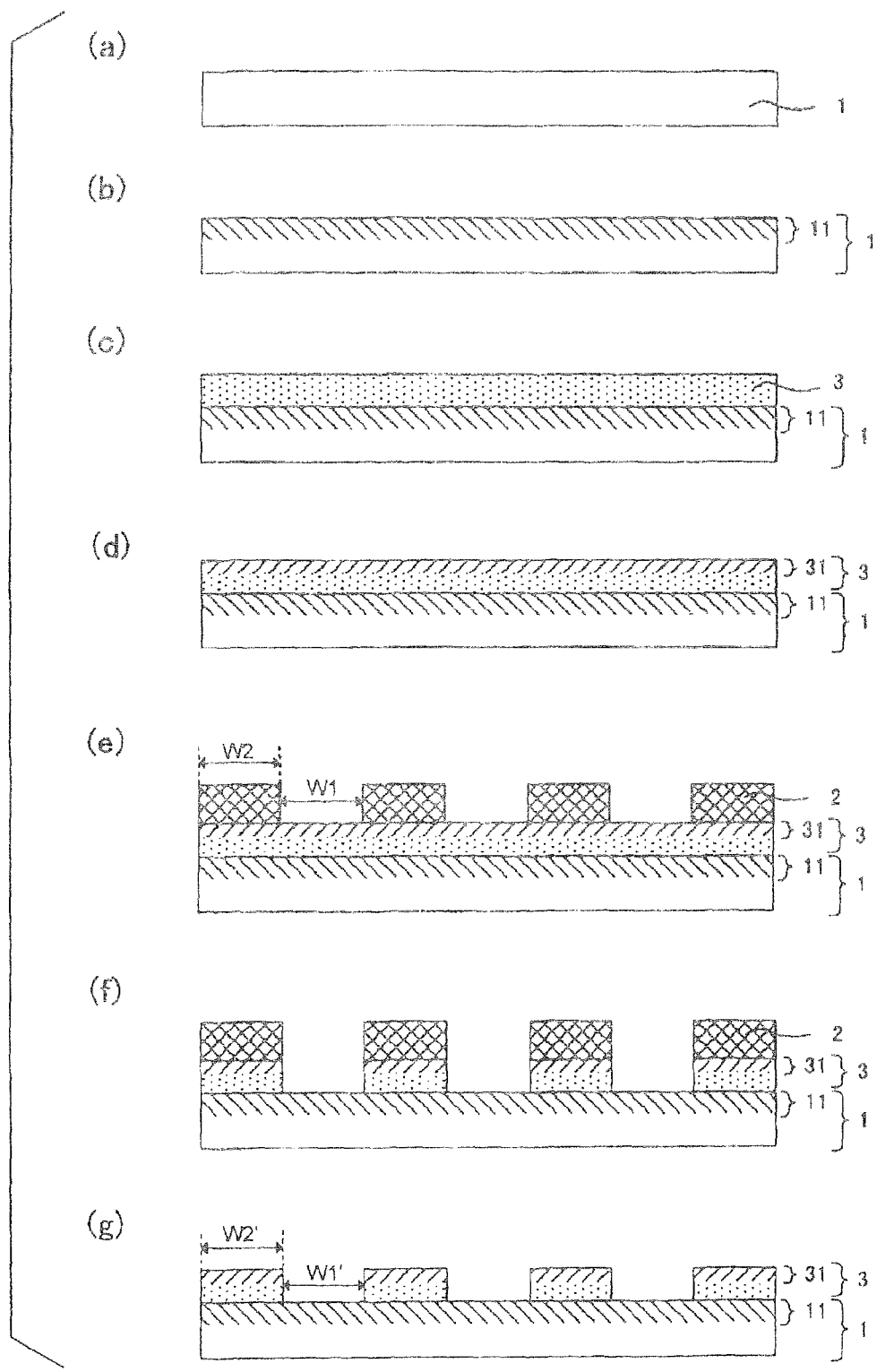
FIG. 1 is a process chart illustrating an exemplary method for producing a mold for a patterned alignment film for three-dimensional display.

The method for producing a mold for a patterned alignment film for three-dimensional display in the first mode will now be described with reference to FIG. 1. FIG. 1 is a process chart illustrating an exemplary method for producing a mold for a patterned alignment film for three-dimensional display. First, as illustrated in FIG. 1, a metal substrate is prepared and a first layer 1, consisting of a single layer or a plurality of layers, is formed (FIG. 1(a)). Next, the entire surface of the first layer 1 is subjected to cutting or roll pressing to form fine linear three-dimensional structures 11 in the surface in an approximately constant direction, thereby forming the first layer 1 having the fine linear three-dimensional structures 11 (FIG. 1(b)). Thereafter, the entire surface of the first layer 1 is subjected to dry plating to form a second layer 3 composed of a metal material or an inorganic material (FIG. 1(c)). Next, the entire surface of the second layer 3 is subjected to cutting or roll pressing to form fine linear three-dimensional structures 31 in the surface in a direction different from that of the fine linear three-dimensional structures 11 formed in the first three-dimensional structure forming step (FIG. 1(d)). A resist material is applied onto the surface of the second layer 3, in which the fine linear three-dimensional structures 31 are formed, to form a resist film on the surface. The resist film is then exposed e.g. by laser lithography in a parallel stripe pattern to form a resist 2 in a parallel stripe pattern on the surface of the first layer 1 (FIG. 1(e)). Thereafter, parts of the second layer 3, which remains exposed after the formation of the resist 2, is selectively removed off by using an etching solution, thereby exposing the first layer 1 having the fine linear three-dimensional structures 11 formed in the surface (FIG. 1(f)). Finally, the resist 2 is removed to obtain a mold 50 for a patterned alignment film for three-dimensional display according to the present invention (FIG. 1(g)). FIG. 1(a) illustrates the first layer forming step, FIG. 1(b) the first three-dimensional structure forming step, FIG. 1(c) the second layer forming step, FIG. 1(d) the second three-dimensional structure forming step, FIG. 1(e) the resist forming step, FIG. 1(f) the second layer removing step, and FIG. 1(g) the resist removing step.

Figure 2:
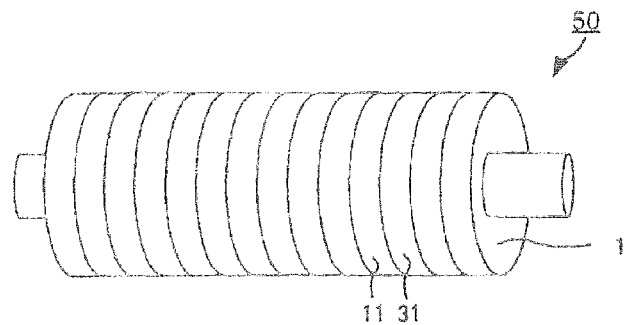
FIG. 2 is a schematic view showing an exemplary mold for a patterned alignment film for three-dimensional display.
Figure 3:
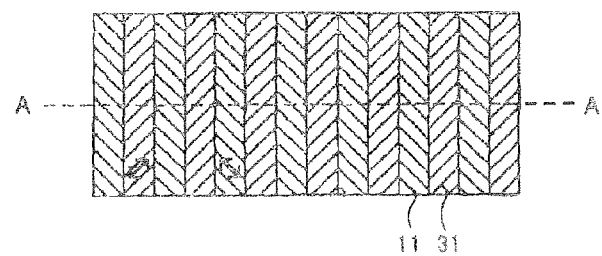
FIG. 3 is a schematic plan view showing the surface of a mold for a patterned alignment film for three-dimensional display.

A mold 50 for a patterned alignment film for three-dimensional display, obtainable by the above-described production method, will now be described with reference to the relevant drawings. FIG. 2 is a schematic view showing an exemplary mold 50 for a patterned alignment film for three-dimensional display according to the present invention. FIG. 3 is a schematic plan view showing the surface of the mold 50 for a patterned alignment film for three-dimensional display, and FIG. 4 is a cross-sectional view taken along the line A-A of FIG. 3.

Figure 4:
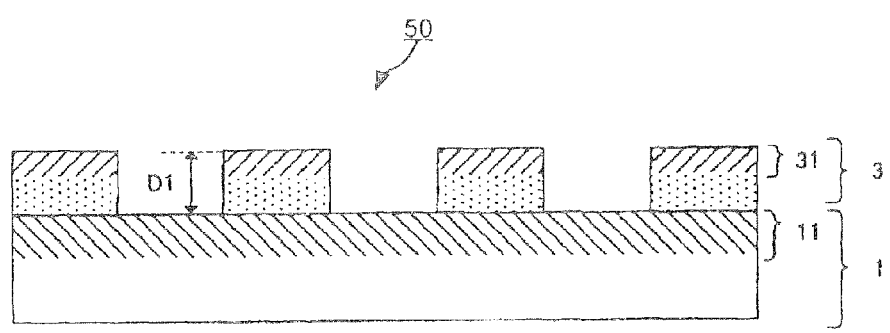
FIG. 4 is a cross-sectional view taken along the line A-A of FIG. 3.

As illustrated in FIGS. 3 and 4, the mold 50 in the first mode includes the first layer 1 composed of a metal material or an inorganic material and having the fine linear three-dimensional structures 11 formed in the surface in an approximately constant direction, and the second layer 3 composed of a metal material or an inorganic material, formed in a parallel stripe pattern on the first layer 1, and having the fine linear three-dimensional structures 31 formed in the surface in an approximately constant direction. The fine linear three-dimensional structures 31 are formed in the surface of the second layer 3 in a different direction from the direction in which the fine linear three-dimensional structures 11 are formed in the surface of the first layer 1 which is exposed between adjacent stripe-shaped portions of the second layer 2.

The exemplary mold 50 for a patterned alignment film for three-dimensional display, shown in FIG. 2, is a roll mold. As illustrated in FIG. 3, the fine linear three-dimensional structures 11, 31 of the surfaces of the first layer 1 and the second layer 3 are formed in a direction at an angle of 135° and in a direction at an angle of 45°, respectively, with respect to the direction of rotation of the mold (roll mold) 50 for a patterned alignment film for three-dimensional display. Thus, the directions of the fine linear three-dimensional structures 11, 31 differ from each other by 90°. The arrows in FIG. 3 indicate the directions in which the fine linear three-dimensional structures 11, 31 are formed.

A description will now be given of a patterned retardation film including an alignment film produced by using a mold for a patterned alignment film for three-dimensional display, produced by the method for producing a mold for a patterned alignment film for three-dimensional display in the first mode (herein sometimes referred to simply as a mold for a patterned alignment film for three-dimensional display in the first mode). FIGS. 5(a) and 5(b) are schematic views showing an exemplary patterned retardation film including an alignment film produced in the first mode. As shown in FIG. 5(a), the patterned retardation film 60 includes a transparent film substrate 7, an alignment film 8 formed on the transparent film substrate 7, and a retardation layer 9 formed on the alignment film 8. In the patterned retardation film 60, the surface area of the alignment film 8 comprise first alignment regions 8A, each having fine linear three-dimensional structures capable of aligning a rod-like compound 10 in one direction, and second alignment regions 8B, each having fine linear three-dimensional structures capable of aligning the rod-like compound 10 in a direction perpendicular to the alignment direction of the compound in the first alignment regions 8A. The first alignment regions 8A and the second alignment regions 8B are arranged in a stripe pattern in the surface of the alignment film 8, and correspond to the first layer and the second layer of a mold for a patterned alignment film for three-dimensional display in the first mode. As illustrated in FIG. 5(b), in the patterned retardation film 60 (60A), the retardation layer 9 consists of first retardation regions 9A and second retardation regions 9B, where their slow axis directions are perpendicular to each other, formed in the same pattern as the pattern in which the first alignment regions 8A and the second alignment regions 8B are formed.

As described above, the mold production method in the first mode of this embodiment includes the first and second three-dimensional structure forming steps to form fine linear three-dimensional structures in the entire surfaces of the first layer and the second layer, and the later second layer removing step to etch away only the second layer. Such a process can easily form the fine linear three-dimensional structures and, when forming the fine linear three-dimensional structures in the surface of the second layer, can prevent damage to the surface of the first layer having the fine linear three-dimensional structures formed in a different direction from that of the second-layer three-dimensional structures. A resist is formed in a parallel stripe pattern on the surface of the second layer in the resist forming step, and only the exposed portions of the second layer are selectively removed in the second layer removing step. Such steps can effectively produce a mold for a patterned alignment film for three-dimensional display, including the first layer having the first-layer fine linear three-dimensional structures, and the second layer having the second-layer fine linear three-dimensional structures which are formed in a direction different from that of the first-layer three-dimensional structures.

The use of such a mold, having the first-layer and second-layer fine linear three-dimensional structures formed in different directions in the surfaces of the first and second layers, can produce an alignment film having fine linear three-dimensional structures in the surface of each first alignment region and also having fine linear three-dimensional structures in the surface of each second alignment region, with the former and latter three-dimensional structures being formed in different directions. The alignment film constitutes a patterned retardation film and functions to align a rod-like compound contained in the retardation layer. Thus, when an alignment film is produced by using a mold for a patterned alignment film for three-dimensional display according to the present invention, the fine linear three-dimensional structures, formed in different directions in the first alignment regions and in the second alignment regions, of the alignment film can regulate (control) the alignment of a rod-like compound contained in the retardation layer of a patterned retardation film including the alignment film. Thus, because of the difference in the direction (longitudinal direction) between the fine linear three-dimensional structures formed in the surface of the first layer and the fine linear three-dimensional structures formed in the surface of the second layer in the mold in the first mode of this embodiment, an alignment film can be produced which has fine linear three-dimensional structures in each first alignment region and also has fine linear three-dimensional structures, formed in a different direction, in each second alignment region. The use of the alignment film can produce a patterned retardation film which exhibits retardation values that differ by a value corresponding to the difference in the direction between the fine linear three-dimensional structures of the first alignment regions and the fine linear three-dimensional structures of the second alignment regions.

A conventional patterned retardation film has the problem of disorder in the alignment direction of a rod-like compound at the boundary between each first alignment region and each second alignment region, because the rod-like compound is aligned in different directions in the first and second alignment regions. On the other hand, in a mold for a patterned alignment film for three-dimensional display in the first mode of this embodiment, the level of the surface of the first layer differs from the level of the surface of the second layer, i.e. the thickness of the mold differs between the portions with the second layer and the portions without the second layer. Accordingly, an alignment film, in which the level of the first alignment regions differs from the level of the second alignment regions, can be obtained. By thus distinguishing the boundaries between the first alignment regions and the second alignment regions, defective alignment of liquid crystal molecules, which is likely to occur around the boundaries between the first and second alignment regions, can be prevented. This can prevent leakage of light from the boundary areas. It therefore becomes possible to produce a high-quality alignment film which, when used in a display, can prevent a lowering of contrast.

The method for producing a mold for a patterned alignment film for three-dimensional display in the first mode of this embodiment includes a first layer forming step, a first three-dimensional structure forming step, a second layer forming step, a second three-dimensional structure forming step, a resist forming step, a second layer removing step, and a resist removing step.

The respective steps of the method for producing a mold for a patterned alignment film for three-dimensional display in the first mode will now be described in detail.

1. First Layer Forming Step (First Layer Preparation Step)

The first layer forming step is the step of forming the first layer 1 composed of a metal material or an inorganic material, as illustrated in FIG. 1(a). The first layer 1 may be formed as a single layer, or formed on the surface of an underlayer. In the first mode, the first layer 1 is preferably formed on an underlayer. This facilitates the production of a roll mold for a patterned alignment film for three-dimensional display and, in addition, facilitates imparting smoothness to the surface of the first layer. The step 1 can be divided into an underlayer preparation step and a first layer forming step as described below.

(1) Underlayer Preparation Step

The underlayer preparation step is the step of preparing a layer which is composed of a metal material or an inorganic material and which is to underlie the first layer. Though the mold for a patterned alignment film for three-dimensional display in the first mode may or may not have an underlayer, it preferably has an underlayer.

Any metal material or organic material may be used for the underlayer as long as it has good adhesion to the first layer formed on the underlayer. Examples of the metal material include chromium, nickel, stainless steel (SUS), copper, aluminum, etc. Of these, aluminum is preferred. Examples of the inorganic material include metal oxides such as titanium oxide ($TiO_2$, $Ti_3O_5$), tantalum oxide ($Ta_2O_5$), silicon oxide (SiO, $SiO_2$), tin oxide ($SnO_2$), aluminum oxide ($Al_2O_3$), chromium oxide ($Cr_2O_3$), barium titanate ($BaTiO_3$), indium oxide ($In_2O_3$) and zinc oxide (ZnO, $ZnO_2$), carbides such as TiC, SiC, BC and WC, nitrides such as TiN, SiN, CrN, BN, AlN, CN and ZrN, barium fluoride ($BaF_2$), magnesium fluoride ($MgF_2$), magnesium oxide (MgO), diamond-like carbon (DLC), glassy carbon, ceramics, silicon nitride, carbon nitride, etc. Of these, diamond-like carbon, carbides such as TiC, SiC, BC and WC, and nitrides such as TiN, SiN, CrN, BN, AlN, CN and ZrN are preferred. These inorganic materials have a relatively high hardness, and therefore enable high-accuracy formation of the first three-dimensional structures.

The underlayer may have, for example, a plate-like shape or a roll-like shape, preferably a roll-like shape. Thus, the mold for a patterned alignment film for three-dimensional display in the first mode preferably has a roll-like shape or is a roll mold. When a roll mold is used, shaping of an alignment film-forming layer can be performed in a continuous manner while rotating the roll mold. The use of a roll mold can thus produce an alignment film with ease, in large quantities and with high efficiency.

Any "roll-like" shape may be used as long as it can stably form an alignment film. Thus, the roll-like underlayer may, for example, have the shape of a roll, a sleeve, or the like, preferably the shape of a sleeve. The use of a mold for a patterned alignment film for three-dimensional display in the first mode, having the shape of a sleeve, can produce a patterned alignment film with high efficiency. Furthermore, a sleeve-shaped mold has the advantages of lighter weight and easier handling over a roll-shaped mold. The "roll shape" includes a roll with a shaft, a pipe without a shaft, or the like. The "pipe without a shaft" herein refers to a cylindrical shape having a thickness of not less than 3000 μm. The "sleeve shape" herein refers to a seamless cylindrical body having a thickness of not more than 1000, which can be easily deformed by air pressure or a stress. When the underlayer has a roll-like shape, such as a roll shape or a sleeve shape, the underlayer is preferably seamless. However, it is also possible to use a seamed roll-like underlayer prepared by rolling plate-like underlayers into a cylindrical shape.

In the case where the below-described first layer is laminated to the underlayer, the underlayer preferably has excellent surface smoothness. If the surface smoothness of the underlayer is poor, the poor surface smoothness can adversely affect the surface smoothness of the first layer, making it difficult to form linear three-dimensional structures with high accuracy in the surface of the first layer. Especially when the first layer is a DCL layer, the first layer is likely to be affected by the surface roughness of the underlayer because the DLC layer is generally relatively thin.

Any method can be used to impart surface smoothness to the underlayer as long as a desired level of smoothness can be obtained. For example, a cutting method, such as supermirror polishing, may be used.

Though the surface roughness (Ra) of the underlayer is not particularly limited unless it adversely affects the surface of the first layer, it is preferably not more than 10000 nm, more preferably not more than 5000 nm, most preferably not more than 1000 nm. The "surface roughness (Ra)" herein refers to "arithmetic mean surface roughness" as measured according to JIS-B0601.

(2) First Layer Forming Step

In the case where the underlayer is used, the first layer forming step is the step of forming a first layer, composed of a metal material or an inorganic material, on the underlayer. In the case where no underlayer is used, on the other hand, the first layer forming step is the step of preparing a first layer composed of a metal material or an inorganic material.

The following description will be given with reference to the case of using the underlayer and to the case of using no underlayer.

(a) In the Case where the Underlayer is Used:

In the case where the mold for a patterned alignment film for three-dimensional display in the first mode has the underlayer, the first layer is formed on the surface of the above-described underlayer.

Any method can be used as a first layer forming method as long as it can form the first layer, composed of a metal material or an inorganic material, on the underlayer. For example, wet plating or dry plating may be used. Examples of wet plating include electroplating, electroless plating, molten zinc plating, molten aluminum plating, plating with an insoluble anode, etc. Examples of dry plating include a physical vapor deposition method (PVD method) such as vacuum deposition plating, resistance heating, sputtering or ion plating; and a chemical vapor deposition method (CVD method) such as atmospheric pressure thermal CVD, reduced pressure thermal CVD or plasma CVD.

The metal material or inorganic material for the first layer, which is formed by such a method on the surface of the underlayer, is not particularly limited if it has desired adhesion to the underlayer and has a resistance to an etching solution which is used to remove a second layer from the first layer in the below-described second layer removing step and, in addition, if fine linear three-dimensional structures can be formed in the surface of the first layer in the below-described first three-dimensional structure forming step. Specifically, the same materials as described above with reference to the underlayer may be used for the first layer. Among them, nickel, chromium, copper, stainless steel (SUS), diamond-like carbon (DLC) and aluminum are preferred. Of these, nickel, chromium and DLC are preferred, and DLC is particularly preferred. Because of the high hardness, DLC enables high-accuracy formation of fine linear three-dimensional structures in the surface.

The material for the underlayer and the material for the first layer may be the same or different. When using different materials for the underlayer and the first layer, it is preferred to use the combination of chromium/DLC or nickel/DLC as the materials for the underlayer/the first layer from the viewpoint of obtaining desired adhesion between the layers.

When using aluminum for the underlayer and DLC for the first layer, it is preferred to provide a layer of chromium or nickel between the underlayer and the first layer. This can increase adhesion between the aluminum layer and the DLC layer.

The first layer preferably has excellent surface smoothness. If the surface smoothness of the first layer is poor, it is sometimes difficult to form fine linear three-dimensional structures with high accuracy in the surface of the first layer in the below-described first three-dimensional structure forming step. Any method can be used to impart surface smoothness to the first layer as long as a desired level of smoothness can be obtained. For example, a cutting method, such as supermirror polishing, may be used.

Though the surface roughness (Ra) of the first layer is not particularly limited if fine linear three-dimensional structures can be formed with high accuracy in the surface of the first layer in the below-described first three-dimensional structure forming step, it is preferably not more than 10000 nm, more preferably not more than 5000 nm, most preferably not more than 1000 nm. The "surface roughness (Ra)" herein refers to "arithmetic mean surface roughness" as measured according to JIS-B0601.

Though the thickness of the first layer is not particularly limited if linear three-dimensional structures can be formed in the below-described first three-dimensional structure forming step, it is preferably in the range of 1 nm to 5000 μm, more preferably in the range of 10 nm to 1000 μm, most preferably in the range of 50 nm to 5 μm. The thickness of the first layer herein refers to the sum of the thickness of the first layer and the thickness of the underlayer.

(b) In the Case where No Underlayer is Used:

In the case where the mold for a patterned alignment film for three-dimensional display in the first mode has no underlayer, the first layer forming step in the first embodiment is the step of preparing a first layer composed of a metal material or an inorganic material.

The metal material or inorganic material for the first layer is not particularly limited if it has a resistance to an etching solution which is used to remove a second layer from the first layer in the below-described second layer removing step and, in addition, if fine linear three-dimensional structures can be formed in the surface of the first layer in the below-described first three-dimensional structure forming step. Specifically, the same materials as described above with reference to the underlayer may be used for the first layer. Among them, nickel, chromium, copper, stainless steel (SUS), diamond-like carbon (DLC) and aluminum are preferred. Of these, nickel, chromium and DLC are preferred, and DLC is particularly preferred. Because of the high hardness, DLC enables high-precision formation of fine linear three-dimensional structures in the surface.

The shape of the first layer is not particularly limited if fine linear three-dimensional structures can be formed in an approximately constant direction in the surface of the first layer. For example, the first layer may have a plate-like shape or a roll-like shape, preferably a roll-like shape. Further, the first layer may be the same shape as described above under the heading "(1) Underlayer preparation step", and therefore a description thereof is omitted.

The first layer preferably has excellent surface smoothness. If the surface smoothness of the first layer is poor, it is sometimes difficult to form fine linear three-dimensional structures with high accuracy in the surface of the first layer in the below-described first three-dimensional structure forming step. The first layer may have the same surface roughness (Ra) as described above under the heading "(a) In the case where the underlayer is used", and therefore a description thereof is omitted.

The thickness of the first layer is not particularly limited if linear three-dimensional structures can be formed in the surface of the first layer in the below-described first three-dimensional structure forming step, and if the first layer is self-supportable.

2. First Three-dimensional Structure Forming Step

The first three-dimensional structure forming step in the first mode of this embodiment is the step of forming fine linear three-dimensional structures 11 in the surface of the first layer 1, composed of a metal material or an inorganic material, in an approximately constant direction, as shown in FIG. 1(b).

Any method can be used to form the fine three-dimensional structures 11 as long as it can form fine linear three-dimensional structures of a desired size in a desired direction. For example, it is possible to use a cutting method which involves polishing the surface of the first layer, or a roll pressing method which involves pressing a mold having a three-dimensional pattern against the surface of the first layer. Cutting and roll pressing will now be described.

(1) Cutting

"Cutting" as used in this step is a machining process which involves polishing of the surface of the first layer to form the intended three-dimensional structures. Any common cutting method may be used in this step. Examples may include abrasive polishing, paper polishing, tape polishing, a blasting method such as sandblasting, shot blasting, grit blasting or glass bead blasting, a brush graining method using a brush member composed of fibers of a synthetic resin such as nylon, polypropylene or vinyl chloride, nonwoven fabric, animal hair or steel wires, a wire graining method using a metal wire, a method (brush graining method) which comprises brush-polishing the surface of the first layer while supplying a slurry containing abrasive particles, a ball graining method, a buff polishing method such as liquid honing, a shot peening method, etc. Of these, tape polishing and paper polishing are preferred because of easy control of the direction of the fine linear three-dimensional structures.

(2) Roll Pressing

"Roll pressing" as used in this step is a roll machining process which involves pressing a rotary roller having a three-dimensional pattern against the surface of the first layer to mold the intended three-dimensional structures in the surface. During the roll pressing process, a molding object is allowed to pass the rotary roller a number of times in a roll pressing machine so as to mold three-dimensional structures in the surface of the molding object.

Figure 6:
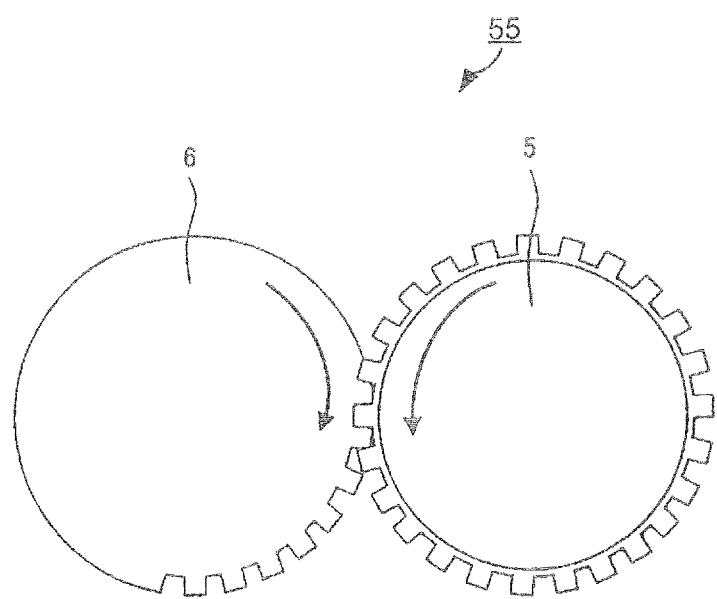
FIG. 6 is a schematic view illustrating roll pressing.

FIG. 6 is a schematic view illustrating roll pressing. As illustrated in FIG. 6, a roll pressing machine 55 includes a rotary roller 5 having a three-dimensional pattern which is to make contact with a molding object 6. When rotating the rotary roller 5, the three-dimensional pattern of the rotary roller 5 is pressed against the molding object 6.

Thus, in roll pressing, a three-dimensional pattern formed in a rotary roller functions as a mold: when the rotary roller is rotated while it is kept in contact with a molding object, the molding object is machined not by cutting, but by deformation due to pressing of the roller on the object.

Such roll pressing enables constant position/constant pressure pressing, making it possible to equalize the thickness of a molded product and to produce the product in an intermittent/continuous manner.

With reference to a three-dimensional pattern formed in the surface of a rotary roller for use in roll pressing, the cross-sectional shape, height, width and pitch of the pattern are the same as the height, width and pitch of the below-described fine linear three-dimensional structures, and therefore a description thereof is omitted.

(3) Fine Linear Three-dimensional Structures

Figure 7:
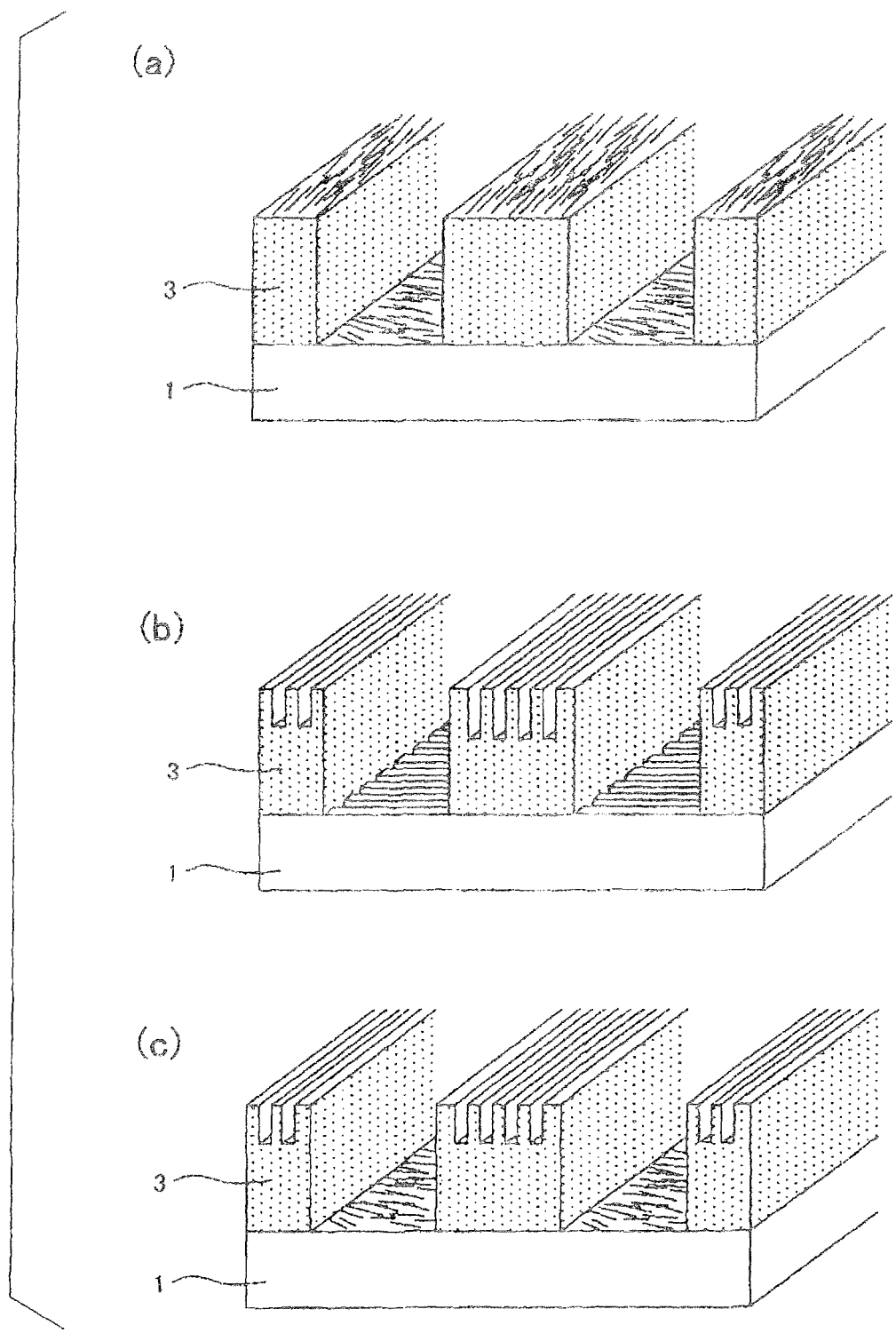
FIG. 7 shows schematic perspective views illustrating exemplary fine linear three-dimensional structures formed in the surfaces of a first layer and a second layer.

The fine linear three-dimensional structures in the first mode of this embodiment are not particularly limited as long as the use of the mold for a patterned alignment film for three-dimensional display can produce a pattered alignment film which is capable of producing a high-quality patterned retardation film. The fine linear three-dimensional structures may be formed in a random pattern or in a stripe pattern or in a combination of such patterns. FIG. 7(a) illustrates fine linear three-dimensional structures formed in a random pattern in an approximately constant direction, FIG. 7(b) illustrates fine linear three-dimensional structures formed in a stripe pattern in an approximately constant direction, and FIG. 7(C) illustrates fine linear three-dimensional structures formed in a combination of such patterns.

The "fine linear three-dimensional structures formed in a random pattern in an approximately constant direction" herein are, for example, fine scratch-like structures extending in an approximately constant direction as formed e.g. by rubbing of the surface. On the other hand, the "fine linear three-dimensional structures formed in a stripe pattern in an approximately constant direction" refer to a stripe pattern of wall-like raised portions formed at regular intervals. The stripe pattern of three-dimensional structures each have a larger size than each of the random pattern of three-dimensional structures, and do not include fine scratch-like structures as formed e.g. by rubbing of the surface.

In the first mode of this embodiment, the pattern of the fine linear three-dimensional structures formed in the surface of the first layer may be the same as or different from the pattern of the fine linear three-dimensional structures formed in the surface of the below-described second layer.

When the fine linear three-dimensional structures in the first mode are of a stripe pattern, the cross-sectional shape of the structures is not particularly limited if an alignment film, to be produced by using the mold for a patterned alignment film for three-dimensional display in the first mode, can align a liquid crystal compound in a predetermined direction by the three-dimensional structures formed in the alignment film. For example, the stripe pattern of fine linear three-dimensional structures may each have a generally rectangular, triangular or trapezoidal cross-sectional shape. The cross-sectional shape of each structure may not necessarily be constant.

Figure 8:
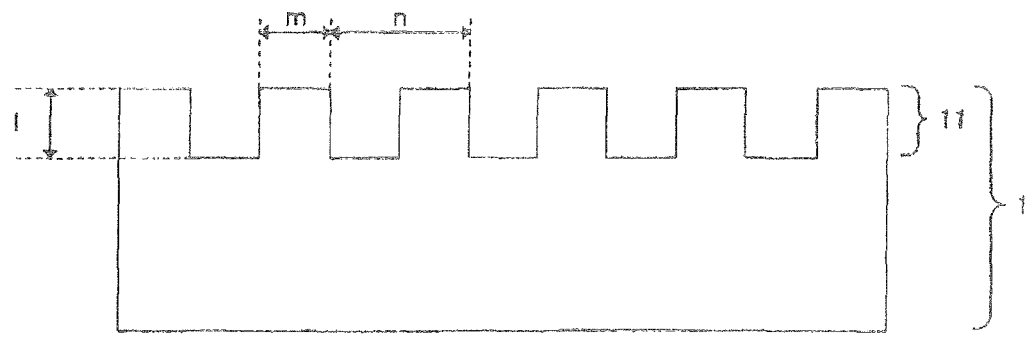
FIG. 8 is a diagram illustrating fine linear three-dimensional structures.

The height l, the width m and the pitch n of the fine linear three-dimensional structures 11 in the first mode, as shown in FIG. 8, are not particularly limited if an alignment film, to be produced by using the mold for a patterned alignment film for three-dimensional display in the first mode, can align a liquid crystal compound in a predetermined direction by the three-dimensional structures formed in the alignment film. In the case of a stripe pattern of fine linear three-dimensional structures, the height l of each linear three-dimensional structure 11 is preferably in the range of 1 nm to 500 nm, more preferably in the range of 1 nm to 100 nm, most preferably in the range of 1 nm to 50 nm.

In the case of a stripe pattern of fine linear three-dimensional structures, the width m of each linear three-dimensional structure 11 is preferably in the range of 1 nm to 1000 nm, more preferably in the range of 1 nm to 500 nm, most preferably in the range of 1 nm to 100 nm.

In the case of a stripe pattern of fine linear three-dimensional structures, the pitch n of the linear three-dimensional structures 11 may not necessarily be constant; however, it is preferably in the range of about 1 nm to 1000 nm, more preferably in the range of 1 nm to 100 nm.

In the case of a stripe pattern of fine linear three-dimensional structures, the use of the above dimensions can stably align a liquid crystal compound.

To reduce crosstalk between a right-eye image and a left-eye image in three-dimensional display so as to generate a good-quality three-dimensional image, the angular distribution of the running directions of fine linear three-dimensional structures 11 (corresponding to the angular distribution of the alignment directions of liquid crystal molecules and to the angular distribution of the slow axes of a patterned retardation layer to be obtained) in a plane parallel to the mold surface is made not more than three degrees, preferably not more than one degree. The angular distribution is determined by the triple standard deviation ($3\sigma$) of a number of (generally at least 10) measurement values of the running directions.

FIG. 8 illustrates the fine linear three-dimensional structures 11 in the case where each structure has a rectangular cross-sectional shape.

3. Second Layer Forming Step

As illustrated in FIG. 1(c), the second layer forming step in the first mode of this embodiment is the step of forming the second layer 3, composed of a metal material or an inorganic material, after the first three-dimensional structure forming step.

Any method can be used as a second layer forming method as long as it can form the second layer, composed of a metal material or an inorganic material, with high accuracy. For example, dry plating or wet plating may be used.

When the second layer is composed of a metal material, the second layer can be formed by dry plating or wet plating. Examples of dry plating, to be used for forming the second layer composed of a metal material, include a physical vapor deposition method (PVD method) such as vacuum deposition plating, a resistance heating method, sputtering or ion plating. Examples of wet plating include electroplating, electroless plating, molten zinc plating, molten aluminum plating, plating with an insoluble anode, etc. When forming the second layer by wet plating, a metal material is selected for the first layer.

When the second layer is composed of an inorganic material, the second layer can be formed by dry plating. Examples of dry plating include a physical vapor deposition method (PVD method) such as vacuum deposition plating, a resistance heating method, sputtering or ion plating; and a chemical vapor deposition method (CVD method) such as atmospheric pressure thermal CVD or reduced pressure thermal CVD.

The metal material or inorganic material for the second layer is preferably one which enables the second layer to be stably laminated to the first layer. An etching solution is used in the below-described second layer removing step in order to selectively remove the second layer that remains exposed after the formation of a resist. Therefore, the material of the second layer is preferably one which facilitates selective removal of the second layer with the etching solution.

Specific examples of the material for the second layer include: metal materials such as nickel, copper, aluminum, tin, chromium, stainless steel (SUS), iron, etc.; inorganic oxides such as $SiO_2$, $SiOx$, $Al_2O_3$, $GeO_2$, $TiO_2$, $Cr_2O_3$, $ZrO_3$, $Ta_2O_5$, $Nb_2O_3$, etc.; inorganic nitrides such as $Si_3N_4$, $AlN$, $TiN$, $TiCN$, etc.; inorganic oxynitrides such as $SiO_xN_y$; inorganic carbides such as $SiC$; and diamond-like carbon (DLC). Of these, metal materials, inorganic oxynitrides and inorganic carbides are preferred, and TiN is particularly preferred. The use of such a preferable material can easily form the second layer on the first layer, can easily form fine linear three-dimensional structures in the surface of the second layer and, in addition, can selectively remove the second layer with an etching solution in the below-described second layer removing step.

The material for the second layer preferably differs from the material for the first layer so that the second layer can be selectively removed off by using an etching solution in the below-described second layer removing step.

It is preferred to use the material for the second layer and the material for the first layer in such a combination as to achieve desired adhesion between the first and second layers, and to make the first layer resistant to an etching solution to be used in the second layer removing step. For example, it is preferred to use the combination of DLC/Ti, DLC/TiN or $Cr_2O_3$/TiN as the materials for the second layer/the first layer.

The second layer preferably has excellent surface smoothness. If the surface smoothness of the second layer is poor, it is sometimes difficult to form fine linear three-dimensional structures with high accuracy in the surface of the second layer in the below-described second three-dimensional structure forming step. Any method can be used to impart surface smoothness to the second layer as long as a desired level of smoothness can be obtained. For example, a cutting method, such as supermirror polishing, may be used.

Though the surface roughness (Ra) of the second layer is not particularly limited if fine linear three-dimensional structures can be formed with high accuracy in the surface of the second layer in the below-described second three-dimensional structure forming step, it is preferably not more than 10000 nm, more preferably not more than 5000 nm, most preferably not more than 1000 nm. The "surface roughness (Ra)" herein refers to "arithmetic mean surface roughness" as measured according to JIS-B0601.

The thickness of the second layer, i.e. the level difference between the first layer and the second layer, is preferably in the range of 10 nm to 5 μm, more preferably in the range of 50 nm to 1 μm. When the level difference is in the above range, an alignment film, to be formed by using the mold for a patterned alignment film for three-dimensional display in the first mode, can effectively prevent disorder in alignment of a liquid crystal compound from occurring around the boundaries between the first alignment regions and the second alignment regions of the alignment film, corresponding to the first layer and the second layer, respectively.

The thickness of the second layer refers to the distance D1 shown in FIG. 4. As shown in FIG. 4, the thickness of the second layer includes the fine linear three-dimensional structures 11, 31 formed in the surface. The thickness of the second layer, having the fine linear three-dimensional structures formed in the surface, refers to the distance D1 shown in FIG. 4. The distance D1 refers to the average value of the distance from the surface of the first layer to the raised portions of the fine linear three-dimensional structures formed in the surface of the second layer and the distance from the surface of the first layer to the recessed portions of the fine linear three-dimensional structures formed in the surface of the second layer. The level of the surface of the first layer (reference point for the measurement of the thickness of the second layer) is determined by calculating the average of the level of the raised portions and the level of the recessed portions in the fine linear three-dimensional structures formed in the surface of the first layer. The reference numerals in FIG. 4 indicate the same elements or components as those of FIG. 1, and therefore a description thereof is omitted.

4. Second Three-dimensional Structure Forming Step

The second three-dimensional structure forming step in the first mode of this embodiment is the step of forming fine linear three-dimensional structures 31 in the surface of the second layer 3 formed on the first layer 1, as shown in FIG. 1(d).

Any method can be used to form the fine linear three-dimensional structures as long as it can form the linear three-dimensional structures of a desired size in a desired direction. For example, it is possible to use a cutting method which involves polishing the surface of the second layer, or a roll pressing method which involves pressing a mold having a three-dimensional pattern against the surface of the second layer. Further, the same method as described above under the heading "2. First three-dimensional structure forming step", a duplicate description of which is omitted, can be used to form the fine linear three-dimensional structures in the second three-dimensional structure forming step.

Figure 5:
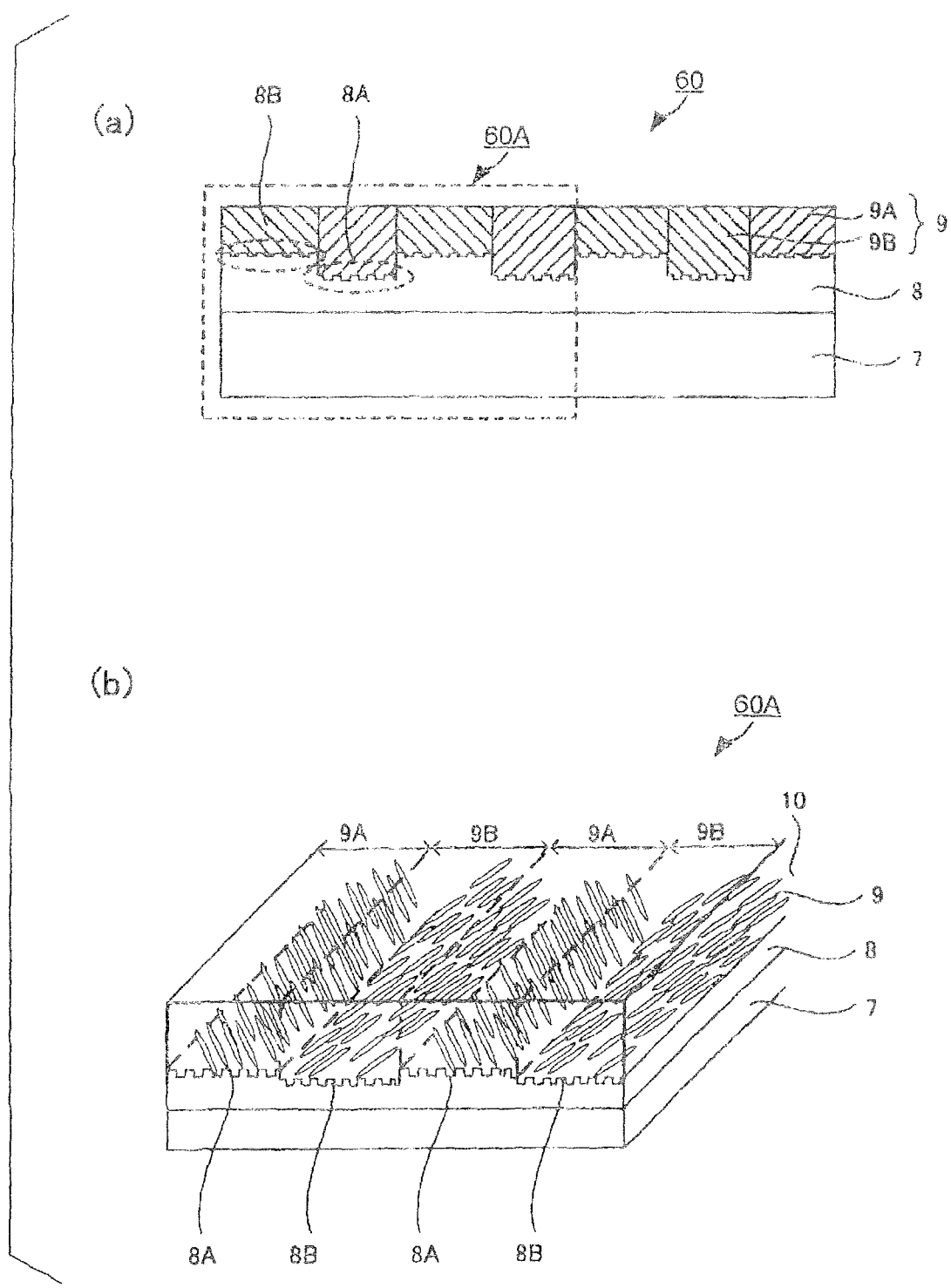
FIG. 5 shows schematic views illustrating an exemplary patterned retardation film using an alignment film obtained by the use of a mold for a patterned alignment film for three-dimensional display.

The direction in which the fine linear three-dimensional structures in the first mode of this embodiment is formed is not particularly limited as long as the direction differs between the surface of the first layer and the surface of the second layer in the mold for a patterned alignment film for three-dimensional display in the first mode. In particular, as shown in FIG. 5, it is preferred in the first mode of this embodiment that the first alignment regions 8A and the second alignment regions 8B of the alignment film 8, produced by using the mold for a patterned alignment film for three-dimensional display, can each align the rod-like compound 10 in the retardation layer 9 along the direction in which the fine linear three-dimensional structures are formed. This makes it possible to produce a patterned retardation film capable of three-dimensional display by using the alignment film. FIG. 5 shows the case where the difference in the longitudinal direction of the fine linear three-dimensional structures between the first alignment regions 8A and the second alignment regions 8B is 90°. Thus, when a patterned retardation film is produced, the patterned retardation film preferably has retardation values which differ by a value corresponding to the difference in the longitudinal direction of the fine linear three-dimensional structures between the first layer and the second layer in the mold for a patterned alignment film for three-dimensional display in the first mode. In particular, the direction of the fine linear three-dimensional structures formed in the surface of the second layer may differ by 90° or 45° from the direction of the fine linear three-dimensional structures which have been formed in the surface of the first layer in the above-described first three-dimensional structure forming step. The respective cases will now be described.

(1) When the Difference is 90°:

In this case, the longitudinal direction of the fine linear three-dimensional structures differs by 90° between the surface of the first layer and the surface of the second layer.

The direction of the fine linear three-dimensional structures is not particularly limited as long as the direction differs by 90° between the surface of the first layer and the surface of the second layer. For example, when the mold for a patterned alignment film for three-dimensional display is a roll mold, the direction of the first-layer fine linear three-dimensional structures and the direction of the second-layer fine linear three-dimensional structures are preferably 45°/135° or 0°/90° (first layer/second layer) with respect to the direction of rotation of the roll mold.

When the direction of the first-layer fine linear three-dimensional structures and the direction of the second-layer fine linear three-dimensional structures are orthogonal to each other, an alignment film, produced by using the mold having such fine linear three-dimensional structures, has the following advantages: By designing the first retardation regions and the second retardation regions, formed on the first alignment regions and the second alignment regions of the alignment film, of a patterned retardation film to have an in-plane retardation of λ/4, linearly polarized light, when passing through the first and second retardation regions, turns into right circularly polarized light and left circularly polarized light, respectively. The patterned retardation film can therefore be used advantageously to easily produce a display device capable of three-dimensional display.

Figure 9:
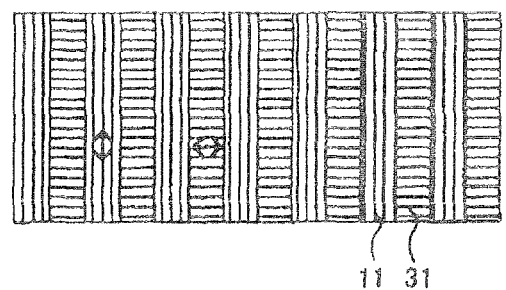
FIG. 9 is a diagram illustrating fine linear three-dimensional structures.

FIG. 3 shows the surface of a roll mold in which the direction of the fine linear three-dimensional structures 11 formed in the surface of the first layer and the direction of the fine linear three-dimensional structures 31 formed in the surface of the second layer are 45° and 135°, respectively; and FIG. 9 shows the surface of a roll mold in which the direction of the fine linear three-dimensional structures 11 and the direction of the fine linear three-dimensional structures 31 are 0° and 90°, respectively.

The reference numerals in FIG. 9 indicate the same elements or components as those of FIG. 3, and therefore a description thereof is omitted.

The in-plane retardation (Re) value is an index of the degree of the birefringence of a refractive-index anisotropic body in the in-plane direction, and is represented by the following formula:

$$Re\ [\text{nm}] = (Nx - Ny) \times d\ [\text{nm}]$$

where Nx represents the refractive index of the refractive-index anisotropic body in the slow axis direction in which the refractive index is maximum in the in-plane direction, Ny represents the refractive index in the fast axis direction perpendicular to the slow axis direction, and d represents the thickness of the refractive-index anisotropic body in a direction perpendicular to the in-plane direction.

The in-plane retardation value (Re value) can be measured by a parallel Nicol rotation method using, for example, KOBRA-WR manufactured by Oji Scientific Instruments. The in-plane retardation value in a small region can be measured by using the Muller matrix and using AxoScan manufactured by Axometrics Inc. (USA). An Re value herein refers to a value at a wavelength of 589 nm, unless otherwise specified.

With reference to the fine linear three-dimensional structures formed in the surface of the second layer in this case, the cross-sectional shape, height, width and pitch of the structures and a method for the production of the structures may be the same as those described above under the heading "2. First three-dimensional structure forming step", and therefore a description thereof is omitted.

(2) When the Difference is 45°:

In this case, the longitudinal direction of the fine linear three-dimensional structures differs by 45° between the surface of the first layer and the surface of the second layer.

The direction of the fine linear three-dimensional structures is not particularly limited as long as the direction differs by 45° between the surface of the first layer and the surface of the second layer. For example, in the case of a roll mold, the direction of the first-layer fine linear three-dimensional structures and the direction of the second-layer fine linear three-dimensional structures are preferably 0°/45° or 180°/135° (first layer/second layer) with respect to the direction of rotation of the roll mold.

When the direction of the first-layer fine linear three-dimensional structures and the direction of the second-layer fine linear three-dimensional structures differ by 45°, an alignment film, produced by using the mold having such fine linear three-dimensional structures, has the following advantages: By designing the first retardation regions and the second retardation regions, formed on the first alignment regions and the second alignment regions of the alignment film, of a patterned retardation film to have an in-plane retardation value corresponding to $\lambda/2$, and by using a $\lambda/4$ plate in combination, the patterned retardation film can be advantageously used to easily produce a three-dimensional display device.

Figure 10:
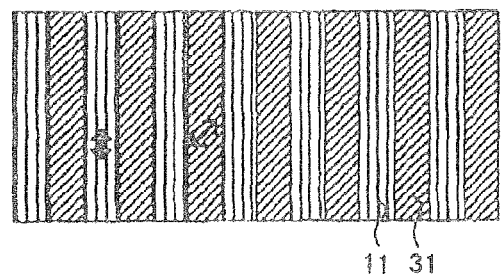
FIG. 10 is a diagram illustrating fine linear three-dimensional structures.
Figure 11:
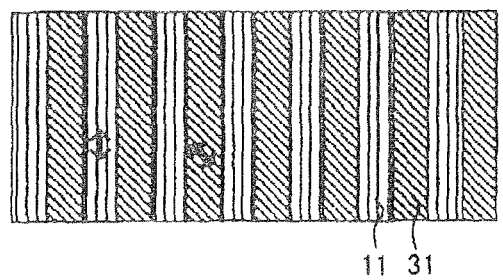
FIG. 11 is a diagram illustrating fine linear three-dimensional structures.

FIG. 10 shows the surface of a roll mold in which the direction of the fine linear three-dimensional structures 11 formed in the surface of the first layer and the direction of the fine linear three-dimensional structures 31 formed in the surface of the second layer are 0° and 45°, respectively; and FIG. 11 shows the surface of a roll mold in which the direction of the fine linear three-dimensional structures 11 and the direction of the fine linear three-dimensional structures 31 are 180° and 135°, respectively.

The reference numerals in FIGS. 10 and 11 indicate the same elements or components as those of FIG. 3, and therefore a description thereof is omitted. In the figures, the arrows each indicate the direction in which the fine linear three-dimensional structures are formed.

Figure 12:
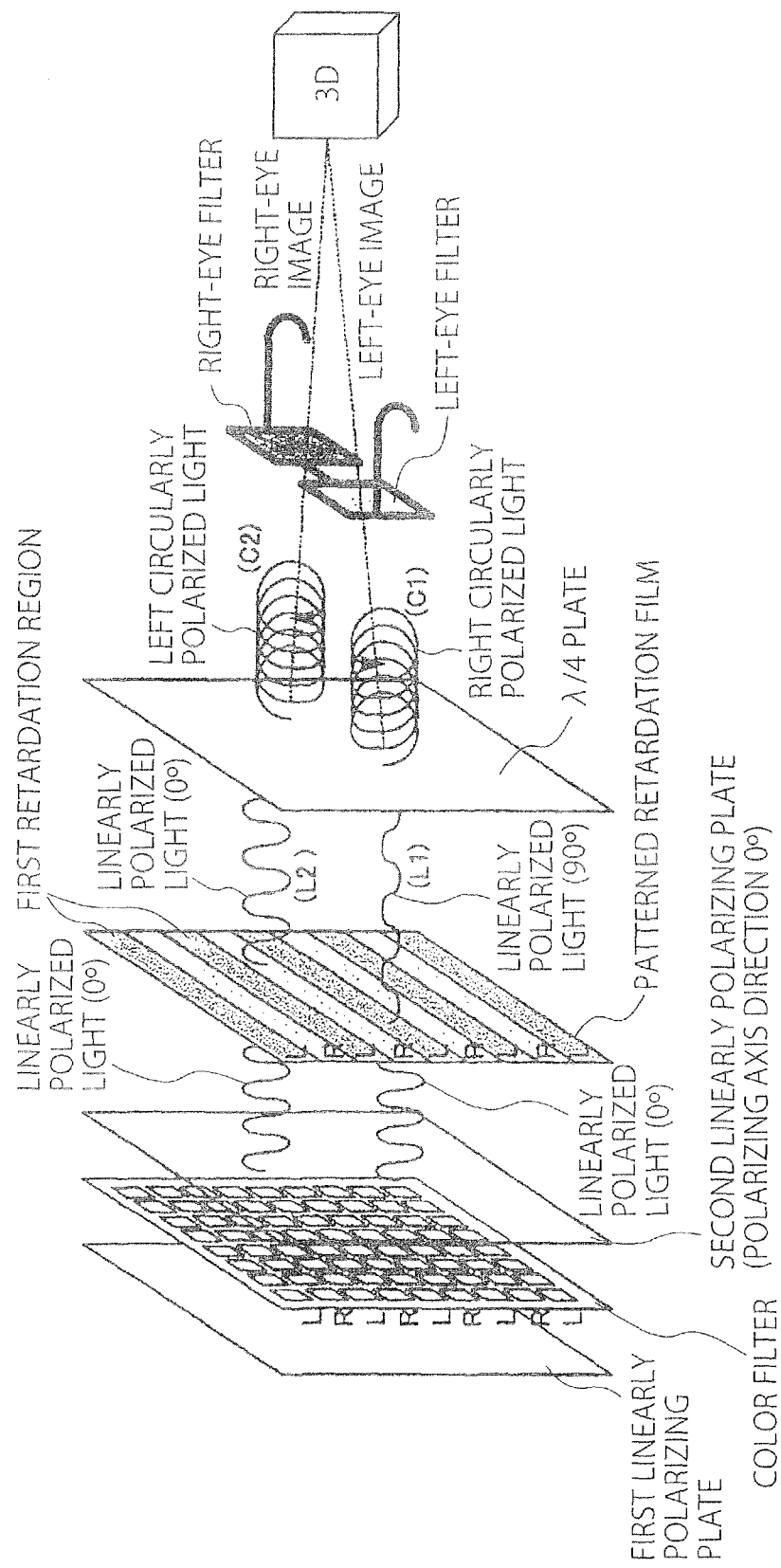
FIG. 12 is a diagram illustrating a patterned retardation film using a patterned alignment film produced by the use of a mold.

The fact that a display device capable of three-dimensional display can be easily produced by using the combination of a $\lambda/4$ plate and a patterned retardation film having such retardation regions will now be described in greater detail. FIG. 12 is a schematic view of a liquid crystal display device capable of three-dimensional display, produced by using the combination of a $\lambda/4$ plate and a patterned retardation film produced by the use of a mold as produced by the production method of the present invention. As illustrated in FIG. 12, the liquid crystal display device, which uses the combination of a $\lambda/4$ plate and a patterned retardation film produced by the use of a mold as produced by the production method of the present invention, can display three-dimensional images by the passive method. The principle is as follows:

The pixels of a light-emitting display are divided patternwise into two groups, right-eye image display pixels and left-eye image display pixels; the former group of pixels is caused to display a right-eye image, while the latter group of pixels is caused to display a left-eye image. A patterned retardation film is prepared which has a retardation layer consisting of first retardation regions formed in a pattern corresponding to the pattern of the left-eye image display pixels and second retardation regions formed in a pattern corresponding to the pattern of the right-eye image display pixels. The patterned retardation film is disposed on the display surface side of a polarizing plate, and a $\lambda/4$ plate is disposed on the display surface side of the patterned retardation film. The slow axis direction of the first retardation regions is made to intersect the polarizing axis direction of the polarizing plate at an angle of 45°. Further, the slow axis direction of the first retardation regions is made parallel or perpendicular to the slow axis direction of the $\lambda/4$ plate. By disposing the patterned retardation film and the $\lambda/4$ plate in this manner, an image displayed by the right-eye image display pixels and an image displayed by the left-eye image display pixels (hereinafter sometimes referred to as "right-eye image" and "left-eye image", respectively) are to be viewed by the viewer in the following manner:

Images displayed by right-eye image display pixels and left-eye image display pixels pass through the polarizing plate, whereby the images are converted into linearly polarized lights. In the display device illustrated in FIG. 12, the polarizing axis direction of the polarizing plate is 0°, and therefore the images that have passed through the polarizing plate are 0°-direction linearly polarized lights. The images, which have been converted into 0°-direction linearly polarized lights, then enter the patterned retardation film. Left-eye images pass through the first retardation regions, while right-eye image pass through the second retardation regions. Accordingly, a left-eye image, when passing through the patterned retardation film, turns into linearly polarized light (L1) with 90° polarizing axis, whereas a right-eye image remains as linearly polarized light (L2) with 0° polarizing axis after passing through the patterned retardation film. The lights L1 and L2 then enter the $\lambda/4$ plate, where the left-eye image is converted into right circularly polarized light (C1) and the right-eye image is converted into left circularly polarized light (C2).

A right-eye image and a left-eye image are thus converted into orthogonal circularly polarized lights when the images pass through the patterned retardation film and the $\lambda/4$ plate. Therefore, when the viewer wears circularly polarizing glasses using orthogonal circularly polarizing lenses as right-eye and left-eye lenses, a right-eye image is allowed to pass through only the right-eye lens and a left-eye image is allowed to pass through only the left-eye lens. Thus, the right-eye image reaches only the right eye and the left-eye image reaches only the left eye, enabling three-dimensional display to the viewer.

With reference to the fine linear three-dimensional structures formed in the surface of the second layer in the present case, the cross-sectional shape, height, width and pitch of the structures and a method for the production of the structures may be the same as those described above under the heading "2. First three-dimensional structure forming step", and therefore a description thereof is omitted.

5. Resist Forming Step

The resist forming step in this embodiment is the step of forming a resist 2 in a parallel stripe pattern on the surface of the second layer 3 after the second three-dimensional structure forming step, as shown in FIG. 1(e).

Any resist material can be used in the resist forming step as long as the material has a resistance to an etching solution to be used in the below-described second layer removing step and, in addition, the resist 2 can be later removed as described below. Either a positive resist material (a light-irradiated portion will dissolve) or a negative resist material (a light-irradiated portion will harden) may be used. A chemically-amplified resist based on a novolac resin, for example, can be used as the positive resist material. The negative resist material may be exemplified by a chemically-amplified resist based on a crosslinked resin, for example, a chemically-amplified resist prepared by adding a crosslinking agent and an acid generator to polyvinyl phenol.

A common coating method can be used to apply such a resist material onto the second layer, thereby forming a resist film. Examples of usable coating methods include spin coating, casting, dipping, bar coating, blade coating, roll coating, gravure coating, flexographic printing, spray coating, etc.

Electron beam lithography or laser lithography, which is generally used in photomask lithography, may be used as a method to expose the resist film in a parallel stripe pattern. It is also possible to use a method which involves ultraviolet irradiation of the resist film with the use of a mask.

In particular, laser lithography is preferred because the method can expose the resist film in a parallel stripe pattern with high accuracy even when the above-described metal substrate has the shape of a roll.

The resist film after exposure can be developed by a common developing method.

In the mold 50 for a patterned alignment film for three-dimensional display, the width W1' of the fine linear three-dimensional structures 11 formed in the surface of the first layer 1 and the width W2' of the fine linear three-dimensional structures 31 formed in the surface of the second layer 3 are defined by the pattern in which the resist is formed.

When the mold 50 for a patterned alignment film for three-dimensional display is a roll mold as shown in FIG. 2, the longitudinal direction of the resist, i.e. the longitudinal direction of the parallel stripe pattern, is preferably parallel to the direction of rotation of the roll mold.

The width W2 of each resist film 2 and the width W1 of the space between adjacent resist films 2 as shown in FIG. 1(e) may be the same or different. However, in this embodiment the width W2 of each resist film 2 is preferably the same as the width W1 of the space between adjacent resist films 2.

In a liquid crystal display device capable of three-dimensional display, a right-eye pixel area and a left-eye pixel area generally have the same width. When the width (W1') of the fine linear three-dimensional structures formed in the surface of the first layer is made equal to the width (W2') of the fine linear three-dimensional structures formed in the surface of the second layer in the mold for a patterned alignment film for three-dimensional display according to the present invention, i.e. when the width W2 of each resist film 2 is made equal to the width W1 of the space between adjacent resist films 2 in FIG. 1(e), the first alignment regions and the second alignment regions, corresponding to the first-layer fine linear three-dimensional structures and the second-layer fine linear three-dimensional structures, respectively, of a patterned alignment film as produced by using the mold according to the present invention, can be made to have the same width. Accordingly, when the patterned alignment film is used in a liquid crystal display device capable of three-dimensional display, the pattern in which the first alignment regions and the second alignment regions are formed can be easily matched with the pattern in which pixels areas are formed in a color filter used in the liquid crystal display device. Thus, a three-dimensional liquid crystal display device can be produced easily by using a patterned alignment film as produced by using the mold for a patterned alignment film for three-dimensional display according to the present invention.

The pixel areas of a light-emitting display device have the same width. Accordingly, when a patterned alignment film, as produced by using the mold according to the present invention and having the first alignment regions and the second alignment regions of the same width, is used in a light-emitting display device capable of three-dimensional display, the pattern in which the first alignment regions and the second alignment regions are formed can be easily matched with the pattern in which the pixel areas are formed in the light-emitting display device. Thus, a light-emitting display device capable of three-dimensional display can be produced easily by using a patterned alignment film as produced by using the mold for a patterned alignment film for three-dimensional display according to the present invention.

With reference to the width W2 of each resist film 2 and the width W1 of the space between adjacent resist films 2, shown in FIG. 1(e) (the width W2' of the second layer 3 and the width W1' of the first layer 1 of the mold 50 for a patterned alignment film for three-dimensional display according to the present invention, shown in FIG. 1(g)), their specific values may be arbitrarily determined depending on the intended use of a patterned alignment film produced by the use of the mold. For example, when the patterned alignment film is used to produce a liquid crystal display device capable of three-dimensional display, the width W2 of each resist film 2 and the width W1 of the space between adjacent resist films 2 are determined so that the widths match the widths of each right-eye pixel area and each left-eye pixel area. Though the width W2 of each resist film 2 and the width W1 of the space between adjacent resist films 2 are thus not particularly limited, the widths may preferably be in the range of 50 μm to 1000 μm, more preferably in the range of 100 μm to 600 μm.

6. Second Layer Removing Step

The second layer removing step in this embodiment is the step of removing parts of the second layer 3 that remains exposed after the formation of the resist 2 in a parallel stripe pattern, as shown in FIG. 1(f).

Any method can be used to remove the second layer in the second layer removing step if it can selectively remove only parts of the second layer that remains exposed after the resist forming step, and will not make a change in the fine linear three-dimensional structures formed in the surface of the first layer. For example, an etching method using an etching solution may be used.

Wet etching may be performed in this step by applying an etching solution onto the substrate, or by immersing the substrate in an etching solution. The etching time may be appropriately adjusted based on the etching rate of the substrate so as to achieve the intended etching profile.

Any etching solution can be used in this step if it can etch away the second layer and will not make a change in the fine linear three-dimensional structures formed in the surface of the first layer. The type of an etching solution to be used may differ depending on the material of the second layer and on the material of the first layer underlying the second layer. Examples of the etching solution include hydrochloric acid, a mixed acid, a hydrogen peroxide solution, ammonia water and an organic alkali.

When the material of the first layer is a chromium-based material and the material of the second layer is a titanium-based material, hydrofluoric acid or a mixed solution of potassium hydroxide and hydrogen peroxide can be used as an etching solution. The use of a mixed solution of potassium hydroxide and hydrogen peroxide is preferred.

When the material of the first layer is a titanium-based material and the material of the second layer is a chromium-based material, a mixed solution of ceric ammonium nitrate and perchloric acid or a mixed solution of sulfuric acid and phosphoric acid can be used as an etching solution. The use of a mixed solution of ceric ammonium nitrate and perchloric acid is preferred.

7. Resist Removing Step

The resist removing step in this embodiment is the step of remove the resist 2 after removing the exposed second layer 3, as shown in FIG. 1(g).

A common resist removing method can be used to remove the resist in the resist removing step. For example, ashing by oxygen plasma treatment or cleaning with an organic alkaline solution may be used. In this embodiment, the resist is preferably removed by applying a removing agent (peeling agent), such as an organic alkaline solution, to the resist. Such a method can remove the resist in a simple manner.

8. Other Steps

As described above, the method for producing a mold for a patterned alignment film for three-dimensional display in this embodiment comprises the first layer forming step, the first three-dimensional structure forming step, the second layer forming step, the second three-dimensional structure forming step, the resist forming step, the second layer removing step, and the resist removing step. The method of this embodiment may optionally include other step(s).

Such other step may be exemplified by a removal step of removing e.g. polishing debris generated by polishing or cutting of the surface of the first layer or the second layer in the first three-dimensional structure forming step or the second three-dimensional structure forming step. A suction method or a method using a solvent, for example, may be used in the removal step.

Another exemplary additional step is an adhesive layer forming step of forming an adhesive layer between the first layer and the second layer.

The adhesive layer forming step will now be described.

The adhesive layer forming step in this embodiment is the step of forming an adhesive layer on the surface of the first layer.

Any method can be used in this step if it can form an adhesive layer on the surface of the first layer and can enhance the adhesion between the first layer and the second layer. The adhesive layer forming method may be appropriately selected depending on the type of the adhesive resin used for the adhesive layer, etc.

Any material can be used for the adhesive layer if the material contains an adhesive resin and can bond the first layer and the second layer with a desired adhesive force. Thus, the type of the adhesive resin may be appropriately selected depending on the types of the first layer and the second layer. Examples of usable adhesive resins include polyethylene, polypropylene, polyisobutylene, polystyrene, polyolefins such as ethylene-propylene rubber, ethylene-vinyl acetate copolymer, ethylene-acrylic acid copolymer, cellulose derivatives such as ethyl cellulose and cellulose triacetate, a copolymer of poly(meth)acrylic acid and an ester thereof, polyvinyl acetate, polyvinyl alcohol, polyvinyl acetal such as polyvinyl butyral, polyacetal, polyamide, polyimide, nylon, a polyester resin, a urethane resin, an epoxy resin, etc.

Either a single adhesive resin or a mixture of two or more types of adhesive resins may be used in the present invention.

The thickness of the adhesive layer is not particularly limited as long as it can bond the first layer and the second layer with a desired adhesive force.

B. Second Mode (Second Aspect)

In a mold for a patterned alignment film for three-dimensional display in the second mode, first-layer fine linear three-dimensional structures and second-layer fine linear three-dimensional structures are formed in the same direction.

The method for producing a mold for a patterned alignment film for three-dimensional display in the second mode will now be described with reference to FIG. 1.

FIG. 1 is a process chart illustrating an exemplary method for producing a mold for a patterned alignment film for three-dimensional display. The method for producing a mold for a patterned alignment film for three-dimensional display in the second mode may be the same as the above-described production method in the first mode, and therefore a description thereof is omitted.

FIG. 1(a) illustrates the first layer forming step, FIG. 1(b) the first three-dimensional structure forming step, FIG. 1(c) the second layer forming step, FIG. 1(d) the second three-dimensional structure forming step, FIG. 1(e) the resist forming step, FIG. 1(f) the second layer removing step, and FIG. 1(g) the resist removing step.

Figure 13:
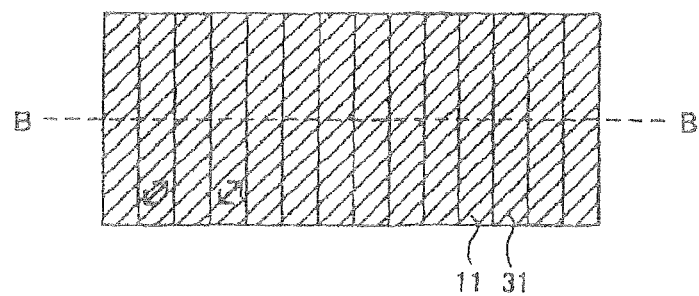
FIG. 13 is a schematic plan view showing the surface of a mold for a patterned alignment film for three-dimensional display.

A mold 50 for a patterned alignment film for three-dimensional display, obtainable by the above-described production method, will now be described with reference to the relevant drawings. FIG. 2 is a schematic view showing an exemplary mold 50 for a patterned alignment film for three-dimensional display according to the present invention. FIG. 13 is a schematic plan view showing the surface of the mold 50 for a patterned alignment film for three-dimensional display, and FIG. 14 is a cross-sectional view taken along the line B-B of FIG. 13.

Figure 14:
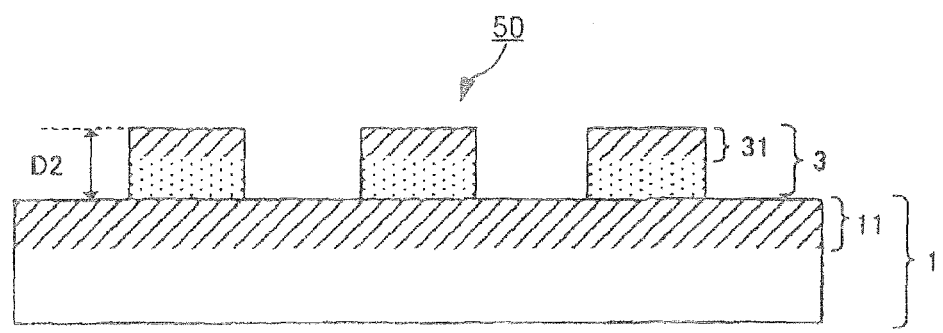
FIG. 14 is a cross-sectional view taken along the line B-B of FIG. 13.

As illustrated in FIGS. 13 and 14, the mold 50 in the second mode includes the first layer 1 composed of a metal material or an inorganic material and having the fine linear three-dimensional structures 11 formed in the surface in an approximately constant direction, and the second layer 3 composed of a metal material or an inorganic material, formed in a parallel stripe pattern on the first layer 1, and having the fine linear three-dimensional structures 31 formed in the surface in an approximately constant direction. The fine linear three-dimensional structures 31 are formed in the surface of the second layer 3 in the same direction as the direction in which the fine linear three-dimensional structures 11 are formed in the surface of the first layer 1 which is exposed between adjacent stripe-shaped portions of the second layer 2.

The exemplary mold 50 for a patterned alignment film for three-dimensional display, shown in FIG. 2, is a roll mold. As illustrated in FIG. 13, the fine linear three-dimensional structures 11, 31 of the surfaces of the first layer 1 and the second layer 3 are formed in the same direction at an angle of 45° with respect to the direction of rotation of the mold (roll mold) 50 for a patterned alignment film for three-dimensional display. The arrows in FIG. 13 indicate the directions in which the fine linear three-dimensional structures 11, 31 are formed.

In the mold for a patterned alignment film for three-dimensional display in the second mode of this embodiment, the level of the surface of the first layer differs from the level of the surface of the second layer. A description will now be given of a patterned retardation film using an alignment film produced by using such a mold for a patterned alignment film for three-dimensional display. FIG. 15(a) is a schematic view showing an exemplary patterned retardation film using an alignment film produced by the use of the mold for a patterned alignment film for three-dimensional display; and FIG. 15(b) is an enlarged schematic view of the regions enclosed in dotted lines, shown in FIG. 15(a).

The patterned retardation film 60 has a pattern of first retardation regions 9A and second retardation regions 9B in the retardation layer 9; the pattern exhibits retardation values that differ by a value corresponding to the thickness of the second layer 2. Thus, the thickness of the second layer in the second mode of this embodiment may be determined by the intended difference in the retardation value between the first retardation regions 9A and the second retardation regions 9B.

In the mold for a patterned alignment film for three-dimensional display in the second mode of this embodiment, the fine linear three-dimensional structures of the surfaces of the first and second layers are formed in the same direction. Accordingly, in the alignment film 8 produced by the use of the mold 50, the fine linear three-dimensional structures of the surfaces of the first alignment regions 8A and the second alignment regions 8B are also formed in the same direction. Accordingly, in the patterned retardation film 60 (60A) produced by the use of the mold for a patterned alignment film for three-dimensional display in the second mode of this embodiment, a rod-like compound 10 is made to align in the same direction.

Figure 15:
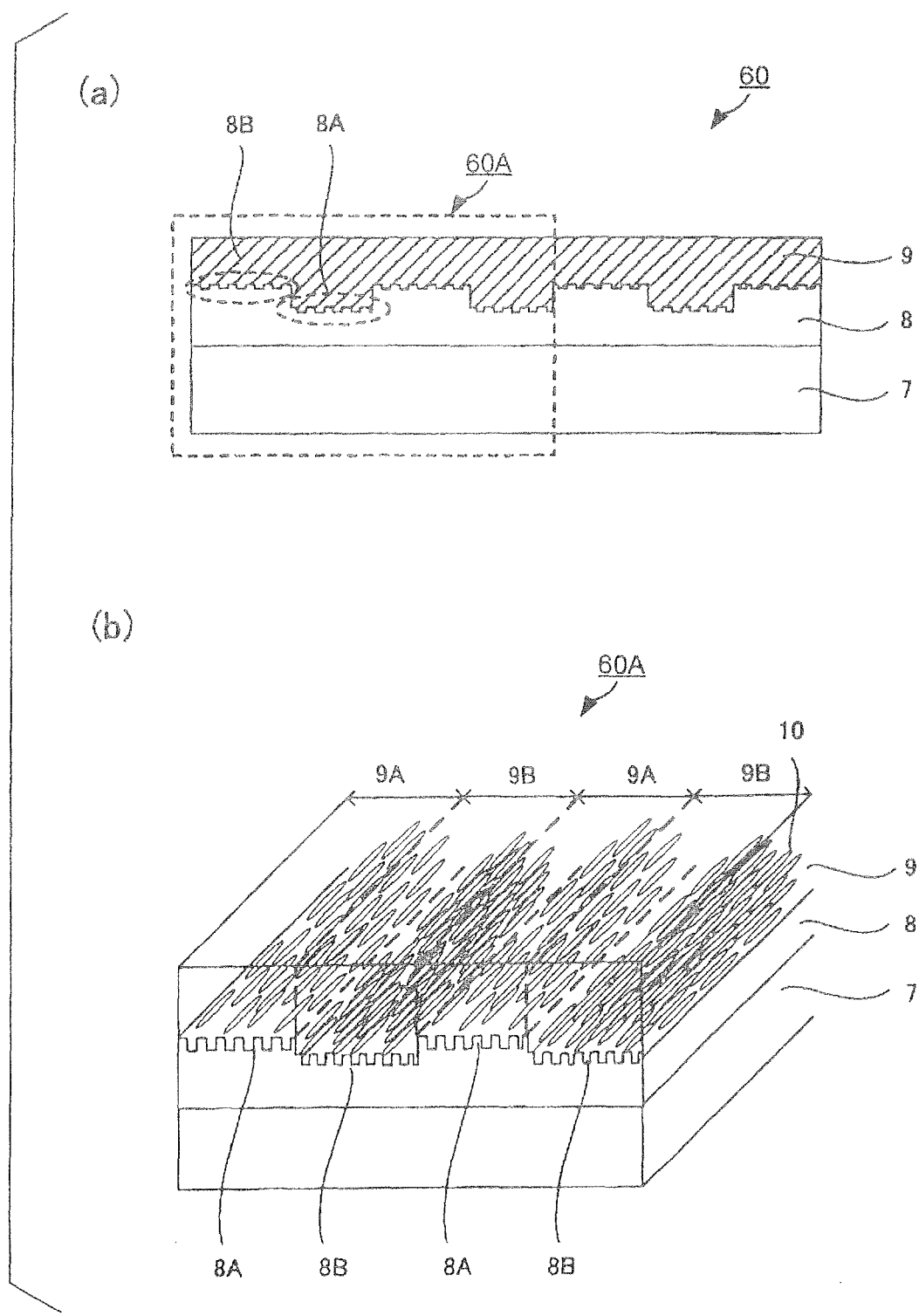
FIG. 15 shows schematic views illustrating another exemplary patterned retardation film using an alignment film obtained by the use of a mold for a patterned alignment film for three-dimensional display.

The reference numerals in FIG. 15 indicate the same elements or components as those of FIG. 5, and therefore a description thereof is omitted.

The method for producing a mold for a patterned alignment film for three-dimensional display in the second mode of this embodiment has the same advantages as those described above with reference to the production method in the first mode.

Besides the advantages of the method for producing a mold for a patterned alignment film for three-dimensional display in the first mode, an alignment film having the first alignment regions and the second alignment regions whose thicknesses are different can be obtained according to the second mode. An alignment film is to constitute a patterned retardation film and has a function to align a rod-like compound contained in the retardation layer of the patterned retardation film. According to the second mode of this embodiment, a mold for a patterned alignment film for three-dimensional display, capable of producing an alignment film which exhibits retardation values that differ by a value corresponding to the difference in the thickness between the first alignment regions and the second alignment regions, can be obtained.

A conventional patterned retardation film has the problem of disorder in the alignment direction of a rod-like compound at the boundary between each first alignment region and each second alignment region when the rod-like compound is aligned in different directions in the first and second alignment regions. On the other hand, in an alignment film produced by using a mold for a patterned alignment film for three-dimensional display in the second mode of this embodiment, the level of the first alignment regions differs from the level of the second alignment regions. By thus distinguishing the boundaries between the first alignment regions and the second alignment regions, defective alignment of liquid crystal molecules, which is likely to occur around the boundaries between the first and second alignment regions, can be prevented. This can prevent leakage of light from the boundary areas. It therefore becomes possible to produce a high-quality alignment film which, when used in a display, can prevent a lowering of contrast.

The method for producing a mold for a patterned alignment film for three-dimensional display in the second mode of this embodiment comprises the first layer forming step, the first three-dimensional structure forming step, the second layer forming step, the second three-dimensional structure forming step, the resist forming step, the second layer removing step, and the resist removing step.

The first three-dimensional structure forming step and the second three-dimensional structure forming step of the production method in the second mode can be performed in the same manner as that described above with reference to the first mode except that the second-layer fine linear three-dimensional structures are formed in the same direction as the first-layer fine linear three-dimensional structures, and that the second layer is formed in such a manner that it has a predetermined thickness, and therefore a detailed description thereof is omitted.

A description will now be given of the thicknesses of the first layer and the second layer, and the fine linear three-dimensional structures formed in the same direction in the surfaces of the first and second layers of the mold for a patterned alignment film for three-dimensional display in the second mode of this embodiment.

The thickness of the second layer formed in the second mode of this embodiment is determined by the intended difference in the retardation value between the first retardation regions and the second retardation regions of a patterned retardation film using an alignment film produced by the use of the mold for a patterned alignment film for three-dimensional display, produced by the method in the second mode of this embodiment, as follows:

The mold for a patterned alignment film for three-dimensional display, produced by the method in the second mode of this embodiment, has the second layer formed in a stripe pattern on the surface of the first layer. Thus, the mold has raised portions and recessed portions in the surface. The raised portions and the recessed portions are transferred to the surface of an alignment film produced by the use of the mold. Thus, regions having different thicknesses, i.e. thick regions and thin regions, are formed in the surface of the alignment film. In a patterned retardation film using the alignment film, a pattern of retardation regions, having retardation values that differ by a value corresponding to the difference in the thickness between the thick regions and the thin regions, are formed in the retardation layer.

Thus, the thickness of the second layer of the mold for a patterned alignment film for three-dimensional display corresponds to the difference in the thickness between the thick regions and the thin regions of an alignment film produced by the mold.

The difference in the thickness between the thick regions and the thin regions is determined by the intended difference in the retardation value between the first retardation regions and the second retardation regions of a patterned retardation film. That is, the difference in the thickness between the thick regions and the thin regions may be determined by the intended use of the patterned retardation film, the type of the below-described rod-like compound for use in the retardation layer, etc., and is not particularly limited. In particular, the difference in the thickness between the thick regions and the thin regions is preferably such that in the retardation layer, formed on the alignment layer, the difference between the in-plane retardation value of high retardation regions and the in-plane retardation value of low retardation regions corresponds to $\lambda/2$. In this case, when designing the retardation layer to have an in-plane retardation value corresponding to $\lambda/4$ in the low retardation regions, the in-plane retardation value of the low retardation regions corresponds to $\lambda/4$ and the in-plane retardation value of the high retardation regions corresponds to $\lambda/4+\lambda/2$ in the patterned retardation film. Linearly polarized lights, when passing through the low and high retardation regions of the patterned retardation film, turn into circularly polarized lights perpendicular to each other. The patterned retardation film can therefore be advantageously used to produce a three-dimensional display device.

It is therefore preferred that the second layer of the mold for a patterned alignment film for three-dimensional display in the second mode of this embodiment be formed in such a manner that the thickness of the second layer, i.e. the difference in the thickness between the thick regions and the thin regions of an alignment film produced by the use of the mold, meets the above-described requirements.

The heights or levels of the surfaces of the first layer and the second layer are not particularly limited as long as the level difference between the first and second layers lies in a predetermined range. For example, the thickness D2 of the second layer 2, shown in FIG. 14, is preferably about 2.0 μm.

As shown in FIG. 14, the heights or levels of the surfaces of the first layer and the second layer include the fine linear three-dimensional structures formed in the surfaces.

Figure 16:
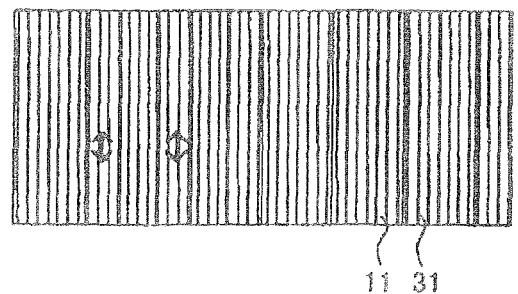
FIG. 16 is a diagram illustrating fine linear three-dimensional structures.
Figure 17:
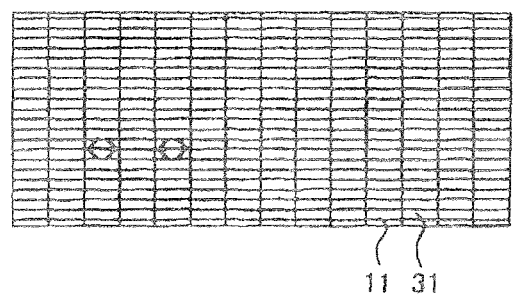
FIG. 17 is a diagram illustrating fine linear three-dimensional structures.
Figure 18:
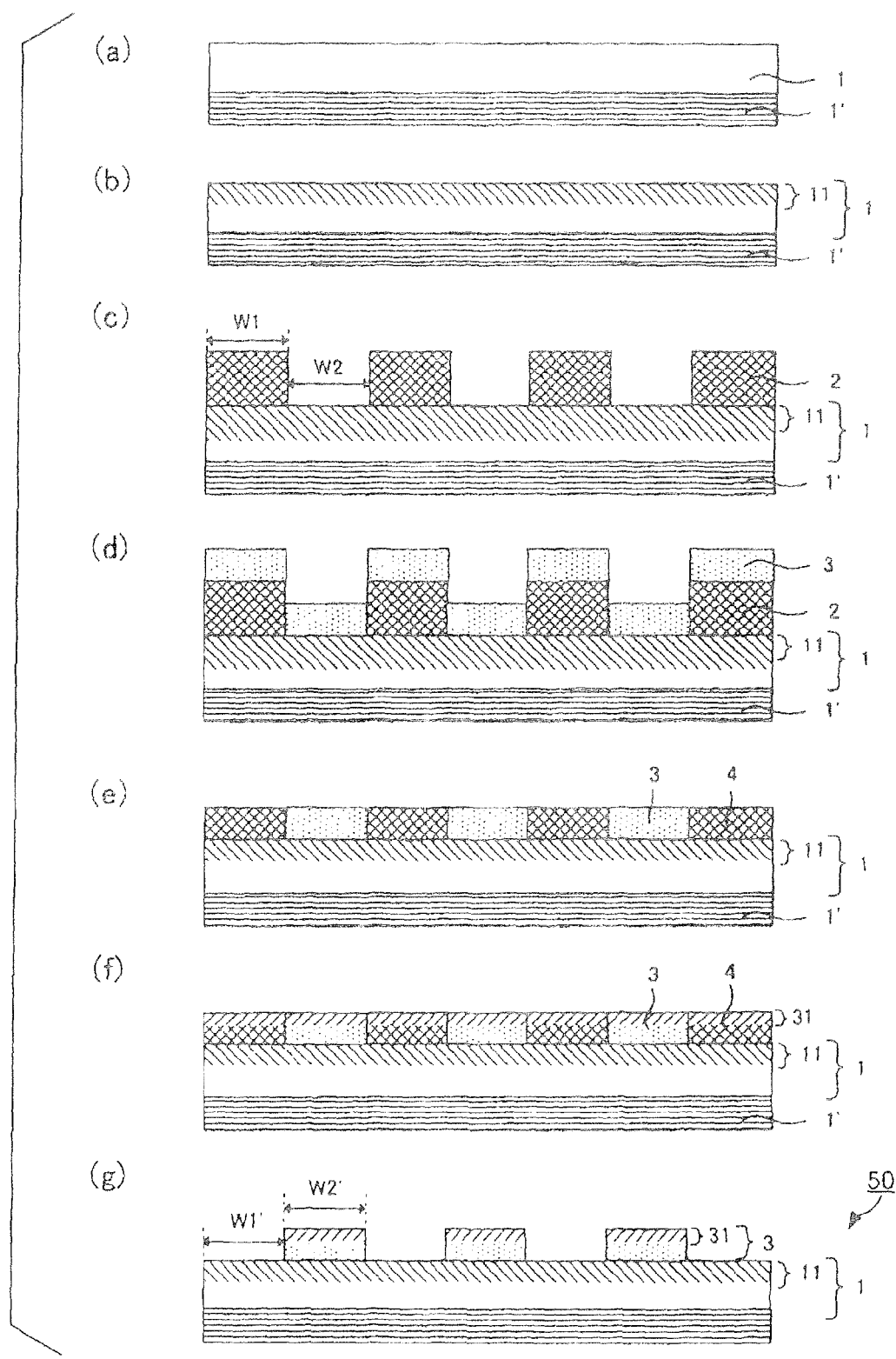
FIG. 18 is a process chart illustrating another exemplary method for producing a mold for a patterned alignment film for three-dimensional display.

The direction in which the fine linear three-dimensional structures is formed in the surfaces of the first and second layers of the mold for a patterned alignment film for three-dimensional display in the second mode of this embodiment is not particularly limited as long as the direction is the same between the first-layer structures and the second-layer structures. For example, as shown in FIG. 16, the direction of the fine linear three-dimensional structures 11 formed in the surface of the first layer and the direction of the fine linear three-dimensional structures 31 formed in the surface of the second layer may be 0°. Alternatively, as shown in FIG. 17, the direction of the fine linear three-dimensional structures 11 formed in the surface of the first layer and the direction of the fine linear three-dimensional structures 31 formed in the surface of the second layer may be 90°.

Other details of the fine linear three-dimensional structures can be as described above with reference to the first embodiment.

C. Other Mode (Other Aspect)

In a mold for a patterned alignment film for three-dimensional display in another mode, first-layer fine linear three-dimensional structures may be formed in a direction different from that of second-layer fine linear three-dimensional structures, and the level of the surface of the first layer may be different from the level of the surface of the second layer.

The method for producing a mold for a patterned alignment film for three-dimensional display in this mode has the same advantages as those described above with reference to the first mode and the second mode.

In addition to the same advantages as those of the first and second modes, this mode has the following advantages: In the mold for a patterned alignment film for three-dimensional display in this mode, the longitudinal direction of the fine linear three-dimensional structures formed in the surface of the first layer differs from the longitudinal direction of the fine linear three-dimensional structures formed in the surface of the second layer and, in addition, the level of the surface of the first layer differs from the level of the surface of the second layer. Therefore, when a patterned retardation film is produced by the use of an alignment film which is produced by using the mold for a patterned alignment film for three-dimensional display in this mode, the patterned retardation film exhibits retardation values that differ by a value corresponding to the difference in the longitudinal direction between the first-layer fine linear three-dimensional structures and the second-layer fine linear three-dimensional structures and to the level difference between the first layer and the second layer. The first layer and the second layer of the mold for a patterned alignment film for three-dimensional display in this mode correspond to the first alignment regions and the second alignment regions of the alignment film, and to the first retardation regions and the second retardation regions of the patterned retardation film.

D. Other Features

The mold for a patterned alignment film for three-dimensional display, produced by the method according to the present invention, has recessed portions (first layer) and raised portions (second layer), formed in a stripe pattern, and has fine linear three-dimensional structures formed in the surface in an approximately constant direction.

The mold for a patterned alignment film for three-dimensional display is used to produce a patterned alignment film for three-dimensional display which is to be used for a patterned retardation film for three-dimensional display. More specifically, the mold is used to produce a patterned alignment film for three-dimensional display, having first alignment regions (raised portions) and second alignment regions (recessed portions) each having fine linear three-dimensional structures formed in the surface, by transferring the corresponding fine linear three-dimensional structures of the mold to an alignment film-forming layer composed of a resin composition.

The above description is merely illustrative, and is not intended to limit the present invention. Any technical idea or concept that is substantially the same as the inventive concept as expressed herein should be construed to fall within the scope of the present invention.

<Example of the First Embodiment>

The following example illustrates the present invention in greater detail.

EXAMPLE (First Layer Forming Step)

Machining of an aluminum pipe (series 5000 aluminum material) having a diameter of 300 mm and a length of 1260 mm was carried out to produce a mold.

After flattening the aluminum surface by means of a lathe, the aluminum surface was subjected to copper electroplating to form a copper layer having a thickness of 200 to 300 μm as an underlayer. Thereafter, the surface of the underlayer was subjected to abrasive polishing to impart smoothness to the surface.

Next, the surface of the underlayer was subjected to nickel plating to form a nickel layer having a thickness of about 5 μm. Scratches that had been produced on the surface of the underlayer by the abrasive polishing were buried in the nickel layer formed. Next, a diamond-like carbon (DLC) film as a first layer, having a thickness of about 2 μm, was formed by plasma CVD on the nickel layer.

(First Three-dimensional Structure Forming Step)

After the formation of the first layer, rubbing of the surface of the first layer was performed at a polishing angle of 45° using a paper polishing machine, thereby forming fine linear three-dimensional structures in the entire surface of the first layer.

(Removal Step)

After the first three-dimensional structure forming step, the surface of the first layer, having the fine linear three-dimensional structures formed therein, was cleaned e.g. with a solvent to remove polishing debris and abrasive particles from the surface.

(Second Layer Forming Step)

Next, a second layer of titanium, having a thickness of 0.1 μm to 1 μm, was formed by sputtering on the surface of the first layer.

(Second Three-dimensional Structure Forming Step)

After the second layer forming step, fine linear three-dimensional structures were formed in the entire surface of the second layer in the same manner as in the first three-dimensional structure forming step.

(Removal Step)

After the second three-dimensional structure forming step, the surface of the second layer, having the fine linear three-dimensional structures formed therein, was cleaned e.g. with a solvent to remove polishing debris and abrasive particles from the surface.

(Resist Forming Step)

After the removal step, a negative resist material was applied to the entire surface of the second layer, followed by drying at room temperature to form a resist coating having an appropriate thickness (about 3 to 5 μm). Thereafter, the resist coating was subjected to lithography with a laser having an adjusted wavelength to expose the resist, followed by development to form a parallel stripe pattern of resist films.

(Second Layer Removing Step)

Next, etching of the second layer was carried out at room temperature for 20 minutes using a 4:1 mixed solution of Solfine-SE-TVV20/A (Showa Denko K.K.) and hydrogen peroxide solution (Kanto Chemical Co., Inc.), followed by rinsing with water and then with methyl alcohol. The water rinsing was carried out by using a high-pressure washer to remove resist residues.

(Resist Removing Step)

Next, the resist was dissolved and removed from the surface of the second layer by using a mixed solution of methyl ethyl ketone (MEK), isopropyl alcohol (IPA) and methanol.

[Evaluation]

The configuration of the surface of the mold for a patterned alignment film for three-dimensional display, produced in the example, was transferred to an ultraviolet curable resin on a substrate film having no retardation. Thereafter, an ultraviolet curable liquid crystal, available from Merck, was applied onto the shaped rein by spin coating to form a retardation layer whose thickness was adjusted to have a retardation value of 125 nm, thereby producing a patterned retardation film.

As a result of evaluation of the patterned retardation film, it was confirmed that because of the presence of the resist protective film, only the second layer can be polished, without re-polishing polishing scratches on the first layer, during polishing of the second layer, and that 45°/135° linear polishing marks were formed in each stripe of the stripe pattern in the surfaces of the first and second layers and, in conformity with the polishing marks, the optical axes of the liquid crystal were aligned precisely in 45°/135° directions.

<<Second Embodiment>>

A second embodiment will now be described with reference to a first mode (first aspect) and a second mode (second aspect).

A. First Mode (First Aspect)

In a mold for a patterned alignment film for three-dimensional display in the first mode, first-layer fine linear three-dimensional structures are formed in a direction different from that of second-layer fine linear three-dimensional structures.

A method for producing a mold in the first mode includes: a first layer preparation step of preparing a first layer composed of a metal material or an inorganic material; a first three-dimensional structure forming step of forming first fine linear three-dimensional structures in the surface of the first layer in an approximately constant direction; a resist forming step of forming a resist in a parallel stripe pattern on the surface of the first layer after the first three-dimensional structure forming step; a second layer forming step of forming a second layer, composed of a metal material or an inorganic material, in a parallel stripe pattern on the surface of the first layer that remains exposed after the resist forming step; a protective layer forming step of forming a protective layer, composed of a resist material, on the surface of the first layer; a second three-dimensional structure forming step of forming second fine linear three-dimensional structures in the surface of the second layer in an approximately constant direction different from the direction in which the first three-dimensional structures are formed; and a removing step of removing the protective layer.

The method for producing a mold in the first mode will now be described with reference to the relevant drawings. FIGS. 18(a) through 18(g) show a process chart illustrating an exemplary method for producing a mold in the first mode. First, in the first layer preparation step, an underlayer 1' is prepared and a first layer 1, composed of a metal material or an inorganic material, is formed on the underlayer 1' (FIG. 18(a)). Next, in the first three-dimensional structure forming step, the surface of the first layer 1 is subjected to cutting or roll pressing to form first fine linear three-dimensional structures 11 in an approximately constant direction (FIG. 18(b)). Next, in the resist forming step, a resist material is applied onto the surface of the first layer, in which the first three-dimensional structures have been formed, to form a resist film on the surface. The resist film is then exposed (not shown) e.g. by laser lithography in a parallel stripe pattern to form a resist 2 in a parallel stripe pattern on the surface of the first layer 1 (FIG. 18(c)). Next, in the second layer forming step, a second layer 3 is formed on the exposed surface of the first layer 1 and on the surface of the resist 2 (FIG. 18(d)). Next, in the protective layer forming step, the laminate of the resist 2 and the overlying second layer 3 is subjected to rough polishing to form a protective layer 4, composed of a resist material, on the surface of the first layer 1 (FIG. 18(e)). Next, in the second three-dimensional structure forming step, the surface of the second layer 3 is subjected to the same machining as in the first three-dimensional structure forming step, thereby forming second fine linear three-dimensional structures 31 in an approximately constant direction which is different from the direction in which the first three-dimensional structures 11 are formed (FIG. 18(f)). Next, in the removing step, the protective layer 4 on the first layer 1 is removed (FIG. 18(g)). According to the method for producing a mold in the first mode of this embodiment, a mold 50 can thus be produced through the above process steps.

Figure 19:
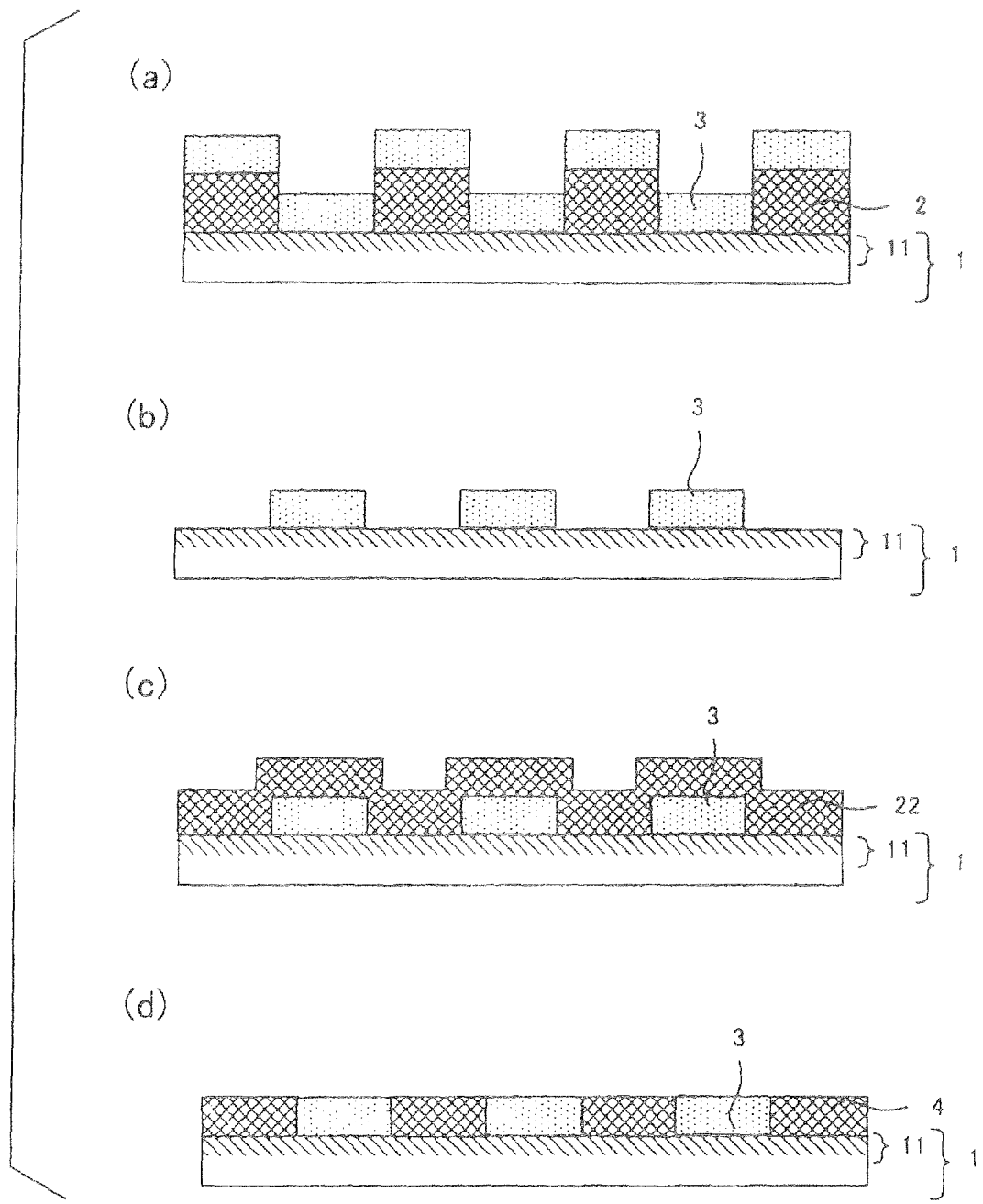
FIG. 19 is a process chart illustrating yet another exemplary method for producing a mold for a patterned alignment film for three-dimensional display.

FIGS. 19(a) through 19(d) show a process chart illustrating another exemplary method for producing a mold in the first mode. In the first layer preparation step in the first mode, it is also possible to prepare and use a single layer, such as a metal substrate, as a first layer 1 as shown in FIGS. 19(a) through 19(d). Further, the protective layer forming step in the first mode may be performed in the following manner: the laminate of the resist 2 and the parts of the second layer 3 overlying the resist 2 are removed as shown in FIGS. 19(a) and 19(b), and then a second resist 22 is formed such that it covers the first layer 1 and the second layer 3 as shown in FIG. 19(c), followed by rough polishing of the second resist 22 to form a protective film 4 on the first layer 1 as shown in FIG. 19(d). The rough polishing of the second resist 22 is performed to such an extent as to expose the surface of the second layer 3.

The first three-dimensional structure forming step, the resist forming step, the second layer forming step, the second three-dimensional structure forming step and the removing step can be performed in the same manner as the steps described above with reference to FIGS. 18(b) through 18(d), 18(f) and 18(g), and therefore a diagrammatic illustration and a description thereof are omitted.

The production method in the first mode of the second embodiment can produce the same mold 50 as that produced by the production method in the first mode of the first embodiment, described above with reference to FIGS. 3, 4 and 6. The use of the mold 50 produced can produce the same alignment film and the same patterned retardation film as those of the first mode of the first embodiment, described above with reference to FIG. 5.

According to this embodiment, the protective layer is formed in the protective layer forming step in those areas where the second layer is not formed, i.e. in those areas where the first layer is exposed. The protective layer can protect the first three-dimensional structures formed in the surface of the first layer and enables efficient formation of the second three-dimensional structures in the second layer. It therefore becomes possible to form the fine linear three-dimensional structures in the surfaces of the first and second layers easily and with high accuracy. The use of the thus-produced mold can produce a high-quality patterned retardation film for three-dimensional display (hereinafter sometimes referred to simply as "patterned alignment film") which, when used in a three-dimensional display device, is unlikely to cause poor alignment.

The respective steps of the method for producing a mold in this embodiment will now be described.

1. First Layer Preparation Step (First Layer Forming Step)

The first layer preparation step is the step of preparing the first layer composed of a metal material or an inorganic material. This step can be performed in the same manner as that described above under the heading "1. First layer forming step (first layer preparation step)" with reference to the first mode of the first embodiment.

2. First Three-dimensional Structure Forming Step

The first three-dimensional structure forming step in the first mode of this embodiment is the step of forming first fine linear three-dimensional structures in the surface of the first layer in an approximately constant direction. This step can be performed in the same manner as that described above under the heading "2. First three-dimensional structure forming step" with reference to the first mode of the first embodiment.

3. Resist Forming Step

The resist forming step in this embodiment is the step of forming a resist in a parallel stripe pattern on the surface of the first layer after the formation of the first three-dimensional structures.

(1) Resist Pattern Profile

In the mold 50 produced by the method of this embodiment, the direction in which the resist pattern is formed in this step and the profile of the resist pattern determine the direction in which the second layer is formed, and the width W1' of the first layer and the width W2' of the second layer of the mold 50. The foregoing description under the heading "Resist forming step", given with reference to the first mode of the first embodiment, holds true for the direction in which the resist pattern is formed in this step and the profile of the resist pattern.

(2) Resist Structure

The thickness of the resist formed in this step is not particularly limited as long as the second layer can be formed in a desired parallel stripe pattern in the below-described second layer forming step. In the case where in the below-described protective layer forming step a protective layer is formed by rough polishing of the laminate of the resist and the part of the second layer overlying the resist, the resist formed in this step is preferably thicker than the second film formed in the below-described second layer forming step. The thickness of the resist is preferably in the range of 0.1 μm to 200 μm, more preferably in the range of 0.1 μm to 50 μm, still more preferably in the range of 0.1 μm to 10 μm, most preferably in the range of 3 μm to 5 μm.

(3) Resist Material and Resist Forming Method

Any resist material can be used in this step as long as the resist can be removed after the second layer is formed as described below. Either a positive resist material (a light-irradiated portion will dissolve) or a negative resist material (a light-irradiated portion will be hardened) may be used. A chemically-amplified resist based on a novolac resin, for example, can be used as the positive resist material. The negative resist material may be exemplified by a chemically-amplified resist based on a crosslinked resin, for example, a chemically-amplified resist prepared by adding a crosslinking agent and an acid generator to polyvinyl phenol.

4. Second Layer Forming Step

The second layer forming step in the first mode of this embodiment is the step of forming the second layer, composed of a metal material or an inorganic material, in a parallel strip pattern on the surface of the first layer that remains exposed after the resist forming step. The foregoing description under the heading "Second layer forming step", given with reference to the first mode of the first embodiment, holds true for the material for the second layer, the thickness of the second layer, the method for forming the second layer, etc.

When the second layer is formed by using dry plating in this step, the second layer is generally formed in a continuous manner, and therefore the second layer is formed on the first layer and on the surface of the resist. On the other hand, when the second layer of a metal material is formed by using wet plating in this step, the first layer should be composed of a metal. When using wet plating in this step, it is possible to form the second layer only on the exposed surface of the first layer without forming the second layer on the surface of the resist.

5. Protective Layer Forming Step

The protective layer forming step in the first mode of this embodiment is the step of forming the protective layer, composed of a resist material, on the surface of the first layer.

Two methods for forming the protective layer can be used in this step: a method (first method) in which the laminate of the resist and the overlying second layer (the part of the second layer overlying the resist), formed in the second layer forming step, is subjected to rough polishing, thereby forming the protective layer on the first layer; and a method (second method) in which after removing the laminate of the resist and the overlying second layer (the part of the second layer overlying the resist), a second resist is formed such that it covers the first layer and the second layer, and then the second resist is subjected to rough polishing, thereby forming the protective layer on the first layer. The two methods will now be described in more detail.

(1) First Method

The first method to form the protective layer comprises roughly polishing the laminate of the resist and the overlying second layer (hereinafter sometimes referred to simply as "laminate"), formed in the second layer forming step, to form the protective layer on the first layer.

The expression "roughly polishing the laminate to form the protective layer" herein refers to polishing the laminate to remove the second layer and polish the resist to such a thickness as to be still capable of protecting the surface of the first layer and not to prevent the formation of the second three-dimensional structures in the surface of the second layer in the below-described second three-dimensional structure forming step, thereby forming the protective layer.

The first method can thus form the protective layer with the use of the laminate, making it possible to reduce the production cost and simplify the production process.

Any method can be used to polish the laminate if it can produce the protective layer which can protect those areas of the first layer where the second layer is not formed, which causes no scratches or the like on the surface of the second layer, and which does not prevent the formation of the intended second three-dimensional structures in the surface of the second layer in the below-described second three-dimensional structure forming step. Examples of usable polishing methods include paper polishing, sandblasting, rubbing, abrasive polishing, buffing, vertical polishing, electrolytic polishing, lap polishing, etc.

The thickness of the protective layer formed by the first method is not particularly limited as long as the protective film can protect the first layer, causes no scratches or the like on the surface of the second layer, and does not prevent the formation of the intended second three-dimensional structures in the surface of the second layer in the below-described second three-dimensional structure forming step; however, the protective layer generally has approximately the same thickness as the second layer. Thus, the thickness of the protective layer is preferably in the range of 10 nm to 5 μm, more preferably in the range of 50 nm to 1 μm. If the thickness of the protective layer is less than the above range, scratches can be produced on the surface of the second layer during machining to form the protective layer. On the other hand, if the thickness of the protective layer exceeds the above range, it is possible that the protective film may impede machining to form the second three-dimensional structures in the surface of the second layer in the below-described second three-dimensional structure forming step.

After forming the protective layer by the rough polishing of the laminate, the method of this embodiment may further includes the step of cleaning the surface of the second layer e.g. with an organic alkaline solution to remove the resist, polishing debris, etc. remaining on the surface of the second layer. This makes it possible to form the second three-dimensional structures in the surface of the second layer with high accuracy in the below-described second three-dimensional structure forming step.

(2) Second Method

The second method to form the protective layer comprises removing the laminate, subsequently forming a second resist such that it covers the first layer and the second layer, and roughly polishing the second resist to form the protective layer on the first layer.

The expression "roughly polishing the second resist to form the protective layer" herein refers to polishing the second resist to such an extent as to be still capable of protecting the surface of the first layer and to expose the second layer without causing damage to the surface of the second layer, thereby forming the protective layer.

Because in the second method the protective layer is formed by removing the laminate, forming the second resist and roughly polishing the second resist, no metal material or inorganic material is contained in polishing debris. The second method can therefore reduce scratches on the surface of the second layer due to contact of polishing debris with the surface of the second layer. It therefore becomes possible to form the second three-dimensional structures with higher accuracy in the surface of the second layer. Accordingly, the use of the mold, produced by the method of this embodiment, can produce a patterned alignment film for three-dimensional display which is less likely to cause poor alignment.

A common resist removing method can be used to remove the laminate in the second method. For example, ashing by oxygen plasma treatment or cleaning with an organic alkaline solution may be used. Of these, cleaning with an organic alkaline solution is preferred in this embodiment.

With reference to the resist material for the second resist, the same material as that described above under the heading "3. Resist forming step" can be used, and therefore a description thereof is omitted.

The second resist is formed by applying the resist material such that it covers the first layer and the second layer. The resist material can be applied in the same manner as that described above under the heading "3. Resist forming step", and therefore a description thereof is omitted.

The thickness of the second resist is not particularly limited as long as the protective layer having a desired thickness can be formed by roughly polishing the second resist, and may be determined arbitrarily depending on the thickness of the second layer, etc.

A method for polishing the second resist, to be used in the second method, and the thickness of the protective layer formed by the second method may be the same as the method for polishing the laminate of the second layer and the resist, and the thickness of the protective layer, described above under the heading "(1) First method", and therefore a description thereof is omitted.

(3) Other Method

Other methods may be used in the protective layer forming step of this embodiment. For example, when wet plating is used in the second layer forming step, and the second layer is not formed on the surface of the resist but formed only on the exposed surface of the first layer, the protective layer may be formed by roughly polishing the resist. In this case the resist, which is to pattern the second layer, can be used as a protective layer. This method also has the advantage that no metal material or inorganic material is contained in polishing debris.

A method for polishing the resist, to be used in this method, the thickness of the protective layer formed by this method, etc. may be the same as those described above under the heading "(1) First method", and therefore a description thereof is omitted.

6. Second Three-dimensional Structure Forming Step

The second three-dimensional structure forming step in the first mode of this embodiment is the step of forming second fine linear three-dimensional structures in the surface of the second layer in an approximately constant direction which is different from the direction in which the first three-dimensional structures are formed.

(1) Second Three-dimensional Structures

The second three-dimensional structures formed in this step will now be described. The second fine linear three-dimensional structures are formed in the surface of the second layer in an approximately constant direction which is different from the direction in which the first three-dimensional structures are formed.

The direction in which the second three-dimensional structures are formed is not particularly limited as long as it differs from the direction in which the first three-dimensional structures are formed. The foregoing description under the heading "4. Second three-dimensional structure forming step", given with reference to the first embodiment, holds true for the direction in which the second three-dimensional structures are formed.

The second three-dimensional structures are not particularly limited if the use of the mold can produce a patterned alignment film which is capable of producing a high-quality patterned retardation film. The foregoing description under the heading "4. Second three-dimensional structure forming step", given with reference to the first embodiment, holds true for the second three-dimensional structures.

(2) Method for Forming the Second Three-dimensional Structures

The second three-dimensional structures can be formed by the same method as that described above with reference to the first three-dimensional structures, and therefore a description thereof is omitted. Further, the method for forming the second three-dimensional structures, described above with reference to the first embodiment, can be used to form the second three-dimensional structures.

7. Removing Step

The removing step in this embodiment is the step of removing the protective layer.

A common resist removing method can be used to remove the protective film in this step. For example, the exemplary methods for removing the laminate, described above with reference to the second method to be used in the protective layer forming step, can be used in this step.

8. Other Steps

The method for producing a mold in this embodiment comprises the above-described steps. As described above under the heading "8. Other steps" with reference to the first mode of the first embodiment, the method of this embodiment may optionally include other step(s).

B. Second Mode (Second Aspect)

A method for producing a mold in the second mode includes: a first layer forming step of forming a first layer composed of a metal material or an inorganic material; a first three-dimensional structure forming step of forming first fine linear three-dimensional structures in the surface of the first layer in an approximately constant direction; a resist forming step of forming a resist in a parallel stripe pattern on the surface of the first layer after the first three-dimensional structure forming step; a second layer forming step of forming a second layer, composed of a metal material or an inorganic material, in a parallel stripe pattern on the surface of the first layer that remains exposed after the resist forming step; a protective layer forming step of forming a protective layer, composed of a resist material, on the surface of the first layer; a second three-dimensional structure forming step of forming second fine linear three-dimensional structures in the surface of the second layer in an approximately constant direction which is the same as the direction in which the first three-dimensional structures are formed; and a removing step of removing the protective layer.

The production method in the second mode of the second embodiment can produce the same mold 50 as that produced by the production method in the second mode of the first embodiment, described above with reference to FIGS. 2, 13 and 14. The use of the mold 50 produced can produce the same alignment film and the same patterned retardation film as those of the second mode of the first embodiment, described above with reference to FIG. 15.

The method for producing a mold in the second embodiment can be performed by the same process as that described above with reference to FIGS. 18(*a*) through 18(*g*), and therefore a description thereof is omitted.

As with the first mode of this embodiment, the protective layer is formed in the protective layer forming step in those areas where the second layer is not formed, i.e. in those areas where the first layer is exposed. The protective layer can protect the first three-dimensional structures formed in the surface of the first layer and enables efficient formation of the second three-dimensional structures in the second layer. It therefore becomes possible to form the fine linear three-dimensional structures in the surfaces of the first and second layers easily and with high accuracy. The use of the thus-produced mold can produce a high-quality patterned retardation film which, when used in a three-dimensional display device, is unlikely to cause poor alignment.

The method for producing a mold in the second mode of this embodiment differs from the first mode of this embodiment in the direction in which the fine linear three-dimensional structures are formed in the second three-dimensional structure forming step. Further, the thicknesses of the first layer and the second layer can be set different from those in the first mode of this embodiment. The relevant description given above with reference to the second mode of the first embodiment holds true for the direction of the second three-dimensional structures and the thicknesses of the first layer and the second layer in the second mode of this embodiment.

On the other hand, with reference to the first layer preparation step, the first three-dimensional structure forming step, the resist forming step, the protective layer forming step, the removing step, and other step(s) in the second mode of this embodiment, these steps can be performed in the same manner as in the first mode of this embodiment.

C. Other Mode (Other Aspect)

The mold produced by the mold production method in the first mode of this embodiment is used to produce a patterned alignment film which produces a patterned retardation film having a pattern of first retardation regions and second retardation regions, whose retardation values differ from each other due to different alignment directions of a rod-like compound contained in the retardation layer. On the other hand, the mold produced by the mold production method in the second mode of this embodiment is used to produce a patterned alignment film which produces a patterned retardation film having a pattern of first retardation regions and second retardation regions, whose retardation values differ from each other due to a difference in the thickness between the first retardation regions and the second retardation regions.

A method for producing a mold in another mode of this embodiment may be a method for producing a mold capable of producing a patterned alignment film which produces a patterned retardation film having first retardation regions and second retardation regions, whose retardation values differ from each other due to different alignment directions of a rod-like compound contained in the retardation layer and to a difference in the thickness between the first retardation regions and the second retardation regions. The method for producing such a mold may include a second layer forming step which is performed in the same manner as the above-described second layer forming step in the second mode of this embodiment, and a second three-dimensional structure forming step which is performed in the same manner as the above-described second three-dimensional structure forming step in the first mode of this embodiment.

D. Other Features

The mold produced by the method according to the present invention has recessed portions (first layer) and raised portions (second layer), formed in a stripe pattern, and has fine linear three-dimensional structures formed in the surface in an approximately constant direction.

The mold is used to produce a patterned alignment film for three-dimensional display which is to be used for a patterned retardation film for three-dimensional display. More specifically, the mold is used to produce a patterned alignment film for three-dimensional display, having first alignment regions (raised portions) and second alignment regions (recessed portions) each having fine linear three-dimensional structures formed in the surface, by transferring the corresponding fine linear three-dimensional structures of the mold to an alignment film-forming layer composed of a resin composition.

The above-described embodiment is not intended to limit the present invention. Any technical idea or concept that is substantially the same as the inventive concept as expressed herein should be construed to fall within the scope of the present invention.

<Example of the Second Embodiment>

The following example illustrates the present invention in greater detail.

EXAMPLE

The first layer forming step was performed in the following manner. First, an underlayer was prepared as follows: Machining of an aluminum pipe having a diameter of 300 mm and a length of 1260 mm was carried out to produce a mold. A series 5000 aluminum material was used in this test for the aluminum pipe because of good machinability of the material, though the use of a softer series 1000 aluminum material was also possible. After flattening the surface of the aluminum pipe by means of a lathe, the surface of the aluminum pipe was subjected to copper electroplating to form a copper plating film having a thickness of 200 µm to 300 µm as an underlayer. Thereafter, the surface of the underlayer was subjected to abrasive polishing for centering of the pipe and imparting smoothness to the surface. Next, the surface of the underlayer was subjected to nickel plating to form a nickel plating film having a thickness of about 5 µm. The nickel layer was formed in order for scratches, produced on the surface of the underlayer by the abrasive polishing, to be buried in the nickel layer. It is to be noted in this regard that if the scratches are not buried, the scratches could cause alignment of e.g. a liquid crystal in an alignment film produced by the use of the mold. A Cr plating film may be used instead of the Ni plating film. However, some Cr plating films have micro-cracks; it is necessary to select a Cr plating film having no micro-cracks. Though wet plating was used to form a film in this test, it is possible to form a film by dry plating. However, the use of wet plating is preferred because a film is preferably formed thick in order to bury therein scratches on the surface of the underlayer which were produced upon abrasive polishing.

Next, a first layer was formed in the following manner: A DLC (diamond-like carbon) film as a first layer, having a thickness of about 2 µm, was formed by plasma CVD on the nickel plating layer. The first layer may be formed not by CVD but by PVD. While the first layer is preferably thick from the viewpoint of the hardness of the layer, it is possible to use a film as thin as 0.1 µm.

Next, the workpiece was subjected to a first three-dimensional structure forming step: The entire surface of the DLC film was polished at a polishing angle of 45 degrees by using a paper polishing machine manufactured by Think Laboratory Co., Ltd. The polishing angle was inputted into the paper polishing machine, and scratches were produced in the surface of the DLC film in a 45-degree direction. The 45-degree scratches can be produced by setting the movement speed of the polishing head equal to the rotational speed of the cylinder.

A diamond film No. 20000 (model number: LDF #20000), manufactured by Sankyo Rikagaku Co., Ltd., was used as a polishing film in the polishing. The use of a diamond film is because of the high hardness (Hv 1100-2500) of DLC: if an alumina film, a common polishing member, is used, the polishing member itself will be ground and the polishing member will produce broadened polishing scratches, which would cause poor alignment.

After completion of the 45-degree direction polishing, the surface of the workpiece was cleaned e.g. with a solvent. Though the cleaning is optional, it is preferred to perform the cleaning in order to remove polishing debris, abrasive particles, etc. adhering to the workpiece surface.

The workpiece after the cleaning was subjected to a resist forming step. This step was performed by using a lithography apparatus manufactured by Think Laboratory Co., Ltd. First, the entire surface of the workpiece was coated with a resist having an appropriate thickness (about 3 µm to 5 µm), followed by drying at room temperature. The resist coating can be dried more quickly by drying it at a higher temperature. However, the use of a higher drying temperature may cause contraction of the resist and expansion of the aluminum pipe. It is therefore preferred to perform the drying at room temperature. A negative resist, manufactured by Think Laboratory Co., Ltd., was used as the resist. In this regard, a positive resist is weak against heat and can cause removing, thermal deformation, etc. during the below-described formation of a DLC film as a second layer, performed at a high temperature. The use of a negative resist is therefore preferred. After the formation of the resist, the resist was subjected to lithography with a laser having an adjusted wavelength to expose the resist, followed by development to form a parallel stripe pattern of resist films.

In the subsequent second layer forming step, the patterned surface of the workpiece was subjected to dry plating to form a DLC film, having a thickness of about 0.1 µm, as a second layer. Instead of DLC, it is possible to use other hard film materials for the second layer. The DLC film is preferably as thin as possible, e.g. on the order of 0.1 µm to 1 µm.

Next, the workpiece was subjected to a protective film forming step: The patterned resist was polished until it reached the same level as the tops of the DLC films lying in the non-resist areas of the stripe pattern. The surfaces of the resist films were thus made flush with the surfaces of the DLC films. A protective layer for the first layer, consisting of the resist films, was thus formed.

Next, the workpiece was subjected to a second three-dimensional structure forming step: The surfaces of the resist films (protective layer) and the DLC films (second layer) were polished in a 45-degree direction. The polishing may be performed under similar polishing conditions to those for polishing of the DLC film (first layer); however, the polishing pressure in the second-layer polishing is preferably set lower than, e.g. one half the level of, the pressure in the first-layer polishing. This is because the DLC films as the second layer are formed in a pattern, and the polishing amount of the patterned second layer is smaller, e.g. one half the level of, the polishing amount of the non-patterned DLC film as the first layer. Thus, a lower linear pressure is required for the second-layer polishing.

Next, the workpiece was subjected to a removing step: After completion of the second-layer polishing, the patterned resist was removed by using, as a removing solution, a mixed solution of MEK, IPA and methanol. An alkaline removing solution may be used instead of the mixed solution. By removing the resist, a mold was produced having the first-layer DLC pattern and the second-layer DLC pattern, formed alternately on the mold surface, and having 45°/135° polishing marks formed in the mold surface.

[Evaluation]

The shape of the surface of the mold, produced in the example, was transferred to an ultraviolet curable resin on a substrate film having no retardation, such as a TAC film, a COP film (Zeonor) or an acrylic film. Thereafter, an ultraviolet curable liquid crystal, available from Merck, was applied onto the shaped rein by spin coating to form a retardation layer whose thickness was adjusted to have a retardation value of 125 nm, thereby producing a patterned retardation film.

As a result of evaluation of the patterned retardation film, it was confirmed that because of the presence of the resist protective film, only the second layer can be polished, without re-polishing polishing scratches on the first layer, during polishing of the second layer, and that 45°/135° linear polishing marks were formed in each stripe of the stripe pattern in the surfaces of the first and second layers and, in conformity with the polishing marks, the optical axes of the liquid crystal were aligned precisely in 45°/135° directions.

<<Third Embodiment>>

A third embodiment will now be described with reference to a first mode (first aspect) and a second mode (second aspect).

A. First Mode (First Aspect)

In a mold for a patterned alignment film for three-dimensional display in the first mode, first-layer fine linear three-dimensional structures are formed in a direction different from that of second-layer fine linear three-dimensional structures.

A method for producing a mold in the first mode includes: a first layer forming step of forming a first layer composed of a metal; a first three-dimensional structure forming step of forming fine linear three-dimensional structures in the surface of the first layer in an approximately constant direction; a resist forming step of forming a resist in a parallel stripe pattern on the surface of the first layer after the first three-dimensional structure forming step; a second layer forming step of forming a second layer, composed of an inorganic material, by performing dry plating of a surface of the resist and the exposed surface of the first layer after the resist forming step; a removing step of removing the resist and the second layer formed on the surface of the resist; a protective layer forming step of forming a protective layer by performing wet plating of the exposed surface of the first layer after the removing step; a second three-dimensional structure forming step of forming fine linear three-dimensional structures in the surface of the second layer in an approximately constant direction different from the direction in which the first-layer three-dimensional structures are formed; and a removing step of removing the protective layer.

Figure 20:
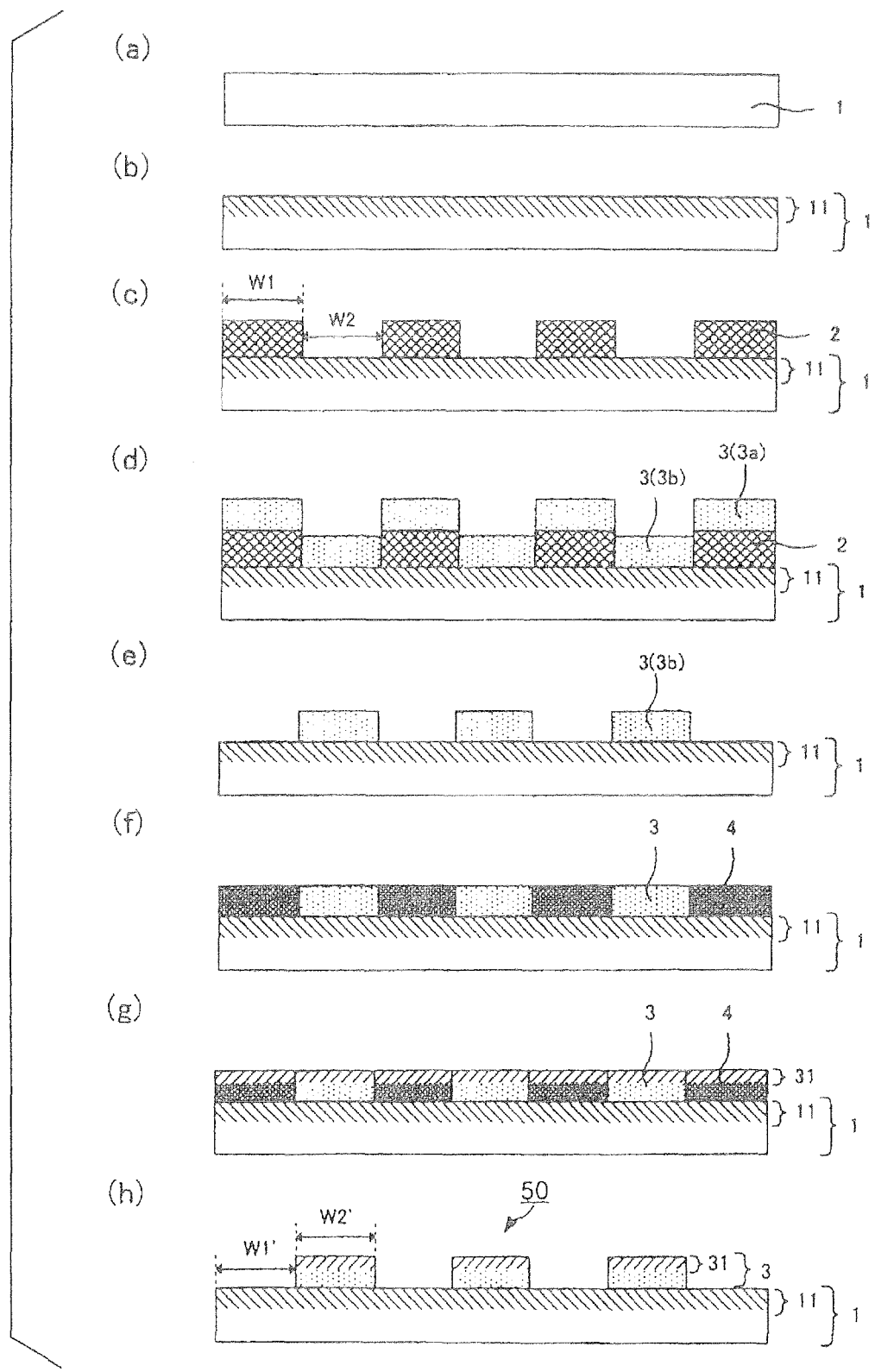
FIG. 20 is a process chart illustrating yet another exemplary method for producing a mold for a patterned alignment film for three-dimensional display.

The method for producing a mold for a patterned alignment film for three-dimensional display in the first mode will now be described with reference to FIG. 20. FIG. 20 is a process chart illustrating an exemplary method for producing a mold for a patterned alignment film for three-dimensional display. First, as illustrated in FIG. 20, a metal substrate is prepared and a first layer 1, consisting of a single layer or a multiple layers, is formed (FIG. 20($a$)). Next, the entire surface of the first layer 1 is subjected to cutting or roll pressing to form fine linear three-dimensional structures 11 in the surface in an approximately constant direction, thereby forming the first layer 1 having the fine linear three-dimensional structures 11 (FIG. 20($b$)). Thereafter, a resist material is applied onto the surface of the first layer 1, in which the fine linear three-dimensional structures 11 are formed, to form a resist film on the surface. The resist film is then exposed e.g. by laser lithography in a parallel stripe pattern to form a resist 2 in a parallel stripe pattern on the surface of the first layer 1 (FIG. 20($c$)). Next, the entire surface of the first layer 1 that remains exposed after the formation of the resist 2 is subjected to dry plating to form a second layer 3 ($3b$) composed of an inorganic material (FIG. 20($d$)). Though the second layer 3 ($3a$) is formed by dry plating also on the resist 2, the part of the second layer 3 ($3a$) on the resist 2 is removed, together with the resist 2, in the next removing step (FIG. 20($e$)). Next, the part of the surface of the first layer 1, which has been exposed by the removing of the resist 2 from the first layer 1, is subjected to wet plating to form a protective layer 4 adjacent to the second layer 3 (FIG. 20($f$)). Next, the entire surface of the second layer 3 is subjected to cutting or roll pressing to form fine linear three-dimensional structures 31 in the surface in a direction which is different from that of the fine linear three-dimensional structures 11 formed in the first three-dimensional structure forming step (FIG. 20($g$)). The protective layer 4 is to protect the fine linear three-dimensional structures 11 of the surface of the first layer 1. Thus, when forming the fine linear three-dimensional structures 31 in the surface of the second layer 3, the fine linear three-dimensional structures 31 are permitted to be formed also in the surface of the protective layer 4. Finally, the protective layer 4 is removed from the first layer 1 to obtain a mold 50 for a patterned alignment film for three-dimensional display according to the present invention (FIG. 20($h$)).

FIG. 20($a$) illustrates the first layer forming step, FIG. 20($b$) the first three-dimensional structure forming step, FIG. 20($c$) the resist forming step, FIG. 20($d$) the second layer forming step, FIG. 20($e$) the resist forming step, FIG. 20($f$) the resist removing step, FIG. 20($g$) the second three-dimensional structure forming step, and FIG. 20($h$) the protective layer removing step.

The production method in the first mode of the third embodiment can produce the same mold 50 as that produced by the production method in the first mode of the first embodiment, described above with reference to FIGS. 3, 4 and 6. The use of the mold 50 produced can produce the same alignment film and the same patterned retardation film as those of the first mode of the first embodiment, described above with reference to FIG. 5.

According to this embodiment, the protective layer is formed in the protective layer forming step in those areas where the second layer is not formed, i.e. in those areas where the first layer is exposed. When forming the second-layer fine linear three-dimensional structures, whose longitudinal direction differs from that of the first-layer fine linear three-dimensional structures, in the surface of the second layer in the second three-dimensional structure forming step, the protective layer can protect the first-layer fine linear three-dimensional structures from being damaged. The protective layer therefore enables efficient formation of the second-layer three-dimensional structures in the surface of the second layer. Thus, it becomes possible to form the second-layer fine linear three-dimensional structures easily and with high accuracy, without affecting the first-layer fine linear three-dimensional structures.

The protective layer is formed by performing wet plating of the exposed surface of the first layer after the resist forming step. The protective layer can therefore be formed selectively only on the surface of the first layer composed of a metal and, in addition, the thickness of the protective layer can be easily adjusted. The protective layer, formed adjacent to the second layer, may be made thinner than the second layer so as to facilitate the formation of the second-layer fine linear three-dimensional structures in the second three-dimensional structure forming step.

The use of such a mold, having fine linear three-dimensional structures formed in different directions in the surfaces of the first and second layers, can produce an alignment film having fine linear three-dimensional structures in the surface of each first alignment region and also having fine linear three-dimensional structures in the surface of each second alignment region, the pattern structures being formed in different directions. Such an alignment film constitutes a patterned retardation film and functions to align a rod-like compound contained in the retardation layer. Thus, when an alignment film is produced by using a mold for a patterned alignment film for three-dimensional display according to the present invention, the fine linear three-dimensional structures, formed in different directions in the first alignment regions and in the second alignment regions, of the alignment film can regulate the alignment of a rod-like compound contained in the retardation layer of a patterned retardation film including the alignment film. Thus, because of the difference in the direction between the fine linear three-dimensional structures formed in the surface of the first layer and the fine linear three-dimensional structures formed in the surface of the second layer in the mold in the first mode of this embodiment, an alignment film can be produced which has fine linear three-dimensional structures in each first alignment region and also has fine linear three-dimensional structures, formed in a different direction, in each second alignment region. The use of the alignment film can produce a patterned retardation film which exhibits retardation values that differ by a value corresponding to the difference in the direction between the fine linear three-dimensional structures of the first and second alignment regions.

A conventional patterned retardation film has the problem of disorder in the alignment direction of a rod-like compound at the boundary between each first alignment region and each second alignment region, because the rod-like compound is aligned in different directions in the first and second alignment regions. On the other hand, in a mold for a patterned alignment film for three-dimensional display in the first mode of this embodiment, the level of the surface of the first layer differs from the level of the surface of the second layer, i.e. the thickness of the mold differs between the portions with the second layer and the portions without the second layer. Accordingly, an alignment film, in which the level of the first alignment regions differs from the level of the second alignment regions, can be obtained. By thus distinguishing the boundaries between the first alignment regions and the second alignment regions, defective alignment of liquid crystal molecules, which is likely to occur around the boundaries between the first and second alignment regions, can be prevented. This can prevent leakage of light from the boundary areas. It therefore becomes possible to produce a high-quality alignment film which, when used in a display, can prevent a lowering of contrast.

The method for producing a mold for a patterned alignment film for three-dimensional display in the first mode includes a first layer forming step, a first three-dimensional structure forming step, a resist forming step, a second layer forming step, a resist removing step, a protective layer forming step, a second three-dimensional structure forming step, and a protective layer removing step.

The respective steps of the method for producing a mold for a patterned alignment film for three-dimensional display in the first mode of this embodiment will now be described in detail.

1. First Layer Forming Step (First Layer Preparation Step)

The first layer forming step is the step of forming the first layer 1 composed of a metal, as shown in FIG. 20($a$). This step can be performed in the same manner as that described above with reference to the first layer forming step or the first layer preparation step in the first or second embodiment.

2. First Three-dimensional Structure Forming Step

The first three-dimensional structure forming step in the first mode of this embodiment is the step of forming fine linear three-dimensional structures 11 in the surface of the first layer 1 in an approximately constant direction, as shown in FIG. 20($b$). This step can be performed in the same manner as that described above under the heading "2. First three-dimensional structure forming step" with reference to the first mode of the first or second embodiment.

3. Resist Forming Step

The resist forming step in this embodiment is the step of forming a resist 2 in a parallel stripe pattern on the surface of the first layer 1 after the first three-dimensional structure forming step, as shown in FIG. 20($c$). This step can be performed in the same manner as that described above under the heading "3. Resist forming step" with reference to the first mode of the second embodiment.

4. Second Layer Forming Step

The second layer forming step in this embodiment is the step of forming the second layer 3, composed of an inorganic material, by dry plating after the formation of the resist 2, as shown in FIG. 20($d$).

This step is performed by dry plating in order to form the second layer, composed of an inorganic material and having insulating properties, with high accuracy. Specific examples of dry plating include a physical vapor deposition method (PVD method) such as vacuum deposition plating, resistance heating, sputtering or ion plating; and a chemical vapor deposition method (CVD method) such as atmospheric pressure thermal CVD, reduced pressure thermal CVD or plasma CVD. A CVD method is preferably used when DLC (diamond-like carbon) is used as a material for the second layer; the use of a CVD method can control the thickness of the DLC layer with higher accuracy.

The inorganic material for the second layer preferably has insulating properties and enables stable formation of the second layer on the first layer. When the second layer has insulating properties, the below-described protective layer can be formed by wet plating selectively in the non-second layer areas, i.e. in the areas where the resist has been removing and the first layer is exposed, in the below-described protective layer forming step. This makes it possible to form fine linear three-dimensional structures in the surface of the second layer in the below-described second three-dimensional structure forming step while protecting the fine linear three-dimensional structures formed in the surface of the first layer. Examples of the inorganic material for the second layer include metal oxides such as titanium oxide ($TiO_2$, $Ti_3O_5$), tantalum oxide ($Ta_2O_5$), silicon oxide (SiO, $SiO_2$), tin oxide ($SnO_2$), aluminum oxide ($Al_2O_3$), chromium oxide ($Cr_2O_3$), barium titanate ($BaTiO_3$), indium oxide ($In_2O_3$) and zinc oxide (ZnO, $ZnO_2$), carbides such as TiC, SiC, BC and WC, nitrides such as TiN, SiN, CrN, BN, AlN, CN and ZrN, barium fluoride ($BaF_2$), magnesium fluoride ($MgF_2$), magnesium oxide (MgO), diamond-like carbon (DLC), glassy carbon, ceramics, silicon nitride, carbon nitride, etc. Of these, DLC, carbides such as TiC, SiC, BC and WC, and nitrides such as TiN, SiN, CrN, BN, AlN, CN and ZrN are preferred; in particular DLC and TiN are preferred, and DLC is most preferred.

The use of such an inorganic material facilitates the formation of the second layer on the first layer, and also facilitates the formation of fine linear three-dimensional structures in the surface of the second layer.

The foregoing description, given with reference to the first mode of the first embodiment or the first mode of the second embodiment, holds true for the surface smoothness, the surface roughness, the thickness, etc. of the second layer.

5. Resist Removing Step

The resist removing step in this embodiment is the step of removing the resist 2, together with the part of the second layer 3a, after the formation of the second layers 3a, 3b, as shown in FIG. 20(e).

A common resist removing method can be used to remove the resist in the resist removing step. For example, ashing by oxygen plasma treatment or cleaning with an organic solvent may be used. In this embodiment, the resist 2 is preferably removed, together with the second layer 3a, by applying a removing agent (peeling agent), such as an organic solvent, to the resist. Such a method can remove the resist in a simple manner. In an exemplary removing method using an organic solvent, the resist is dissolved and removed by using a mixed solvent of methyl ethyl ketone (MEK), isopropyl alcohol (IPA) and methanol.

6. Protective Layer Forming Step

The protective layer forming step in this embodiment is the step of forming the protective layer 4 by performing wet plating of the exposed surface of the first layer 1 after removing the resist 2 together with the second layer 3a, as shown in FIG. 20(f).

According to this embodiment, the protective layer is formed in the protective layer forming step in those areas where the second layer is not formed, i.e. in those areas where the first layer is exposed. When forming the second-layer fine linear three-dimensional structures, whose longitudinal direction differs from that of the first-layer fine linear three-dimensional structures, in the surface of the second layer in the second three-dimensional structure forming step, the protective layer can protect the first-layer fine linear three-dimensional structures from being damaged. The protective layer therefore enables efficient formation of the second-layer three-dimensional structures in the surface of the second layer. Thus, it becomes possible to form the second-layer fine linear three-dimensional structures easily and with high accuracy, without affecting the first-layer fine linear three-dimensional structures.

The protective layer is formed by performing wet plating of the exposed surface of the first layer after the resist forming step. The protective layer can therefore be formed selectively only on the surface of the first layer composed of a metal and, in addition, the thickness of the protective layer can be easily adjusted. The protective layer, formed adjacent to the second layer, may be made thinner than the second layer so as to facilitate the formation of the second-layer fine linear three-dimensional structures in the second three-dimensional structure forming step.

Any wet plating method can be used to form the protective layer. Examples of wet plating include electroplating, electroless plating, molten zinc plating, molten aluminum plating, plating with an insoluble anode, etc. Of these, electroplating is preferred in this step; because the second layer has insulating properties, the protective layer can be formed selectively only in those areas where the second layer is not formed, i.e. in those areas where the first layer is exposed.

Figure 21:
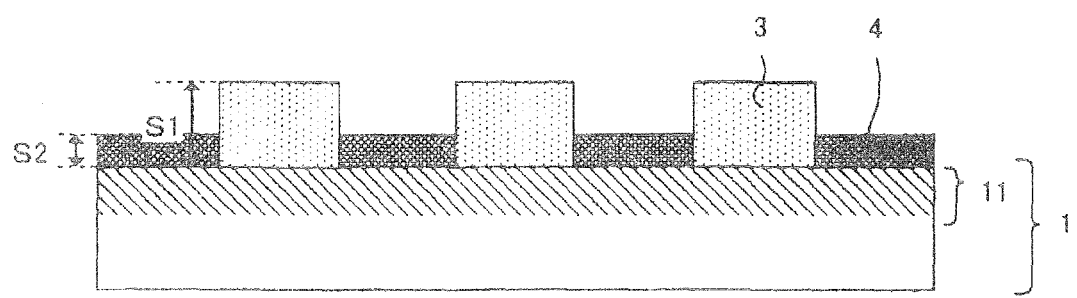
FIG. 21 is a diagram illustrating a protective layer.
Figure 22:
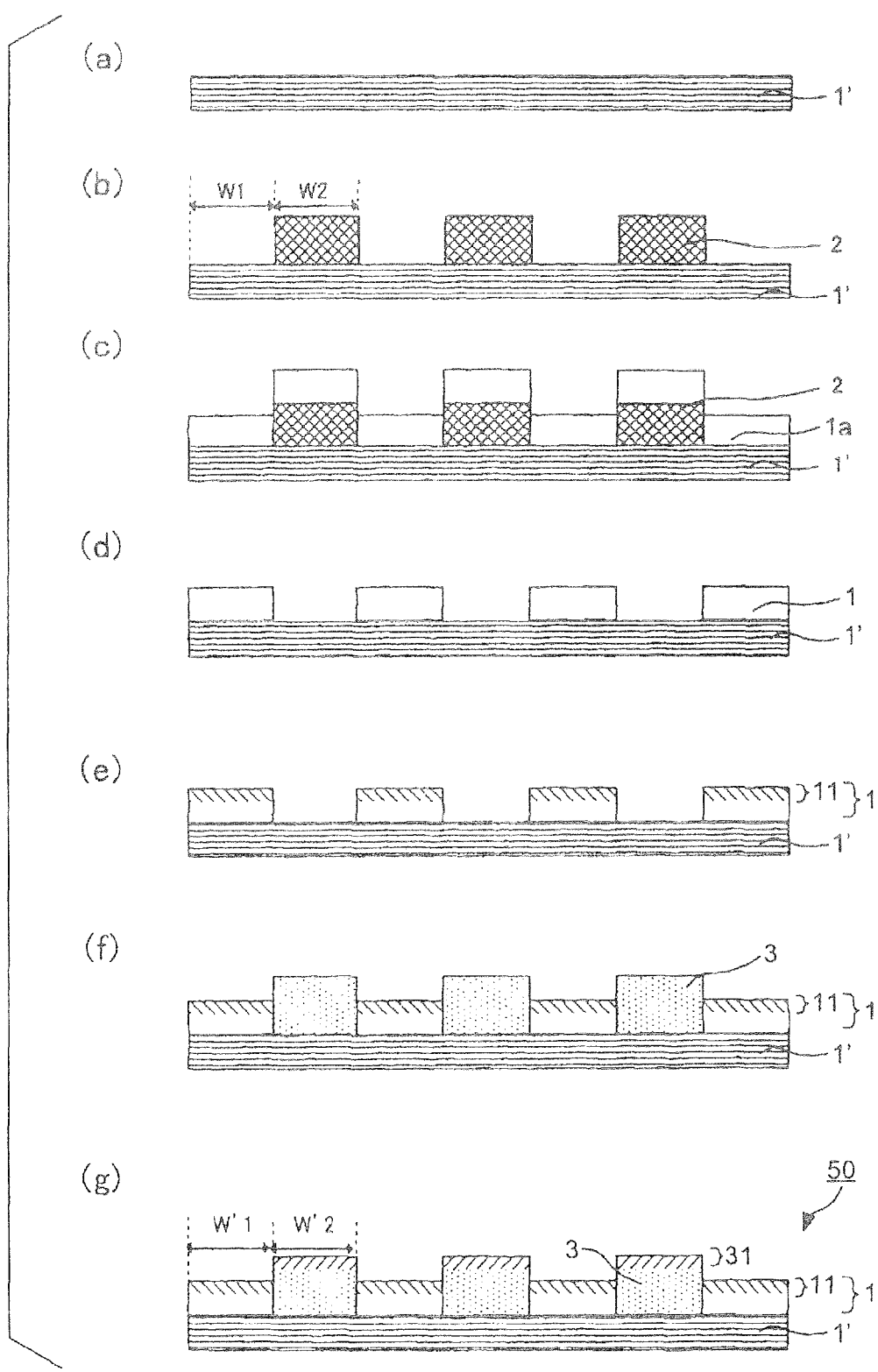
FIG. 22 is a process chart illustrating yet another exemplary method for producing a mold for a patterned alignment film for three-dimensional display.

The thickness of the protective layer is not particularly limited as long as the protective film can protect the fine linear three-dimensional structures formed in the first layer, does not prevent the formation of the fine linear three-dimensional structures in the surface of the second layer in the below-described second three-dimensional structure forming step and, in addition, can achieve the intended effect. In this embodiment the protective layer is preferably thinner than the adjacent second layer. Thus, as shown in FIG. 21, the thickness S1 of the second layer 3 and the thickness S2 of the protective layer 4 preferably satisfy the following relation: S1>S2>0.

The material for the protective layer is not particularly limited as long as it is capable of wet plating and, in addition, the protective layer can be removed after the below-described second three-dimensional structure forming step. Specific examples of the material include nickel, copper, aluminum, chromium, stainless steel (SUS), etc.

The material of the protective layer preferably differs from the material of the first layer. When the protective layer and the first layer are made of different materials, and the first layer has a resistance to an etching solution to be used in the below-described protective layer removing step, only the protective layer, formed on the first layer, can be selectively removed without causing a change in the fine linear three-dimensional structures formed in the surface of the first layer.

When the material of the protective layer differs from the material of the first layer, examples of the combination of the materials of the protective layer and the first layer (protective layer/first layer) may include copper/SUS, nickel/SUS, chromium/SUS, copper/aluminum, nickel/aluminum, chromium/aluminum, copper/chromium, nickel/chromium, nickel/copper, chromium/copper, copper/nickel, and chromium/nickel. Of these, nickel/copper, chromium/copper and chromium/nickel are preferred in this embodiment, and chromium/nickel is especially preferred.

7. Second Three-dimensional Structure Forming Step

The second three-dimensional structure forming step in the first mode of this embodiment is the step of forming fine linear three-dimensional structures 31 in the surfaces of the second layer 3 and the protective layer 4, formed on the first layer 1, as shown in FIG. 20(g). The foregoing description, given with reference to the first mode of the first embodiment or the first mode of the second embodiment, holds true for the second-layer three-dimensional structures and a method for forming the second-layer three-dimensional structures, which is usable in this step.

8. Protective Layer Removing Step

The protective layer removing step in this embodiment is the step of removing the protective layer 4, which is formed adjacent to the second layer 3 on the first layer 1 and which protects the fine linear three-dimensional structures 11 formed in the surface of the first layer 1, from the first layer 1, as shown in FIG. 20(h).

Any method can be used to remove the protective layer if it can selectively remove the protective layer that has been formed by wet plating of the exposed surface of the first layer. For example, an etching method using an etching solution may be used.

Wet etching may be performed in this step by applying an etching solution onto the protective layer, or by immersing the protective layer in an etching solution. The etching time may be appropriately adjusted based on the etching rate of the protective layer so as to achieve the intended etching profile.

Any etching solution can be used in this step if it can etch away the protective layer. The type of an etching solution to be used may differ depending on the material of the protective layer and on the material of the first layer underlying the protective layer. When the material of the first layer is a chromium-based material and the material of the protective layer is a titanium-based material, hydrofluoric acid or a mixed solution of potassium hydroxide and hydrogen peroxide can be used as an etching solution. The use of a mixed solution of potassium hydroxide and hydrogen peroxide is preferred. When the material of the first layer is a titanium-based material and the material of the protective layer is a chromium-based material, a mixed solution of ceric ammonium nitrate and perchioric acid or a mixed solution of sulfuric acid and phosphoric acid can be used as an etching solution. The use of a mixed solution of ceric ammonium nitrate and perchioric acid is preferred. The use of such an etching solution can selectively remove only the protective layer, formed on the first layer, without causing a change in the fine linear three-dimensional structures formed in the surface of the first layer.

9. Other Steps

The method for producing a mold in this embodiment comprises the above-described steps. As described above under the heading "8. Other steps" with reference to the first mode of the first embodiment, the method of this embodiment may optionally include other step(s).

B. Second Mode (Second Aspect)

In a mold for a patterned alignment film for three-dimensional display, produced by the method in the second mode of this embodiment, first-layer fine linear three-dimensional structures and second-layer fine linear three-dimensional structures are formed in the same direction.

A method for producing a mold in the second mode includes: a first layer forming step of forming a first layer composed of a metal; a first three-dimensional structure forming step of forming fine linear three-dimensional structures in the surface of the first layer in an approximately constant direction; a resist forming step of forming a resist in a parallel stripe pattern on the surface of the first layer after the first three-dimensional structure forming step; a second layer forming step of forming a second layer, composed of an inorganic material, by performing dry plating of the surfaces of the resist and the part of the exposed first layer after the resist forming step; a removing step of removing the resist and the second layer formed on the surface of the resist; a protective layer forming step of forming a protective layer by performing wet plating of the exposed surface of the first layer after the removing step; a second three-dimensional structure forming step of forming fine linear three-dimensional structures in the surface of the second layer in an approximately constant direction which is the same as the direction in which the first-layer three-dimensional structures are formed; and a removing step of removing the protective layer.

The method for producing a mold for a patterned alignment film for three-dimensional display in the second mode will now be described with reference to FIG. 20. FIG. 20 is a process chart illustrating an exemplary method for producing a mold for a patterned alignment film for three-dimensional display. The mold production method in the second mode of this embodiment can be performed in the same manner as that described above with reference to the first mode, and therefore a detailed description thereof is omitted. FIG. 20(a) illustrates the first layer forming step, FIG. 20(b) the first three-dimensional structure forming step, FIG. 20(c) the resist forming step, FIG. 20(d) the second layer forming step, FIG. 20(e) the resist forming step, FIG. 20(f) the resist removing step, FIG. 20(g) the second three-dimensional structure forming step, and FIG. 20(h) the protective layer removing step.

The method for producing a mold for a patterned alignment film for three-dimensional display in the second mode can achieve the same effects as the mold production method in the first mode.

The mold production method in the second mode of the third embodiment can produce the same mold 50 as that produced by the mold production method in the second mode of the first embodiment, described above with reference to FIGS. 2, 13 and 14. The use of the mold 50 produced can produce the same alignment film and the same patterned retardation film as those of the second mode of the first embodiment, described above with reference to FIG. 15.

The mold production method in the second mode of this embodiment differs from that in the first mode of this embodiment in the direction in which the fine linear three-dimensional structures are formed in the second three-dimensional structure forming step. Further, the thicknesses of the first layer and the second layer can be set different from those in the first mode of this embodiment. The relevant description given above with reference to the second mode of the first embodiment or the second mode of the second embodiment holds true for the direction of the second three-dimensional structures and the thicknesses of the first layer and the second layer in the second mode of this embodiment. On the other hand, with reference to the first layer forming step, the first three-dimensional structure forming step, the resist forming step, the resist removing step, the protective layer forming step, the protective layer removing step, and other step(s) in the second mode of this embodiment, these steps can be performed in the same manner as in the above-described first mode of this embodiment.

C. Other Mode (Other Aspect)

As in the first embodiment, in a mold for a patterned alignment film for three-dimensional display in another mode, first-layer fine linear three-dimensional structures and second-layer fine linear three-dimensional structures may be formed in different directions, and the level of the surface of the first layer may be different from the level of the surface of the second layer. The mold production method in this mode can achieve the same effects as described above under the heading "C. Other Mode" with reference to the first embodiment.

D. Other Features

The mold for a patterned alignment film for three-dimensional display, produced by the method according to the present invention, has recessed portions (first layer) and raised portions (second layer), formed in a stripe pattern, and has fine linear three-dimensional structures formed in the surface in an approximately constant direction.

The mold for a patterned alignment film for three-dimensional display is used to produce a patterned alignment film for three-dimensional display which is to be used for a patterned retardation film for three-dimensional display. More specifically, the mold is used to produce a patterned alignment film for three-dimensional display, having first alignment regions (raised portions) and second alignment regions (recessed portions) each having fine linear three-dimensional structures formed in the surface, by transferring the corresponding fine linear three-dimensional structures of the mold to an alignment film-forming layer composed of a resin composition.

The above description is merely illustrative, and is not intended to limit the present invention. Any technical idea or concept that is substantially the same as the inventive concept as expressed herein should be construed to fall within the scope of the present invention.

<Example of the Third Embodiment>

The following example illustrates the present invention in greater detail.

EXAMPLE (First Layer Forming Step)

Machining of an aluminum pipe (series 5000 aluminum material) having a diameter of 300 mm and a length of 1260 mm was carried out to produce a mold. After flattening the aluminum surface by means of a lathe, the aluminum surface was subjected to copper electroplating to form a copper layer having a thickness of 200 to 300 μm as an underlayer. Thereafter, the surface of the underlayer was subjected to abrasive polishing to impart smoothness to the surface. Next, the surface of the underlayer was subjected to nickel plating to form a nickel layer having a thickness of about 5 μm as a first layer. Scratches that had been produced on the surface of the underlayer by the abrasive polishing were buried in the nickel layer formed.

(First Three-Dimensional Structure Forming Step)

After the formation of the first layer, rubbing of the surface of the first layer was performed at a polishing angle of 45° by the use of a rubbing cloth YA18R (Yoshikawa Chemical Co., Ltd.), thereby forming fine linear three-dimensional structures in the entire surface of the first layer.

(Removal Step)

After the first three-dimensional structure forming step, the surface of the first layer, having the fine linear three-dimensional structures formed therein, was cleaned e.g. with a solvent to remove polishing debris and abrasive particles from the surface.

(Resist Forming Step)

After the removal step, a negative resist material was applied to the entire surface of the second layer, followed by drying at room temperature to form a resist coating having an appropriate thickness (about 3 to 5 μm). Thereafter, the resist coating was subjected to lithography with a laser having an adjusted wavelength to expose the resist, followed by development to form a parallel stripe pattern of resist films.

(Second Layer Forming Step)

Next, a second layer of diamond-like carbon (DLC), having a thickness of 0.1 to 1 μm, was formed by dry plating on the surface of the first layer.

(Resist Removing Step)

Next, the resist was dissolved and removed from the surface of the first layer by using a mixed solution of methyl ethyl ketone (MEK), isopropyl alcohol (IPA) and methanol.

(Protective Layer Forming Step)

After the resist removing step, the exposed surface of the first layer was subjected to chromium electroplating, a wet plating treatment, to form a chromium layer having a smaller thickness than the adjacent second layer.

(Second Three-dimensional Structure Forming Step)

After the protective layer forming step, the surface of the mold workpiece was subjected to paper polishing with a diamond film to form fine linear three-dimensional structures in the surface of the second layer in a direction which differs by 90 degrees from the direction in which the fine linear three-dimensional structures are formed in the surface of the first layer.

(Protective Layer Removing Step)

After the second three-dimensional structure forming step, only the protective layer of chromium was peeled off and removed with an etching solution. The etching solution was one that can selectively remove only the protective layer (chromium layer) without causing a change in the fine linear three-dimensional structures of the surface of the first layer (nickel layer).

In this manner was produced a mold for a patterned alignment film for three-dimensional display, having the first layer and the second layer arranged alternately in a parallel stripe pattern and having the first-layer and second-layer fine linear three-dimensional structures formed in the surface of the first layer and the surface of the second layer in 45°/135° directions.

[Evaluation]
(Production of Patterned Retardation Film)

The shape of the surface of the mold for a patterned alignment film for three-dimensional display according to the present invention, produced in the example, was transferred to an ultraviolet curable resin on a substrate film having no retardation. Thereafter, an ultraviolet curable liquid crystal, available from Merck, was applied onto the shaped rein by spin coating to form a retardation layer whose thickness was adjusted to have a retardation value of 125 nm, thereby producing a patterned retardation film.

As a result of evaluation of the patterned retardation film, it was confirmed that because of the formation of the hard metal protective layer by wet plating, only the second layer can be polished, without re-polishing polishing scratches on the first layer, during polishing of the second layer, and that 45°/135° linear polishing marks were formed in each stripe of the stripe pattern in the surfaces of the first and second layers and, in conformity with the polishing marks, the optical axes of the liquid crystal were aligned precisely in 45°/135° directions.

<<Fourth Embodiment>>

A fourth embodiment will now be described with reference to a first mode (first aspect) and a second mode (second aspect).

A. First Mode (First Aspect)

In a mold for a patterned alignment film for three-dimensional display in the first mode, first-layer fine linear three-dimensional structures are formed in a direction different from that of second-layer fine linear three-dimensional structures.

A method for producing a mold in the first mode includes: an underlayer preparation step of preparing an underlayer composed of a metal material; a resist forming step of forming a resist in a parallel stripe pattern on the surface of the underlayer; a first layer forming step of forming a first layer-forming layer, composed of an inorganic material having insulating properties, by performing dry plating of the surfaces of the underlayer and the resist, and then removing the laminate of the resist and the part of the first layer-forming layer overlying the resist, thereby forming a first layer in a parallel stripe pattern; a first three-dimensional structure forming step of forming first fine linear three-dimensional structures in the surface of the first layer in an approximately constant direction; a second layer forming step of forming a second layer, composed of a metal material and having a thickness which is equal to or larger than the thickness of the first layer, by performing wet plating of only the exposed surface of the underlayer after the first three-dimensional structure forming step; and a second three-dimensional structure forming step of forming second fine linear three-dimensional structures in the surface of the second layer in an approximately constant direction different from the direction in which the first three-dimensional structures are formed.

The method for producing a mold in the first mode will now be described with reference to the relevant drawings. FIGS. 22(a) through 22(g) show a process chart illustrating an exemplary method for producing a mold in the first mode. First, in the underlayer preparation step, an underlayer 1', composed of a metal material, is prepared (FIG. 22(a)). Next, in the resist forming step, a resist material is applied onto the surface of the underlayer to form a resist film on the surface. The resist film is then exposed (not shown) e.g. by laser lithography in a parallel stripe pattern to form a resist 2 in a parallel stripe pattern on the surface of the underlayer 1' (FIG. 22(b)). Next, in the first layer forming step, a first layer-forming layer 1a, composed of an inorganic material having insulating properties, is formed by performing dry plating of the surfaces of the underlayer 1' and the resist 2 (FIG. 22(c)), and then the laminate of the resist 2 and the part of the first layer-forming layer 1a overlying the resist 2 is removed to form a first layer 1 in a parallel stripe pattern (FIG. 22(d)). Next, in the first three-dimensional structure forming step, the surface of the first layer 1 is subjected to cutting or roll pressing to form first fine linear three-dimensional structures 11 in an approximately constant direction (FIG. 22(e)). Next, in the second layer forming step, a second layer 3, composed of a metal material and having a larger thickness than the first layer 1, is formed by performing wet plating of the exposed surface of the underlayer 1' (FIG. 22(f)). Next, in the second three-dimensional structure forming step, the surface of the second layer 3 is subjected to the same machining as in the first three-dimensional structure forming step, thereby forming second fine linear three-dimensional structures 31 in an approximately constant direction which is different from the direction in which the first three-dimensional structures 11 are formed (FIG. 22(g)). According to the method for producing a mold in the first mode of this embodiment, a mold 50 can thus be produced through the above process steps.

A mold produced by the above-described production method in the first mode of this embodiment will now be described with reference to the relevant drawings. FIG. 2 is a schematic view showing an exemplary mold 50 produced by the production method in the first mode of this embodiment. FIG. 23(a) is a schematic plan view showing the surface of the mold 50, and FIG. 23(b) is a cross-sectional view taken along the line A-A of FIG. 23(a). As illustrated in FIGS. 23(a) and 23(b), the mold 50 includes the underlayer 1', the first layer 1 formed in a parallel stripe pattern on the underlayer 1' and having the first three-dimensional structures 11 formed in the surface, and the second layer 3 formed in a parallel stripe pattern on the underlayer 1', having a larger thickness than the first layer 1 and having the second three-dimensional structures 31 formed in the surface in a direction different from the direction in which the first three-dimensional structures 11 are formed in the surface of the first layer 1. The surface of the mold 50 has recessed portions (first layer 1) and raised portions (second layer 3), arranged alternately in a parallel stripe pattern. Though not shown diagrammatically, the mold production method of this embodiment may produce a mold in which the first layer and the second layer have the same thickness, i.e. the mold surface has no raised or recessed portions. The exemplary mold 50 shown in FIG. 2 is a roll mold. As illustrated in FIG. 23(a), the first three-dimensional structures 11 and the second three-dimensional structures 31 of the surfaces of the first layer 1 and the second layer 3 are formed in a direction at an angle of 135° and in a direction at an angle of 45°, respectively, with respect to the direction of rotation of the mold (roll mold) 50. Thus, the direction of the first three-dimensional structures 11 and the direction of the second three-dimensional structures 31 differ from each other by 90°. The arrows in FIG. 23(a) indicate the directions in which the first three-dimensional structures 11 and the second three-dimensional structures 31 are formed.

According to the illustrated embodiment, the second layer is formed in the second layer forming step in such a manner that the second layer has a larger thickness than the first layer having the first three-dimensional structures formed in the surface. Therefore, when forming the second three-dimensional structures in the surface of the second layer in the second three-dimensional structure forming step, the surface of the first layer can be prevented from being damaged. Further, in this embodiment an inorganic material is used for the first layer, and a metal material is used for the second layer. Therefore, the hardness of the first layer can be made higher than the hardness of the second layer. Accordingly, even in the case where the second layer is formed in the second layer forming step in such a manner that the second layer has the same thickness as the first layer, the surface of the first layer can be prevented from being damaged when forming the second three-dimensional structures in the surface of the second layer in the second three-dimensional structure forming step. It therefore becomes possible to form the fine linear three-dimensional structures of the surfaces of the first and second layers easily and with high accuracy. The use of the thus-produced mold can produce a high-quality patterned retardation film for three-dimensional display (hereinafter sometimes referred to simply as "patterned alignment film") which, when used in a three-dimensional display device, is unlikely to cause poor alignment.

The respective steps of the method for producing a mold in this embodiment will now be described.

1. Underlayer Preparation Step

The underlayer preparation step in the first mode of this embodiment is the step of preparing an underlayer composed of a metal material. Though the underlayer may or may not be formed on a substrate, it is preferably formed on a substrate. The foregoing description, given with reference to the first layer in the first mode of the first embodiment, holds true for the features (material, smoothness, roughness, thickness, etc.) of the underlayer in the first mode of this embodiment. The foregoing description, given with reference to the underlayer in the first mode of the first embodiment, holds true for the features (material, shape, smoothness, roughness, thickness, etc.) of the substrate in the first mode of this embodiment.

2. Resist Forming Step

The resist forming step in this embodiment is the step of forming a resist in a parallel stripe pattern on the surface of the underlayer 1. This step can be performed in the same manner as that described above under the heading "5. Resist forming step" with reference to the first embodiment or under the heading "3. Resist forming step" with reference to the second or third embodiment.

3. First Layer Forming Step

The first layer forming step in this embodiment is the step of forming a first layer-forming layer, composed of an inorganic material having insulating properties, by performing dry plating of the surfaces of the underlayer and the resist, and then removing the laminate of the resist and the overlying first layer-forming layer, thereby forming a first layer in a parallel stripe pattern.

(1) First Layer

The first layer which is formed in this step will now be described. The inorganic material for the first layer is not particularly limited if it has insulating properties and has desired adhesion to the underlayer and, in addition, if the intended first three-dimensional structures can be formed in the surface of the first layer in the below-described first three-dimensional structure forming step. Examples of usable inorganic materials may include the specific inorganic materials described above with reference to the first layer in the first mode of the first embodiment.

The thickness of the first layer is not particularly limited as long as the intended first three-dimensional structures can be formed in the below-described first three-dimensional structure forming step and, in addition, the thickness is smaller than the below-described thickness of the second layer. However, the thickness of the first layer is preferably in the range of 1 nm to 10 μm, more preferably in the range of 10 nm to 5 μm, still more preferably in the range of 50 nm to 3 μm, most preferably in the range of 0.1 μm to 2 μm. If the thickness of the first layer is less than the above range, it can be difficult to form the intended first three-dimensional structures in the surface with high accuracy. If the thickness of the first layer exceeds the above range, a larger amount of the inorganic material and a longer time will be needed to form the first layer. This leads to an increase in the production cost and a lowering of the production efficiency. Further, in the below-described second layer forming step, the second layer needs to be formed such that it has a larger thickness than the first layer. Thus, the formation of the first layer having a too large thickness necessitates the use of a larger amount of a metal material and a longer time for the formation of the second layer, resulting in a lowering of the productivity.

In the mold produced in this embodiment, the thickness of the first layer formed in this step, shown by the distance Da in FIG. 23(b), refers to one that takes into consideration the thickness of the region of the first layer where the first three-dimensional structures are formed. The distance Da indicates the average value of the distance from the surface of the underlayer to the tops of the raised portions of the first three-dimensional structures and the distance from the surface of the underlayer to the bottoms of the recessed portions of the first three-dimensional structures.

The first layer preferably has good surface smoothness. If the surface smoothness of the first layer is poor, it is sometimes difficult to form the intended first three-dimensional structures with high accuracy in the below-described first three-dimensional structure forming step. The first layer may have the same surface roughness as that described above under the heading "(1) Underlayer preparation step" with reference to the first embodiment, and therefore a description thereof is omitted.

The first layer is formed in this step in a parallel stripe pattern. The foregoing description under the heading "5. Resist forming step" holds true for the parallel strip pattern of the first layer of this embodiment, and therefore a description thereof is omitted.

(2) Method for Forming the First Layer

A method for forming the first layer, which can be used in this step, will now be described. A first layer-forming layer is first formed in this step by perming dry plating of the surfaces of the underlayer and the resist. Any dry plating method can be used in this step as long as it can form the first layer having a desired thickness on the surface of the underlayer. Examples of usable dry plating methods include: a physical vapor deposition method (PVD method) such as vacuum deposition plating, resistance heating, sputtering or ion plating; and a chemical vapor deposition method (CVD method) such as atmospheric pressure thermal CVD, reduced pressure thermal CVD or plasma CVD. A CVD method is preferably used when DLC is used as a material for the first layer-forming layer; the use of a CVD method can control the thickness of the DLC layer with higher accuracy.

The thickness of the first layer-forming layer is substantially the same as the above-described thickness of the first layer.

Next, in this step, the laminate of the resist and the part of the first layer-forming layer overlying the resist is removed. Any method can be used to remove the laminate if it can form the first layer in the intended stripe pattern on the surface of the underlayer and, in addition, can expose the surface of the underlayer by removing the laminate; a common resist removing method may be used to removing the laminate. For example, ashing by oxygen plasma treatment or cleaning with an organic alkaline solution may be used. Of these, cleaning with an organic alkaline solution is preferred in this embodiment.

4. First Three-dimensional Structure Forming Step

The first three-dimensional structure forming step in the first mode of this embodiment is the step of forming first fine linear three-dimensional structures in the surface of the first layer in an approximately constant direction. This step can be performed in the same manner as that described above under the heading "2. First three-dimensional structure forming step" with reference to the first mode of the first, second or third embodiment.

5. Second Layer Forming Step

The second layer forming step in this embodiment is the step of forming a second layer, composed of a metal material and having a thickness which is equal to or larger than the thickness of the first layer, by performing wet plating of only the exposed surface of the underlayer after the first three-dimensional structure forming step.

(1) Second Layer

The second layer which is formed in this step will now be described. The metal material for the second layer is not particularly limited as long as the second layer having the intended thickness can be formed by wet plating on the exposed surface of the underlayer. Examples of usable metal materials may include the specific metal materials described above under the heading "(1) Underlayer preparation step".

The material of the second layer preferably has a lower hardness than the material of the first layer. This is because when forming second three-dimensional structures in the surface of the second layer in the below-described second three-dimensional structure forming step, cutting or roll pressing can be permed at such a pressure as not to cause any scratches on the surface of the first layer. This makes it possible to produce a mold in which the first three-dimensional structures and the second three-dimensional structures have been formed with high accuracy. Such a metal material for the second layer can be appropriately selected from the above-described metal materials depending on the material of the first layer. For example, when the material of the first layer is DLC (diamond-like carbon), it is preferred to use nickel or chromium, in particular chromium, as a material for the second layer. The use of chromium, which is relatively hard, can form the second three-dimensional structures with high accuracy.

The material of the second layer may be the same as or different from the material of the underlayer. Any combination of the above-described metals can be used for the two layers. Examples of the combination of the materials of the second layer and the underlayer (second layer/underlayer) may include chromium/chromium, nickel/nickel, nickel/chromium, chromium/nickel, chromium/copper, nickel/copper, chromium/SUS, nickel/SUS, etc. The use of such a combination of materials enables the first layer having a high smoothness to be formed on the surface of the underlayer. This makes it possible to form the first three-dimensional structures with high accuracy in the surface of the first layer. Further, the use of such a metal for the second layer makes it possible to form the second three-dimensional structures with high accuracy in the surface of the second layer.

The thickness of the second layer formed in this step is equal to or larger than the thickness of the first layer. The difference between the thickness of the second layer and the thickness of the first layer is not particularly limited as long as the intended second three-dimensional structures can be formed in the surface of the second layer, without causing damage to the surface of the first layer, in the below-described second three-dimensional structure forming step. However, the difference is preferably in the range of 0 µm to 2 µm, more preferably in the range of 0 µm to 1 µm, most preferably in the range of 0 µm to 0.5 µm. If the difference is less than the above range, the surface of the first layer can be damaged when the surface of the second layer is subjected to cutting or roll pressing. If the difference exceeds the above range, a larger amount of the metal material and a longer time will be needed to form the second layer. This will make it difficult to produce a mold with high productivity.

In the mold produced by the production method of this embodiment, the difference between the thickness of the second layer and the thickness of the first layer, shown by the distance Db in FIG. 23(b), refers to one that takes into consideration the thickness of the region of the first layer where the first three-dimensional structures are formed and the thickness of the region of the second layer where the second three-dimensional structures are formed.

The thickness of the second layer is not particularly limited as long as the difference from the thickness of the first layer lies in the above range and may be arbitrarily determined depending on the thickness of the first layer, etc. However, the thickness of the second layer is preferably in the range of 1 nm to 10 µm, more preferably in the range of 10 nm to 5 µm, most preferably in the range of 50 nm to 3 µm.

In the mold produced in this embodiment, the thickness of the second layer formed in this step, shown by the distance Dc in FIG. 23(b), refers to one that takes into consideration the thickness of the region of the second layer where the second three-dimensional structures are formed. The distance Dc indicates the average value of the distance from the surface of the underlayer to the tops of the raised portions of the second three-dimensional structures and the distance from the surface of the underlayer to the bottoms of the recessed portions of the second three-dimensional structures.

The second layer preferably has good surface smoothness. If the surface smoothness of the second layer is poor, it is sometimes difficult to form the intended second three-dimensional structures with high accuracy in the below-described second three-dimensional structure forming step. The second layer may have the same surface roughness as that described above under the heading "(1) Underlayer preparation step" with reference to the first embodiment, and therefore a description thereof is omitted.

(2) Method for Forming the Second Layer

The second layer is formed by wet plating. Any wet plating method can be used as long as it can form the second layer having a desired thickness only on the exposed surface of the underlayer. Examples of usable wet plating methods include electroplating, electroless plating, molten zinc plating, molten aluminum plating, plating with an insoluble anode, etc. Of these, electroplating is preferred in this step; because the first layer has insulating properties, the second layer can be formed selectively only in those areas where the first layer is not formed, i.e. in those areas where the underlayer is exposed.

6. Second Three-dimensional Structure Forming Step

The second three-dimensional structure forming step in the first mode of this embodiment is the step of forming second fine linear three-dimensional structures in the surface of the second layer in an approximately constant direction different from the direction in which the first three-dimensional structures are formed. The foregoing description, given with reference to the first mode of the first, second or third embodiment, holds true for the second three-dimensional structures and a method for forming the second three-dimensional structures, which is usable in this step.

7. Other Steps

The method for producing a mold in this embodiment comprises the above-described steps. As described above under the heading "8. Other steps" with reference to the first mode of the first embodiment, the method of this embodiment may optionally include other step(s).

B. Second Mode (Second Aspect)

A method for producing a mold in the second mode includes: an underlayer preparation step of preparing an underlayer composed of a metal material; a resist forming step of forming a resist in a parallel stripe pattern on the surface of the underlayer; a first layer forming step of forming a first layer-forming layer, composed of an inorganic material having insulating properties, by performing dry plating of the surfaces of the underlayer and the resist, and then removing the laminate of the resist and the part of the first layer-forming layer overlying the resist, thereby forming a first layer in a parallel stripe pattern; a first three-dimensional structure forming step of forming first fine linear three-dimensional structures in the surface of the first layer in an approximately constant direction; a second layer forming step of forming a second layer, composed of a metal material and having a thickness which is larger than the thickness of the first layer, by performing wet plating of only the exposed surface of the underlayer after the first three-dimensional structure forming step; and a second three-dimensional structure forming step of forming second fine linear three-dimensional structures in the surface of the second layer in an approximately constant direction which is the same as the direction in which the first three-dimensional structures are formed.

Figure 24:
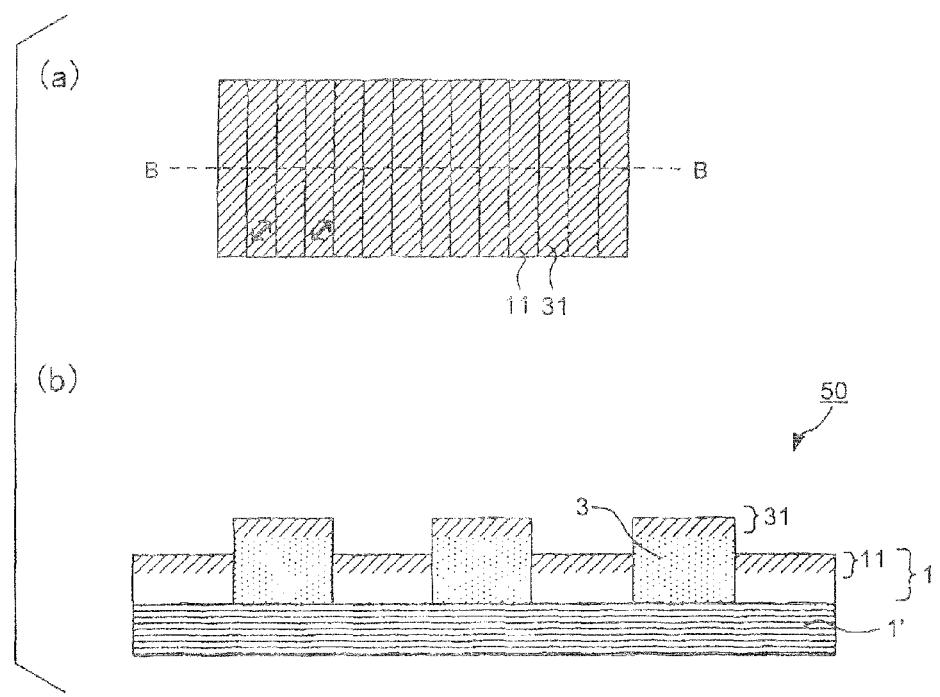
FIG. 24 shows schematic views illustrating another exemplary mold for a patterned alignment film for three-dimensional display.

A mold 50 produced by the above-described production method in the second mode of this embodiment will now be described with reference to the relevant drawings. FIG. 2 is a schematic view showing an exemplary mold 50 in the second mode of this embodiment. FIG. 24(a) is a schematic plan view showing the surface of the mold 50, and FIG. 24(b) is a cross-sectional view taken along the line B-B of FIG. 24(a). As illustrated in FIGS. 24(a) and 24(b), the mold 50 includes the underlayer 1' composed of a metal material, the first layer 1 formed in a parallel stripe pattern on the underlayer 1' and having the first three-dimensional structures 11 formed in the surface, and the second layer 3 formed in a parallel stripe pattern on the underlayer 1' and having the second three-dimensional structures 31 formed in the surface in a direction which is the same as the direction in which the first three-dimensional structures 11 are formed in the surface of the first layer 1. The surface of the mold 50 has recessed portions (first layer 1) and raised portions (second layer 3), arranged alternately in a parallel stripe pattern. The exemplary mold 50 for a patterned alignment film for three-dimensional display, shown in FIG. 2, is a roll mold. As illustrated in FIG. 24(a), the first three-dimensional structures 11 and the second three-dimensional structures 31 are formed in the same direction at an angle of 45° with respect to the direction of rotation of the mold (roll mold) 50 for a patterned alignment film for three-dimensional display. The arrows in FIG. 24(a) indicate the directions in which the first three-dimensional structures 11 and the second three-dimensional structures 31 are formed.

The method for producing a mold in the second embodiment can be performed by the same process as that described above with reference to FIGS. 22(a) through 22(g), and therefore a description thereof is omitted.

As with the above-described first mode of this embodiment, the second layer is formed in the second layer forming step in such a manner that the second layer has a larger thickness than the first layer having the first three-dimensional structures formed in the surface. Therefore, when forming the second three-dimensional structures in the surface of the second layer in the second three-dimensional structure forming step, the surface of the first layer can be prevented from being damaged. It therefore becomes possible to form the fine linear three-dimensional structures of the surfaces of the first and second layers easily and with high accuracy. The use of the thus-produced mold can produce a high-quality patterned retardation film for three-dimensional display which, when used in a three-dimensional display device, is unlikely to cause poor alignment.

The mold production method in the second mode of this embodiment differs from that in the first mode of this embodiment in the direction in which the fine linear three-dimensional structures are formed in the second three-dimensional structure forming step. Further, the thicknesses of the first layer and the second layer can be set different from those in the first mode of this embodiment. The relevant description given above with reference to the second mode of the first embodiment holds true for the direction of the second three-dimensional structures and the thicknesses of the first layer and the second layer in the second mode of this embodiment.

On the other hand, with reference to the underlayer preparation step, the resist forming step, the first layer forming step, the first three-dimensional structure forming step, and other step(s) in the second mode of this embodiment, these steps can be performed in the same manner as in the above-described first mode of this embodiment.

C. Other Mode (Other Aspect)

The mold produced by the mold production method in the first mode of this embodiment is used to produce a patterned alignment film which produces a patterned retardation film having a pattern of first retardation regions and second retardation regions, whose retardation values differ from each other due to different alignment directions of a rod-like compound contained in the retardation layer. On the other hand, the mold produced by the mold production method in the second mode of this embodiment is used to produce a patterned alignment film which produces a patterned retardation film having a pattern of first retardation regions and second retardation regions, whose retardation values differ from each other due to a difference in the thickness between the first retardation regions and the second retardation regions.

A method for producing a mold in another mode of this embodiment may be a method for producing a mold capable of producing a patterned alignment film which produces a patterned retardation film having first retardation regions and second retardation regions, whose retardation values differ from each other due to different alignment directions of a rod-like compound contained in the retardation layer and to a difference in the thickness between the first retardation regions and the second retardation regions. The method for producing such a mold may include a second layer forming step which is performed in the same manner as the above-described second layer forming step in the second mode of this embodiment, and a second three-dimensional structure forming step which is performed in the same manner as the above-described second three-dimensional structure forming step in the first mode of this embodiment.

D. Other Features

The mold produced by the method according to the present invention has recessed portions (first layer) and raised portions (second layer), formed in a parallel stripe pattern, and has fine linear three-dimensional structures formed in the surface in an approximately constant direction. Alternatively, the mold may have two types of surface areas formed alternately in a parallel stripe pattern and each having fine linear three-dimensional structures formed in the surface in an approximately constant direction, with the longitudinal directions of the linear three-dimensional structures being different between the two types of areas.

The mold is used to produce a patterned alignment film for three-dimensional display which is to be used for a patterned retardation film for three-dimensional display. More specifically, the mold is used to produce a patterned alignment film for three-dimensional display, having first alignment regions (raised portions) and second alignment regions (recessed portions) each having fine linear three-dimensional structures formed in the surface, by transferring the corresponding fine linear three-dimensional structures of the mold to an alignment film-forming layer composed of a resin composition.

The above description is merely illustrative, and is not intended to limit the present invention. Any technical idea or concept that is substantially the same as the inventive concept as expressed herein should be construed to fall within the scope of the present invention.

<Example of the Fourth Embodiment>

The following example illustrates the present invention in greater detail.

EXAMPLE

The underlayer preparation step was performed in the following manner: Machining of an aluminum pipe having a diameter of 300 mm and a length of 1260 mm was carried out to produce a mold. A series 5000 aluminum material was used in this test for the aluminum pipe because of good machinability of the material, though the use of a softer series 1000 aluminum material was also possible. After flattening the surface of the aluminum pipe by means of a lathe, the surface of the aluminum pipe was subjected to copper electroplating to form a copper plating film having a thickness of 200 µm to 300 µm. Thereafter, the surface of the copper film was subjected to abrasive polishing for centering of the pipe and imparting smoothness to the surface. Next, the surface of the copper film was subjected to nickel plating to form a nickel plating film having a thickness of about 5 µm as an underlayer. The nickel layer was formed in order for scratches, produced on the surface of the underlayer by the abrasive polishing, to be buried in the nickel layer. It is to be noted in this regard that if the scratches are not buried, the scratches could cause alignment of e.g. a liquid crystal in an alignment film produced by the use of the mold. A Cr plating film may be used instead of the Ni plating film. However, some Cr plating films have micro-cracks; it is necessary to select a Cr plating film having no micro-cracks. Though wet plating was used to form a film in this test, it is possible to form a film by dry plating. However, the use of wet plating is preferred because a film is preferably formed thick in order to bury therein scratches on the surface of the underlayer which were produced upon abrasive polishing.

The workpiece after the formation of the Ni plating film was subjected to a resist forming step. This step was performed by using a lithography apparatus manufactured by Think Laboratory Co., Ltd. First, the entire surface of the workpiece was coated with a resist having an appropriate thickness (about 3 to 5 µm), followed by drying at room temperature. The resist coating can be dried more quickly by drying it at a higher temperature. However, the use of a higher drying temperature may cause contraction of the resist and expansion of the aluminum pipe. It is therefore preferred to perform the drying at room temperature. A negative resist, manufactured by Think Laboratory Co., Ltd., was used as the resist. In this regard, a positive resist is weak against heat and can cause peeling, thermal deformation, etc. during the below-described formation of a DLC film as a first layer, performed at a high temperature. The use of a negative resist is therefore preferred. After the formation of the resist, the resist was subjected to lithography with a laser having an adjusted wavelength to expose the resist, followed by development to form a parallel stripe pattern of resist films.

Next, a first layer forming step was performed: A first layer having a thickness of 0.5 µm was formed by dry plating on the patterned surface of the workpiece. DLC was used in this test as a material for the first layer. However, it is possible to use other non-conductive hard material. The DLC layer is preferably as thin as 0.1 µm to 1 µm.

After the formation of the DLC layer, the resist was removed by using, as a removing solution, a mixed solution of MEK, IPA and methanol. The solvent penetrated into the resist, and dissolved and removed the resist, thereby forming a stripe pattern of the DLC film (first layer) and the underlayer.

Next, the workpiece was subjected to a first three-dimensional structure forming step: The entire surface of the first layer was polished at a polishing angle of 45 degrees by using a paper polishing machine manufactured by Think Laboratory Co., Ltd. The polishing angle was inputted into the paper polishing machine, and scratches were produced in the surface of the first layer in a 45-degree direction. The 45-degree scratches can be produced by setting the movement speed of the polishing head equal to the rotational speed of the cylinder. To produce the scratches, polishing was performed by means of a polishing film. Because of the thinness of the first layer, the underlayer may also be polished upon the polishing of the first layer, resulting in the formation of scratches in the surface of the underlayer. Such scratches, however, are to be buried in the below-described second layer. A diamond film No. 20000 (model number: LDF #20000), manufactured by Sankyo Rikagaku Co., Ltd., was used as a polishing film in the polishing. The use of a diamond film is because of the high hardness (Hv 1100-2500) of DLC: if an alumina film, a common polishing member, is used, the polishing member itself will be ground and the polishing member will produce broadened polishing scratches, which would cause poor alignment. After completion of the 45-degree direction polishing, the surface of the workpiece was cleaned e.g. with a solvent. Though the cleaning is optional, it is preferred to perform the cleaning in order to remove polishing debris, abrasive particles, etc. adhering to the workpiece surface.

Next, a second layer forming step was performed: After the polishing of the first layer, a second layer was formed by wet plating. By making use of the fact that the underlayer is a conductive layer and the first layer is a non-conductive layer, a Cr plating layer (second layer) having a thickness of 1 µm was formed by electroplating only on the surface of the underlayer. It is possible to make the thickness of the Cr plating layer the same as the thickness of the DLC layer (first layer). Because the Cr plating layer is to remain in the final product, the Cr plating layer should preferably be free of micro-cracks that could be deemed as product defects.

Next, a second three-dimensional structure forming step was performed: After the formation of the second layer, the surface of the second layer was subjected to polishing. In the case where the second layer is a Cr plating film, fine three-dimensional structures can be formed in the surface of the second layer by performing rubbing of the surface. Rubbing (polishing) of the surface of the second layer was carried out by means of a rubbing cloth YA18R manufactured by Yoshikawa Chemical Co., Ltd. (rubbing cloth YA19R or YA20R may also be used). The same polishing machine as used in the polishing of the surface of the first layer was used in the rubbing (polishing), but the polishing direction (angle) was changed to 135 degrees which differ by 90 degrees from the polishing direction in the polishing of the first layer. The polishing angle can be changed from 45 degrees to 135 degrees by rotating the cylinder in the opposite direction. Though the rubbing cloth makes contact also with the surface of the first layer during polishing of the second layer, fine three-dimensional structures will not be formed in the first layer because it is composed of the hard inorganic material DLC. It was confirmed in this regard that due to the difference in the hardness between the first layer and the second layer, the second layer was polished, whereas the first layer was not polished during the rubbing of the second layer. By carrying out the above steps, a mold was produced having the first-layer DLC pattern and the second-layer Cr pattern, formed alternately on the mold surface, and having 45°/135° polishing marks formed in the mold surface.

[Evaluation]

The shape of the surface of the mold, produced in the example, was transferred to an ultraviolet curable resin that had been applied onto a transparent substrate film having no retardation, such as a TAC film, a COP film (Zeonor) or an acrylic film. Thereafter, an ultraviolet curable liquid crystal, available from Merck, was applied onto the shaped rein by spin coating to form a retardation layer whose thickness was adjusted to have a retardation value of 125 nm, thereby producing a patterned retardation film. As a result of evaluation of the patterned retardation film, it was confirmed that the alignment direction of the surface of the first layer was 45 degrees and the alignment direction of the surface of the second layer was 135 degrees, no scratches were produced by the second polishing in the surface of the first layer, and a clean patterned retardation film can be produced.

<<Fifth Embodiment>>

Figure 25:
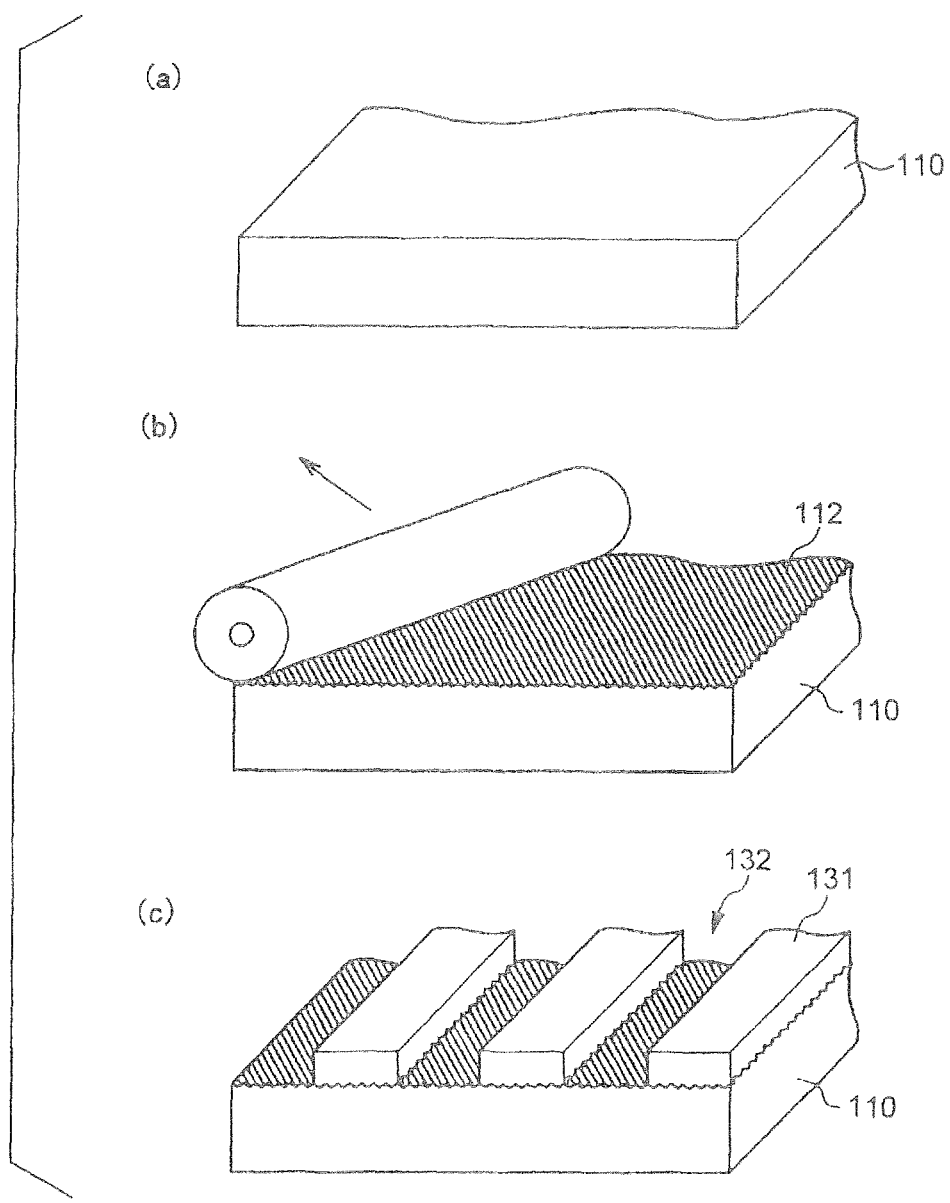
FIG. 25 is a process chart illustrating yet another exemplary method for producing a mold for a patterned alignment film for three-dimensional display, showing steps (a) to (c)
Figure 26:
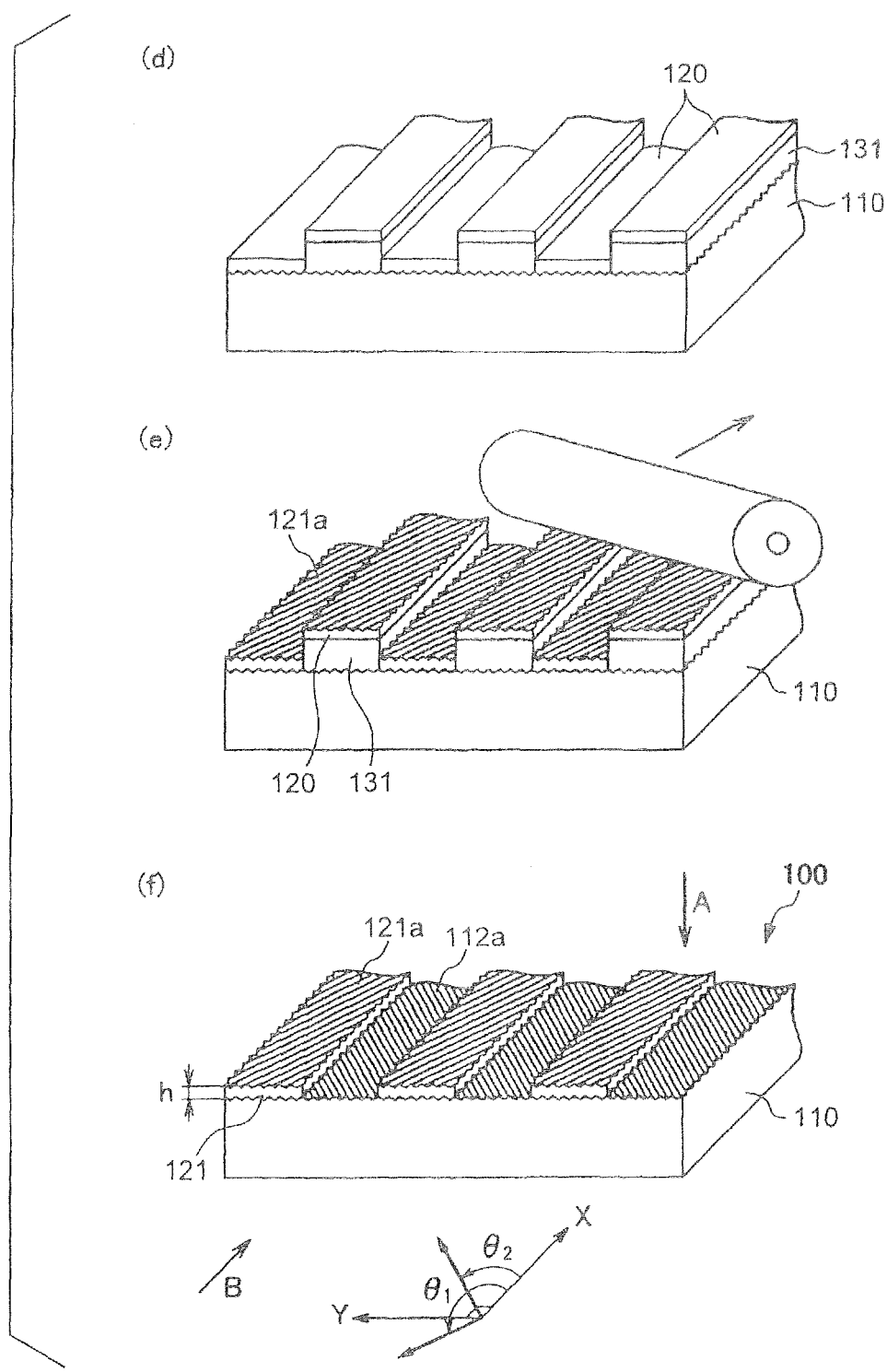
FIG. 26 is a process chart showing steps (d) to (f) subsequent to the steps shown in FIG. 25.

A fifth embodiment will now be described. FIGS. 25 and 26 show a process chart illustrating an exemplary method for producing a mold for three-dimensional display in the fifth embodiment. The mold production process comprises steps (a) to (f). In particular, the process comprises: a first polishing step of forming a first three-dimensional structure region, as shown in FIG. 25(b), in the surface of a first layer as shown in FIG. 25(a), composed of an inorganic material; a resist forming step of forming resist portions in a stripe pattern on the first three-dimensional structure region, as shown in FIG. 25(c); a second layer forming step of forming a second-layer film, composed of an inorganic material, on the surfaces of the resist portions and the non-resist portions, as shown in FIG. 26(d); a second polishing step of forming a second three-dimensional structure region in the surface of the second-layer film by polishing the surface of the film in a direction different from that in the first polishing step, as shown FIG. 26(e); and a resist removing step of removing the resist portions and the second-layer film on the resist portions, as shown FIG. 26(f). The respective steps will now be described in detail.

1. First Polishing Step

As shown in FIGS. 25(a) and 25(b), the surface of the first layer 110 is subjected to polishing to form a first three-dimensional structure region 112, composed of fine linear three-dimensional structures, in substantially the entire surface of the first layer 110.

The first layer 110 is a layer of an inorganic material that exists as an outermost layer of a substrate. The inorganic material is not particularly limited if the below-described layers can be laminated to and removed the first layer. Examples of the inorganic material include: metal materials such as nickel, copper, aluminum, tin, chromium, stainless steel (SUS), iron, etc.; inorganic oxides such as $SiO_2$, SiOx, $Al_2O_3$, $GeO_2$, $TiO_2$, $Cr_2O_3$, $ZrO_3$, $Ta_2O_5$, $Nb_2O_3$, etc.; inorganic nitrides such as $Si_3N_4$, AlN, TiN, TiCN, etc.; inorganic oxynitrides such as $SiO_xN_y$; inorganic carbides such as SIC; and DLC (diamond-like carbon). Of these, metal materials and DLC, in particular nickel, chromium and DLC are preferred from the viewpoint of being capable of laminating/removing the below-described layers to/from the first layer.

The fine linear three-dimensional structures in the first three-dimensional structure region 112 are formed in the surface of the first layer 110 in a random pattern in an approximately constant direction. The "fine linear three-dimensional structures formed in a random pattern in an approximately constant direction" herein are, for example, fine scratch-like structures extending in an approximately constant direction as formed e.g. by rubbing of the surface. The fine linear three-dimensional structures are not particularly limited if a pattered alignment film, produced by the use of the mold, can produce a patterned retardation film capable of three-dimensional display. The foregoing description given with reference to the first embodiment holds true for the fine linear three-dimensional structures of this embodiment.

The cross-sectional shape of the fine linear three-dimensional structures is not particularly limited if the structures can align a liquid crystal compound in a predetermined direction. For example, the fine linear three-dimensional structures may each have a generally rectangular, triangular or trapezoidal cross-sectional shape. The cross-sectional shape of each structure may not necessarily be constant. The height, the width and the pitch of the fine linear three-dimensional structures are not particularly limited if they can align a liquid crystal compound.

In this embodiment the width of each fine linear three-dimensional structure is preferably in the range of 1 nm to 1000 nm, more preferably in the range of 1 nm to 500 nm, most preferably in the range of 1 nm to 100 nm. The height of each fine linear three-dimensional structure is preferably in the range of 1 nm to 500 nm, more preferably in the range of 1 nm to 100 nm, most preferably in the range of 1 nm to 50 nm. The pitch of the fine linear three-dimensional structures may not necessarily be constant; however, it is preferably in the range of about 1 nm to 1000 nm, more preferably in the range of 1 nm to 100 nm. The fine linear three-dimensional structures having the above dimensions can stably align a liquid crystal compound.

Examples of polishing methods usable in this step may include abrasive polishing, paper polishing, tape polishing, a blasting method such as sandblasting, shot blasting, grit blasting or glass bead blasting, a brush graining method, including rubbing, using a brush member composed of fibers of a synthetic resin such as nylon, polypropylene or vinyl chloride, nonwoven fabric, animal hair or steel wires, a wire graining method using a metal wire, a method (brush graining method) which comprises brush-polishing the surface of the surface of the first layer while supplying a slurry containing abrasive particles, a ball graining method, a buff polishing method such as liquid honing, a shot peening method, etc.

Tape polishing or paper polishing is preferably used when the first layer 110 is composed of a hard material such as DLC. In this embodiment a metal material, such as chromium or nickel, can also be used for the first layer 110 and, in that case, rubbing is also preferably used.

2. Second Layer Forming Step

First, as shown in FIG. 25(*c*), a stripe pattern of first resist portions 131 and non-resist portions 132 is formed on the surface of the first layer 110 having the first three-dimensional structure region 112 formed therein.

In particular, a resist material is applied onto the surface of the first layer 110 to form a resist film (not shown). Thereafter, the resist film is exposed in a parallel stripe pattern, followed by development to form a parallel stripe pattern of the first resist portions 131 and the non-resist portions 132. The resist material is not particularly limited, and either a positive resist material or a negative resist material may be used. A chemically-amplified resist based on a novolac resin, for example, can be used as the positive resist material. The negative resist material may be exemplified by a chemically-amplified resist based on a crosslinked resin, for example, a chemically-amplified resist prepared by adding a crosslinking agent and an acid generator to polyvinyl phenol.

A common coating method can be used to apply the resist material onto the first layer 110, thereby forming the resist film. Examples of the coating method include spin coating, casting, dipping, bar coating, blade coating, roll coating, gravure coating, flexographic printing, spray coating, etc.

Electron beam lithography or laser lithography, which is generally used in photomask lithography, may be used as a method to expose the resist film in a parallel stripe pattern. It is also possible to use a method which involves ultraviolet irradiation of the resist film with the use of a mask. In particular, laser lithography is preferred because the method can expose the resist film in a parallel stripe pattern with high accuracy even when the above-described metal substrate has the shape of a roll. The resist film after exposure can be developed by a common developing method such as alkali development.

Next, as shown in FIG. 26(*d*), a thin second-layer film 120 of an inorganic material, preferably having a thickness of not less than 0.01 µm and not more than 1 µm, is formed on the resist portions 131 and the non-resist portions 132, whereby a second-layer pattern of the second-layer film 120 is formed in the recesses of the non-resist portions 132. If the thickness of the second-layer film 120 is less than 0.01 µm, the fine linear three-dimensional structures, which have been formed by polishing or rubbing in the surface of the first layer, may not be buried in the second-layer film. Therefore, the first-layer fine three-dimensional structures and the second-layer fine three-dimensional structures may co-exist in the second-layer film, leading to poor alignment. If the thickness exceeds 1 µm, on the other hand, the large level difference may result in an undesirable change in the amount of retardation. The thin second-layer film 120 may be formed e.g. by a physical vapor deposition method (PVD method) such as sputtering, ion plating or vacuum deposition, a chemical vapor deposition method (CVD method), plating or coating.

The inorganic material for the second-layer film 120 can either be the same as or different from the material for the first layer 110; however, it is preferred to use the same inorganic material from the viewpoints of the adhesion between the layers and the productivity. Thus, it is preferred to use the combination (first layer/second-layer film) of DLC/DLC, chromium/chromium, nickel/nickel, or the like, though it is possible to use a combination of different materials, such as DLC/Ni, DLC/Cr, Cr/Ni or Ni/Cr.

3. Second Polishing Step

Next, as shown in FIG. 26(*e*), the entire surface of the second-layer film 120, i.e. the surface of the second-layer film 120 on the resist portions 131 and the non-resist portions 132, is polished in a direction different from that of the first three-dimensional structure region 112*a*, thereby forming a second three-dimensional structure region 121*a*, composed of fine linear three-dimensional structures, in the surface of the second-layer pattern 121. This step is basically the same as the first polishing step described above with reference to FIG. 25(*b*) except that the polishing direction is different from that of the first three-dimensional structure region 112*a*, and therefore a description thereof is omitted.

The first three-dimensional structure region 112a and the second three-dimensional structure region 121a differ in the longitudinal direction of the fine linear three-dimensional structures: The longitudinal direction 8 of the fine linear three-dimensional structures is 135 degrees in the first three-dimensional structure region 112a and 45 degrees in the second three-dimensional structure region 112a (θ1=135 degrees, θ2=45 degrees in FIG. 26(f)). The longitudinal direction of the fine linear three-dimensional structures thus differs by 90 degrees between the two regions. However, the difference is not limited to 90 degrees and may be, for example, 45 degrees. Further, it is possible to use other combinations of the directions (angles) of the fine linear three-dimensional structures, for example, θ1=0 degree and θ2=90 degrees.

Lastly, as shown in FIG. 26(f), the resist portions 131 are removed e.g. with an alkaline solution. The second-layer film 120 on the resist portions 131 is removed together, whereby the underlying first three-dimensional structure region 112a of the first layer 110 becomes exposed, while leaving the second-layer pattern 121 having the second three-dimensional structure region 121a formed in the surface. A mold 100 for a patterned alignment film for three-dimensional display is thus produced.

As shown in FIG. 26(f), in a planar view A of the mold 100 for a patterned alignment film for three-dimensional display, the first three-dimensional structure region 112a and the second three-dimensional structure region 121a are formed alternately in a stripe pattern. Further, in a cross-sectional view B of the mold 100, the second-layer pattern 121 exists as raised portions on the first layer 110, with the level difference "h" corresponding to the thickness of the second-layer pattern 121.

The level difference "h" is preferably in the range of 10 nm to 5000 nm, more preferably in the range of 20 nm to 100 nm, most preferably in the range of 20 nm to 50 nm. By making the level difference "h" not less than 10 nm, disorder in the alignment of liquid crystal molecules can be effectively prevented in the vicinities of the boundaries between the first three-dimensional structure region 112a and the second three-dimensional structure region 121a. By making the level difference "h" not more than 5000 nm, the occurrence of moire due to interference between a pixel array in a display panel and the boundaries between the first three-dimensional structure region 112a and the second three-dimensional structure region 121a can be reduced.

5. Patterned Alignment Film/Patterned Retardation Film

Figure 27:
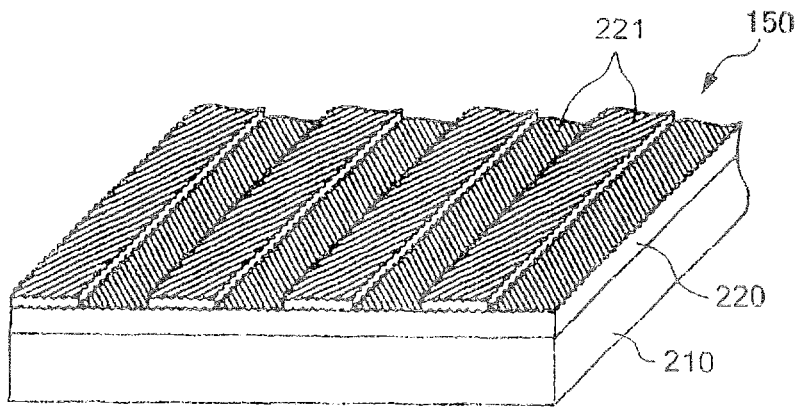
FIG. 27 is a perspective view of a patterned alignment film for three-dimensional display which has been shaped by using a mold.

As shown in FIG. 27, the mold 100 for a patterned alignment film for three-dimensional display thus obtained is brought into pressure contact with the resin surface of a laminate consisting of a transparent substrate film 210 having a small retardation value, e.g. composed of TAC (triacetyl cellulose), COP (cyclic olefin polymer) or an acrylic rein, and a resin 220 to be shaped, such as a known UV curable resin, whereby the fine linear three-dimensional structures of the first three-dimensional structure region 112a and the second three-dimensional structure region 121a of the mold 100 are transferred to the surface 221 of the resin 220. Subsequently, the laminate is UV-cured to obtain a patterned alignment film-containing film 150 consisting of a patterned alignment film 220a, composed of the cured resin 220, and the transparent substrate film 210 that supports the patterned alignment film 220a. The patterned alignment film 220a has the surface 221 consisting of first alignment regions 8B and second alignment regions 8A arranged alternately. The first alignment regions 8B and the second alignment regions 8A each have linear three-dimensional structures; the linear three-dimensional structures of the first alignment regions 8B are formed in a different direction from that of the linear three-dimensional structures of the second alignment regions 8A. The linear three-dimensional structures of the patterned alignment film 220a have been shaped by transfer of the fine linear three-dimensional structures of the first three-dimensional structure region 112a and the second three-dimensional structure region 121a of the mold 100, and thus have shapes complementary to the shapes of the fine linear three-dimensional structures of the first three-dimensional structure region 112a and the second three-dimensional structure region 121a.

Figure 28:
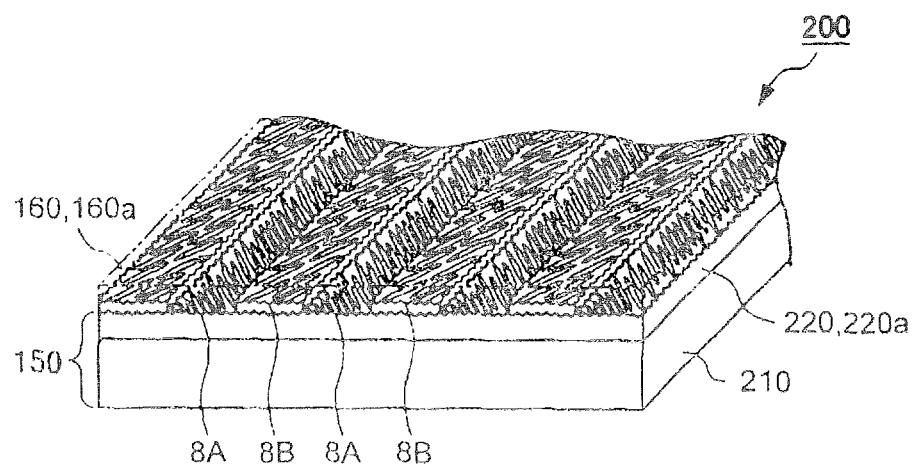
FIG. 28 is a perspective view of a patterned retardation film consisting of the patterned alignment film for three-dimensional display shown in FIG. 27, and an aligned liquid crystal layer formed on the film.
Figure 29:
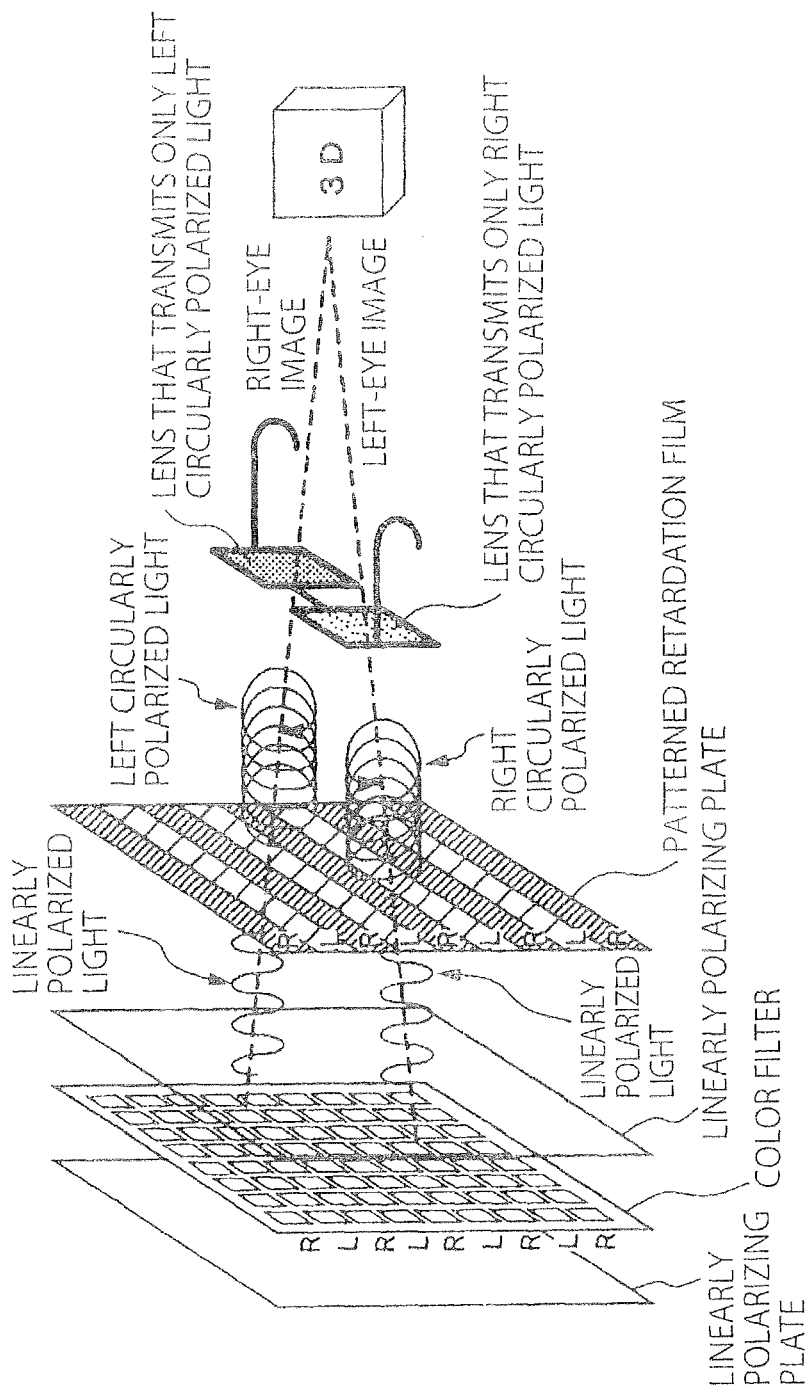
FIG. 29 is a schematic view showing an exemplary liquid crystal display device capable of displaying three-dimensional images by a passive method.

As shown in FIG. 28, a polymerizable liquid crystal compound 160 is applied onto the surface 221 of the shaped resin, whereby the liquid crystal molecules become aligned along the fine linear three-dimensional structures. Subsequently, the liquid crystal compound 160 is polymerized and cured to form a patterned retardation layer 160a composed of the aligned polymerized/cured liquid crystal molecules (liquid crystal compound), thereby producing a patterned retardation film 200 consisting of the transparent substrate film (having a small retardation value) 210, the overlying patterned alignment film 220a, and the overlying patterned retardation layer 160a.

In order to ensure an aligning ability to securely cause the liquid crystal molecules of the liquid crystal compound 160, constituting the patterned retardation layer 160a, to align in the running directions (longitudinal directions) of the linear three-dimensional structures of the first alignment regions 8B and the second alignment regions 8A, conceptually shown by the diagonal lines in FIG. 27, it is necessary to design the height of the linear three-dimensional structures of the patterned alignment film 220a (the level difference between the tops of the raised portions and the bottoms of the recessed portions in the linear three-dimensional structures) to be sufficiently large relative to the dimensions (especially in the width and diametrical directions) of a common liquid crystal molecule. Thus, the linear three-dimensional structures need to have a height of at least 1 nm. However, if the height exceeds 500 nm, there will be no significant increase in the aligning ability. Rather, the aligning ability may decrease because of broadening of the angular distribution of the running directions (longitudinal directions) of the linear three-dimensional structures upon their shaping. The height of the linear three-dimensional structures of the patterned alignment film 220a is therefore preferably not more than 500 nm. When the corresponding linear three-dimensional structures are formed in the mold by a common rubbing method, the angular distribution of the running directions of the linear three-dimensional structures (corresponding to the angular distribution of the slow axes of the patterned retardation layer due to the aligned liquid crystal molecules) can be made to fall within the range of three degrees, which is the level generally required, by making the height of the linear three-dimensional structures not more than 500 nm. Thus, from the viewpoint of providing the ability to align a liquid crystal compound to the patterned alignment film-containing film 150 (patterned alignment film 220a), it is preferred to make the height of the linear three-dimensional structures of the patterned alignment film-containing film 150 (patterned alignment film 220a) not less than 1 nm and not more than 500 nm. This holds true for all of the first to fifth embodiments.

From the viewpoint of making the height of the linear three-dimensional structures of the patterned alignment film 220a in the preferable range of 1 to 500 nm, the height of the fine linear three-dimensional structures, formed in the first three-dimensional structure region 112a and the second three-dimensional structure region 121*a* of the mold 100 for a patterned alignment film for three-dimensional display, is preferably in the range of 1 nm to 500 nm, more preferably in the range of 1 nm to 100 nm, most preferably in the range of 1 nm to 50 nm, as described above.

The height of the linear three-dimensional structures can be determined in the following manner: The surface three-dimensional structures are shot or the profile or contour (corresponding to the surface roughness curve) of the structures is measured by using an electron microscope or an atomic force microscope. Based on the data obtained, Rz (ten-point average roughness) is calculated according to JIS B 0601 (1994).

In addition, the level difference between the first alignment regions 8B and the second alignment regions 8A in the patterned alignment film 220*a* is preferably in the range of 10 nm to 5000 nm, more preferably in the range of 20 nm to 100 nm, most preferably in the range of 20 nm to 50 nm. By making the level difference between the first alignment regions 8B and the second alignment regions 8A not less than 10 nm, disorder in the alignment of liquid crystal molecules can be effectively prevented in the vicinities of the boundaries between the first alignment regions 8B and the second alignment regions 8A. By making the level difference between the first alignment regions 8B and the second alignment regions 8A not more than 5000 nm, the occurrence of moire due to interference between a pixel array in a display panel and the boundaries between the first alignment regions 8B and the second alignment regions 8A can be reduced.

That the level difference between the first alignment regions 8B and the second alignment regions 8A in the patterned alignment film 220*a* is preferably not less than 10 nm and not more than 5000 nm holds true for all of the first to fifth embodiments.

Figure 23:
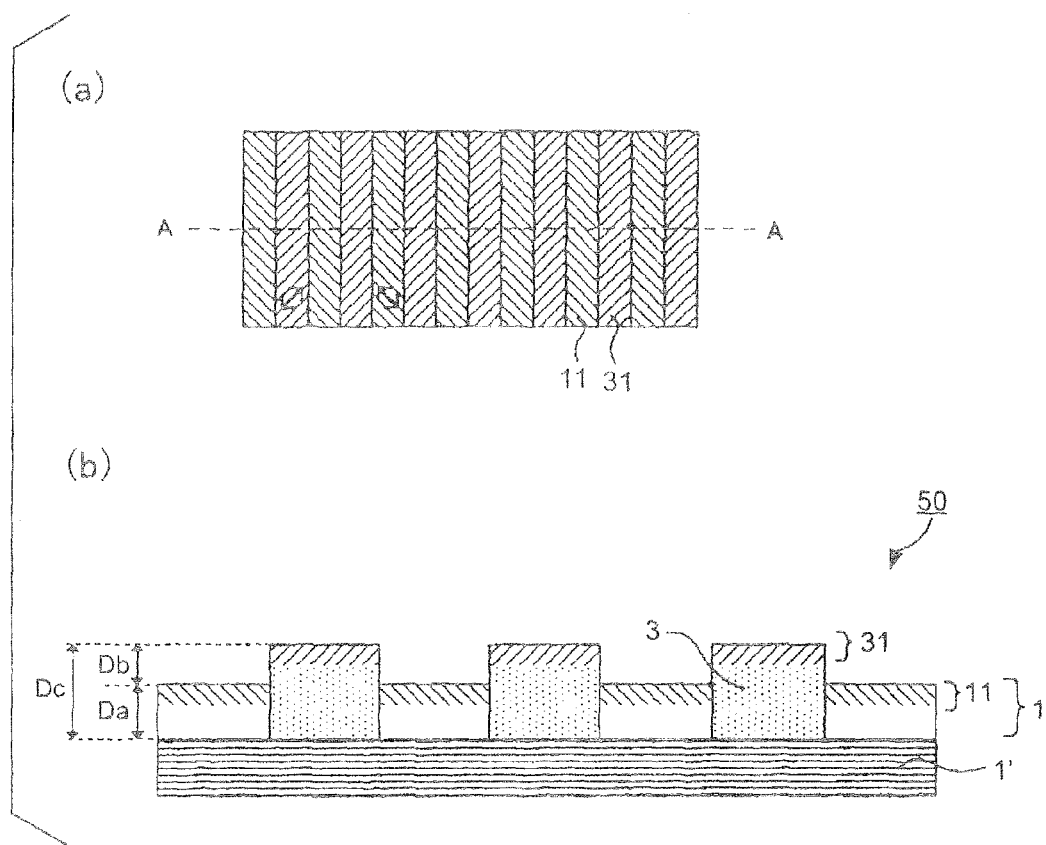
FIG. 23 shows schematic views illustrating an exemplary mold for a patterned alignment film for three-dimensional display.

The level difference between the first alignment regions 8B and the second alignment regions 8A in the patterned alignment film 220*a* can be determined by the level difference between the first three-dimensional structure region and the second three-dimensional structure region of the mold (distance D1 in FIG. 4, distance Db in FIG. 23(*b*), distance h in FIG. 26(*f*)). From the viewpoint of making the level difference between the first alignment regions 8B and the second alignment regions 8A in the patterned alignment film 220*a* not less than 10 nm and not more than 5000 nm, the level difference between the first three-dimensional structure region and the second three-dimensional structure region in the mold (distance D1 in FIG. 4, distance Db in FIG. 23(*b*), distance h in FIG. 26(*f*)) is preferably made in the range of 10 nm to 5000 nm, more preferably in the range of 20 nm to 100 nm, most preferably in the range of 20 nm to 50 nm, as described above.

The above description is merely illustrative, and is not intended to limit the present invention. Any technical idea or concept that is substantially the same as the inventive concept as expressed herein should be construed to fall within the scope of the present invention. For example, though the mold of the illustrated embodiment is a flat-plate mold, the present invention is also applicable to a roll mold. Further, as with the above-described embodiments, the second-layer fine linear three-dimensional structures of the second three-dimensional structure region 121*a* may be formed in the same direction as the first-layer fine linear three-dimensional structures of the first three-dimensional structure region 112*a*.

Example of the Fifth Embodiment

The following example illustrates the present invention in greater detail. In the example, the process steps (a) to (f) illustrated in FIGS. 25 and 26 are applied to a cylindrical roll substrate having an outermost first layer.

Example 1

(First Polishing Step)

FIGS. 25(*a*) and 25(*b*): Rubbing of a 5-μm outermost chromium layer (first layer) of the cylindrical substrate was performed in a 45-degree direction with respect to the circumferential direction of the cylinder, thereby forming a first three-dimensional structure region in the entire surface of the chromium layer.

(Second Layer Forming Step)

FIG. 25(*c*): A negative resist, diluted with a solvent, was applied onto the cylindrical substrate, followed by drying. Thereafter, the resist was subjected to laser exposure in a pattern of parallel stripes having a width of 360 μm, and then to development, followed by removal of unnecessary resist, thereby forming a pattern of 360 μm-wide non-resist portions and 5 μm-high first resist portions with a pitch of 360 μm, arranged alternately on the chromium layer.

FIG. 25(*d*): A chromium layer as a second-layer film, having a height of 0.1 μm, was formed by sputtering on the first resist portions and the non-resist portions.

(Second Polishing Step)

FIG. 26(*e*): Rubbing of the entire surface of the second-layer film was performed in a 135-degree direction with respect to the circumferential direction of the cylinder, thereby forming a second three-dimensional structure region.

(Resist Removing Step)

FIG. 26(*f*): The resist portions and the second-layer film on the resist portions were removed by using a mixed solution of MEK, IPA and methanol to form first three-dimensional regions and second three-dimensional regions arranged alternately with a pitch of 360 μm, thereby obtaining a mold for a patterned alignment film for three-dimensional display according to the present invention.

[Evaluation]

An ultraviolet curable acrylic resin composition, diluted with a solvent comprising a 4:1 (weight ratio) mixture of MEK and MIBK, having a solid content of 45% and having a viscosity of 2500 mPa·s, was applied to a transparent 60 μm-thick TAC film as a substrate such that the coating had a thickness of 8 μm, followed by drying at 80° C. for 30 seconds to evaporate the solvent. After the resin coating was pressed against the above mold at a load of 1000 MPa/cm by means of a rubber roll, the resin coating was irradiated with ultraviolet rays to solidify the resin. The resin was then peeled from the rubber roll, thereby obtaining a patterned alignment layer-containing substrate (patterned alignment film).

The surface configuration of the patterned alignment film obtained was measured by means of an atomic force microscope (AFM). The measurement revealed that fine linear three-dimensional structures were randomly distributed with a pitch in the range of about 5 nm to 500 μm, and that the height of the fine linear three-dimensional structures was in the range of 1 nm to 100 nm, and the width of the structures was in the range of 5 nm to 500 nm. The results of Example 1 thus verify easy production of the patterned alignment film.

Example 2

A mold for a patterned alignment film for three-dimensional display according to the present invention was produced in the same manner as in 0.5 Example 1 except that instead of the chromium layer, a 2 μm-thick sputtered DLC layer, formed on a nickel substrate, was used as the first layer.

Evaluation of the mold was made in the same manner as in Example 1, and the same evaluation results as those of Example 1 were obtained. However, the adhesion between the nickel substrate and the DLC layer was found to be weak. In this regard, it has been confirmed that provision of a silane coupling layer on the nickel substrate can effectively increase the adhesion between the nickel substrate and the DLC layer.

Example 3

A mold for a patterned alignment film for three-dimensional display according to the present invention was produced in the same manner as in Example 1 except that instead of the chromium layer, a 5 µm-thick nickel plating layer was used as the first layer. Evaluation of the mold was made in the same manner as in Example 1, and the same evaluation results as those of Example 1 were obtained. However, the adhesion between the nickel layer and the chromium layer upon the resist removing was found to be weak. In this regard, it has been confirmed that the adhesion between the nickel layer and the chromium layer can be effectively increased by subjecting the surface of the nickel layer to plasma ashing. At present, a mold for a patterned alignment film for three-dimensional display according to the present invention can be produced with the use of all of the following combinations of materials: Ni/Ni, Cr/Cr, Ni/Cr, Cr/Ni, DLC/Ni and DLC/Cr.

The invention claimed is:

1. A method for producing a mold for a patterned alignment film for three-dimensional display, comprising:
    a first layer forming step of forming a first layer composed of a metal material or an inorganic material;
    a first three-dimensional structure forming step of forming a fine linear three-dimensional structure in a surface of the first layer in an approximately constant direction;
    a second layer forming step of forming a second layer, composed of a metal material or an inorganic material, on the surface of the first layer after the first three-dimensional structure forming step;
    a second three-dimensional structure forming step of forming a fine linear three-dimensional structure in a surface of the second layer in an approximately constant direction which is different from or the same as that in the first three-dimensional structure forming step;
    a resist forming step of forming a resist in a parallel stripe pattern on the surface of the second layer after the second three-dimensional structure forming step;
    a second layer removing step of removing a part of the second layer that remains exposed after the resist forming step; and
    a resist removing step of removing the resist.

2. The method for producing a mold for a patterned alignment film for three-dimensional display according to claim 1, wherein the mold for a patterned alignment film for three-dimensional display is a roll mold having a roll-like shape.

3. The method for producing a mold for a patterned alignment film for three-dimensional display according to claim 1, wherein at least one of the first three-dimensional structure forming step and the second three-dimensional structure forming step is performed by roll pressing.

4. A method for producing a mold for a patterned alignment film for three-dimensional display, comprising:
    a first layer preparation step of preparing a first layer composed of a metal material or an inorganic material;
    a first three-dimensional structure forming step of forming a first fine linear three-dimensional structure in a surface of the first layer in an approximately constant direction;
    a resist forming step of forming a resist in a parallel stripe pattern on the surface of the first layer after the first three-dimensional structure forming step;
    a second layer forming step of forming a second layer, composed of a metal material or an inorganic material, in a parallel stripe pattern on the surface of the first layer that remains exposed after the resist forming step;
    a protective layer forming step of forming a protective layer, composed of a resist material, on the surface of the first layer;
    a second three-dimensional structure forming step of forming a second fine linear three-dimensional structure in a surface of the second layer in an approximately constant direction which is different from or the same as the direction in which the first three-dimensional structure is formed; and
    a removing step of removing the protective layer.

5. The method for producing a mold for a patterned alignment film for three-dimensional display according to claim 4, wherein the second layer is formed on an exposed part of the first layer and on the resist in the second layer forming step and,
    in the protective layer forming step, the protective layer is formed by roughly polishing a laminate of the resist and a part of the second layer overlying the resist.

6. The method for producing a mold for a patterned alignment film for three-dimensional display according to claim 4, wherein the second layer is formed on an exposed part of the first layer and on the resist in the second layer forming step and,
    in the protective layer forming step, a laminate of the resist and a part of the second layer overlying the resist is removed, and subsequently a second resist is formed such that it covers the first layer and the second layer, followed by rough polishing of the second resist to form the protective layer.

7. The method for producing a mold for a patterned alignment film for three-dimensional display according to claim 4, wherein the mold for a patterned alignment film for three-dimensional display is a roll mold having a roll-like shape.

8. The method for producing a mold for a patterned alignment film for three-dimensional display according to claim 4, wherein at least one of the first three-dimensional structure forming step and the second three-dimensional structure forming step is performed by roll pressing.

9. A method for producing a mold for a patterned alignment film for three-dimensional display, comprising:
    a first layer forming step of forming a first layer composed of a metal;
    a first three-dimensional structure forming step of forming a fine linear three-dimensional structure in a surface of the first layer in an approximately constant direction;
    a resist forming step of forming a resist in a parallel stripe pattern on the surface of the first layer after the first three-dimensional structure forming step;
    a second layer forming step of forming a second layer, composed of an inorganic material, by performing dry plating of a surface of the resist and an exposed surface of the first layer after the resist forming step;
    a removing step of removing the resist;
    a protective layer forming step of forming a protective layer by performing wet plating of an exposed part of the first layer after the removing step;
    a second three-dimensional structure forming step of forming a fine linear three-dimensional structure in a surface of the second layer in an approximately constant direction which is different from or the same as that in the first three-dimensional structure forming step; and
a removing step of removing the protective layer.

10. The method for producing a mold for a patterned alignment film for three-dimensional display according to claim 9, wherein the mold for a patterned alignment film for three-dimensional display is a roll mold having a roll-like shape.

11. The method for producing a mold for a patterned alignment film for three-dimensional display according to claim 9, wherein at least one of the first three-dimensional structure forming step and the second three-dimensional structure forming step is performed by roll pressing.

12. A method for producing a mold for a patterned alignment film for three-dimensional display, having an alternating stripe pattern of a first three-dimensional structure region where a fine linear three-dimensional structure is formed in an approximately constant direction and a second three-dimensional structure region where a fine linear three-dimensional structure is formed in an approximately constant direction different from that of the first three-dimensional structures, comprising:
    a first polishing step of forming the first three-dimensional structure region in a surface of a first layer composed of an inorganic material;
    a second layer forming step of forming-a resist portions in a stripe pattern on the surface of the first layer, and then forming a second-layer film, composed of an inorganic material, on the surfaces of the resist portions and the non-resist portions, thereby forming a patterned second layer on the non-resist portions;
    a second polishing step of forming the second three-dimensional structure region by polishing a surface of the second-layer film in a direction different from that in the first polishing step; and
    a resist removing step of removing the resist portions and the second-layer film on the resist portions.

13. The method for producing a mold for a patterned alignment film for three-dimensional display according to claim 12, wherein the thickness of the patterned second layer is not less than 0.01 µm and not more than 1 µm.

14. The method for producing a mold for a patterned alignment film for three-dimensional display according to claim 12, wherein the thickness of the resist portion is not less than 1 µm and not more than 10 µm.

15. The method for producing a mold for a patterned alignment film for three-dimensional display according to claim 12, wherein the first layer and the second layer are composed of the same inorganic material.

16. A method for producing a mold for a patterned alignment film for three-dimensional display, comprising:
    an underlayer preparation step of preparing an underlayer composed of a metal material;
    a resist forming step of forming a resist in a parallel stripe pattern on a surface of the underlayer;
    a first layer forming step of forming a first layer-forming layer, composed of an inorganic material having insulating properties, by performing dry plating of the surfaces of the underlayer and the resist, and then removing a laminate of the resist and a part of the first layer-forming layer overlying the resist, thereby forming a first layer in a parallel stripe pattern;
    a first three-dimensional structure forming step of forming a first fine linear three-dimensional structure in a surface of the first layer in an approximately constant direction;
    a second layer forming step of forming a second layer, composed of a metal material and having a thickness which is equal to or larger than a thickness of the first layer, by performing wet plating of only an exposed surface of the underlayer after the first three-dimensional structure forming step; and
    a second three-dimensional structure forming step of forming a second fine linear three-dimensional structure in a surface of the second layer in an approximately constant direction different from the direction in which the first three-dimensional structure is formed.

17. The method for producing a mold for a patterned alignment film for three-dimensional display according to claim 16, wherein the mold for a patterned alignment film for three-dimensional display is a roll mold having a roll-like shape.

18. The method for producing a mold for a patterned alignment film for three-dimensional display according to claim 16, wherein at least one of the first three-dimensional structure forming step and the second three-dimensional structure forming step is performed by roll pressing.

19. A method for producing a mold for a patterned alignment film for three-dimensional display, comprising:
    an underlayer preparation step of preparing an underlayer composed of a metal material;
    a resist forming step of forming a resist in a parallel stripe pattern on a surface of the underlayer;
    a first layer forming step of forming a first layer-forming layer, composed of an inorganic material having insulating properties, by performing dry plating of the surfaces of the underlayer and the resist, and then removing a laminate of the resist and a part of the first layer-forming layer overlying the resist, thereby forming a first layer in a parallel stripe pattern;
    a first three-dimensional structure forming step of forming a first fine linear three-dimensional structure in a surface of the first layer in an approximately constant direction;
    a second layer forming step of forming a second layer, composed of a metal material and having a thickness which is larger than a thickness of the first layer, by performing wet plating of only an exposed surface of the underlayer after the first three-dimensional structure forming step; and
    a second three-dimensional structure forming step of forming a second fine linear three-dimensional structure in a surface of the second layer in an approximately constant direction which is the same as the direction in which the first three-dimensional structure is formed.

20. The method for producing a mold for a patterned alignment film for three-dimensional display according to claim 19, wherein the mold for a patterned alignment film for three-dimensional display is a roll mold having a roll-like shape.

21. The method for producing a mold for a patterned alignment film for three-dimensional display according to claim 19, wherein at least one of the first three-dimensional structure forming step and the second three-dimensional structure forming step is performed by roll pressing.

22. A patterned retardation film comprising:

a transparent substrate film;

a patterned alignment film, formed on one surface of the transparent substrate film, having a surface consisting of first alignment regions and second alignment regions, arranged alternately and each region having linear three-dimensional structure formed therein, with the linear three-dimensional structure of the second alignment regions being formed in a direction which is the same as or different from a direction in which the linear three-dimensional structure of the first alignment regions are formed; and a patterned retardation layer, formed on said surface of the patterned alignment film, containing a liquid crystal compound which is aligned by the linear three-dimensional structure of the first alignment regions and the linear three-dimensional structures of the second alignment regions, wherein the linear three-dimensional structure of the first alignment regions and the linear three-dimensional structure of the second alignment regions have a height of not less than 1 nm and not more than 500 nm, and have a pitch of not less than 1 nm and not more than 100 nm.

* * * * *

UNITED STATES PATENT AND TRADEMARK OFFICE
CERTIFICATE OF CORRECTION

PATENT NO.       : 9,310,543 B2
APPLICATION NO.  : 14/118073
DATED            : April 12, 2016
INVENTOR(S)      : Kei Katou et al.

It is certified that error appears in the above-identified patent and that said Letters Patent is hereby corrected as shown below:

Title Page, Item (57), Abstract

Please change: "A method for producing a mold for a patterned alignment film for three-dimensional display includes: forming a first layer composed of a metal material or an inorganic material; forming a fine linear three-dimensional structure in a surface of the first layer in an approximately constant direction; F forming a second layer, composed of a metal material or an inorganic material, on the surface of the first layer after the first three-dimensional structure forming step; a second three-dimensional structure forming step of forming a fine linear three-dimensional structure in a surface of the second layer in an approximately constant direction which differs by 90° from that in the first three-dimensional structure forming step; a resist forming step of forming a resist in a parallel stripe pattern on the surface of the second layer after the second three-dimensional structure forming step." to -- A method for producing a mold for a patterned alignment film for three-dimensional display includes: forming a first layer composed of a metal material or an inorganic material; forming a fine linear three-dimensional structure in a surface of the first layer in an approximately constant direction; forming a second layer, composed of a metal material or an inorganic material, on the surface of the first layer after the first three-dimensional structure forming step; a second three-dimensional structure forming step of forming a fine linear three-dimensional structure in a surface of the second layer in an approximately constant direction which differs by 90° from that in the first three-dimensional structure forming step; a resist forming step of forming a resist in a parallel stripe pattern on the surface of the second layer after the second three-dimensional structure forming step. --

Signed and Sealed this
Twenty-first Day of June, 2016

Michelle K. Lee
*Director of the United States Patent and Trademark Office*